(12) United States Patent
Yang

(10) Patent No.: US 7,164,518 B2
(45) Date of Patent: Jan. 16, 2007

(54) FAST SCANNER WITH ROTATABLE MIRROR AND IMAGE PROCESSING SYSTEM

(76) Inventor: Yuping Yang, 3253 Leesville Way, Dublin, OH (US) 43017

( * ) Notice: Subject to any disclaimer, the term of this patent is extended or adjusted under 35 U.S.C. 154(b) by 180 days.

(21) Appl. No.: 10/960,791

(22) Filed: Oct. 7, 2004

(65) Prior Publication Data

US 2005/0128551 A1    Jun. 16, 2005

Related U.S. Application Data

(60) Provisional application No. 60/510,185, filed on Oct. 10, 2003, provisional application No. 60/531,249, filed on Dec. 19, 2003, provisional application No. 60/572,639, filed on May 19, 2004.

(51) Int. Cl.
    *G02B 26/08*  (2006.01)
(52) U.S. Cl. ................................. 359/212
(58) Field of Classification Search ............. 359/205, 359/208, 209, 212–214
    See application file for complete search history.

(56) References Cited

U.S. PATENT DOCUMENTS

| | | | |
|---|---|---|---|
| 4,395,662 A | 7/1983 | Sexton, Jr. | 315/371 |
| 4,626,925 A | 12/1986 | Toyoda | 358/494 |
| 5,117,295 A | 5/1992 | Smitt | 358/474 |
| 5,253,085 A | 10/1993 | Maruo | 358/481 |
| 5,457,547 A | 10/1995 | Yamada | 358/487 |
| 5,511,148 A | 4/1996 | Wellner | 395/106 |
| 5,581,637 A | 12/1996 | Cass et al. | 382/284 |
| 5,625,183 A | 4/1997 | Kashitani et al. | 250/236 |
| 5,724,456 A | 3/1998 | Boyack et al. | 271/274 |
| 5,731,899 A | 3/1998 | Meyers | 359/621 |
| 5,748,338 A | 5/1998 | Lee | 358/473 |
| 5,757,518 A | 5/1998 | Kashitani | 358/474 |
| 5,822,125 A | 10/1998 | Meyers | 359/621 |
| 5,877,492 A | 3/1999 | Fujieda et al. | 250/208.1 |
| 5,909,521 A | 6/1999 | Nakao et al. | 382/312 |
| 5,920,401 A | 7/1999 | Street et al. | 358/400 |
| 5,973,798 A | 10/1999 | Segawa et al. | 358/497 |
| 6,061,102 A | 5/2000 | Sheppard et al. | 348/745 |
| 6,088,167 A | 7/2000 | Yamakawa | 359/662 |
| 6,094,512 A | 7/2000 | Lin et al. | 382/315 |
| 6,195,469 B1 | 2/2001 | Nishioka et al. | 382/274 |
| 6,219,446 B1 | 4/2001 | Kiriki et al. | 382/167 |

(Continued)

*Primary Examiner*—Euncha P. Cherry
(74) *Attorney, Agent, or Firm*—Morris Manning & Martin LLP; Tim Tingkang Xia, Esq.

(57) ABSTRACT

A scanner for obtaining an image of an object placed on an at least partially transparent platform, wherein the platform is defined by edge portions and has at least including a first scan area and a second scan area. In one embodiment, the scanner includes a white area formed at least partially around the edge portions of the platform with a plurality of markers, optical means for sequentially scanning consecutive partial images of the object from the first scan area and the second scan area, respectively, wherein each of the consecutive partial images include an image of at least one of the plurality of markers, and an image processing system for using the image of the at least one of the plurality of markers in each of the consecutive partial images as a reference to combine the consecutive partial images so as to form a substantially complete image of the object corresponding to a full scan of the first scan area and the second scan area.

23 Claims, 41 Drawing Sheets

U.S. PATENT DOCUMENTS

| | | |
|---|---|---|
| 6,233,014 B1 | 5/2001 | Ochi et al. .................. 348/324 |
| 6,263,117 B1 | 7/2001 | Lee ........................... 382/254 |
| 6,278,108 B1 | 8/2001 | Ori ............................ 250/235 |
| 6,288,802 B1 | 9/2001 | Hoshina et al. ............. 358/488 |
| 6,324,014 B1 | 11/2001 | Moskovich ................. 359/651 |
| 6,393,162 B1 | 5/2002 | Higurashi ................... 382/284 |
| 6,396,648 B1 | 5/2002 | Yamamoto et al. ......... 359/806 |
| 6,493,469 B1 * | 12/2002 | Taylor et al. ............... 382/284 |
| 6,507,010 B1 | 1/2003 | Yamazaki et al. ....... 250/208.1 |
| 6,535,250 B1 | 3/2003 | Okisu et al. ................ 348/345 |
| 6,546,152 B1 | 4/2003 | Hou ........................... 382/284 |
| 6,546,197 B1 | 4/2003 | Kamata et al. ................ 396/6 |
| 2003/0011898 A1 | 1/2003 | Mai et al. ................... 358/504 |
| 2003/0030820 A1 | 2/2003 | Kim et al. .................. 356/620 |
| 2003/0095294 A1 | 5/2003 | Shih et al. .................. 358/497 |
| 2003/0142367 A1 | 7/2003 | Ito ............................. 358/461 |
| 2004/0090529 A1 | 5/2004 | Takahasl ................ 348/207.99 |

* cited by examiner

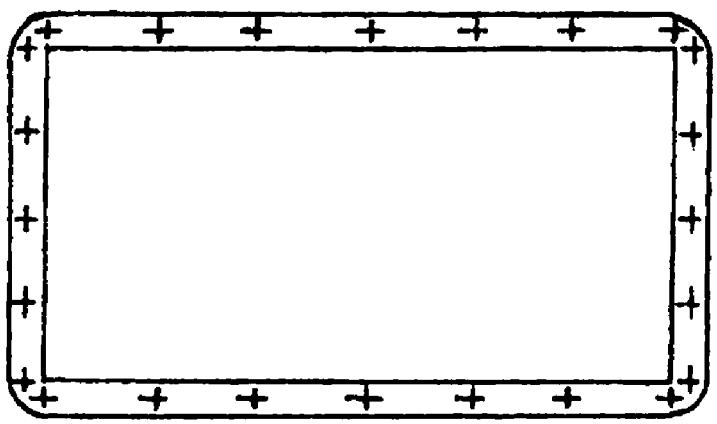
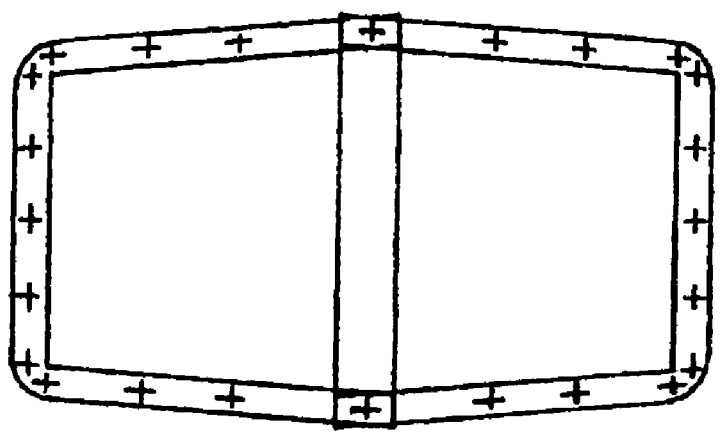
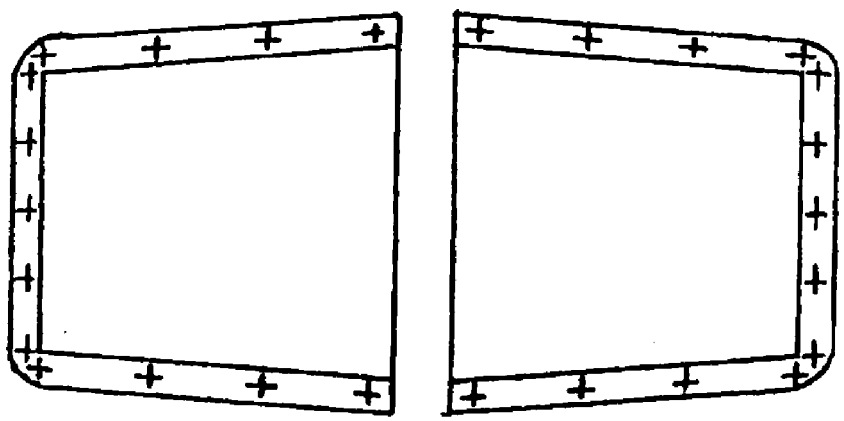
 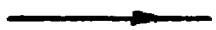
Fig. 27

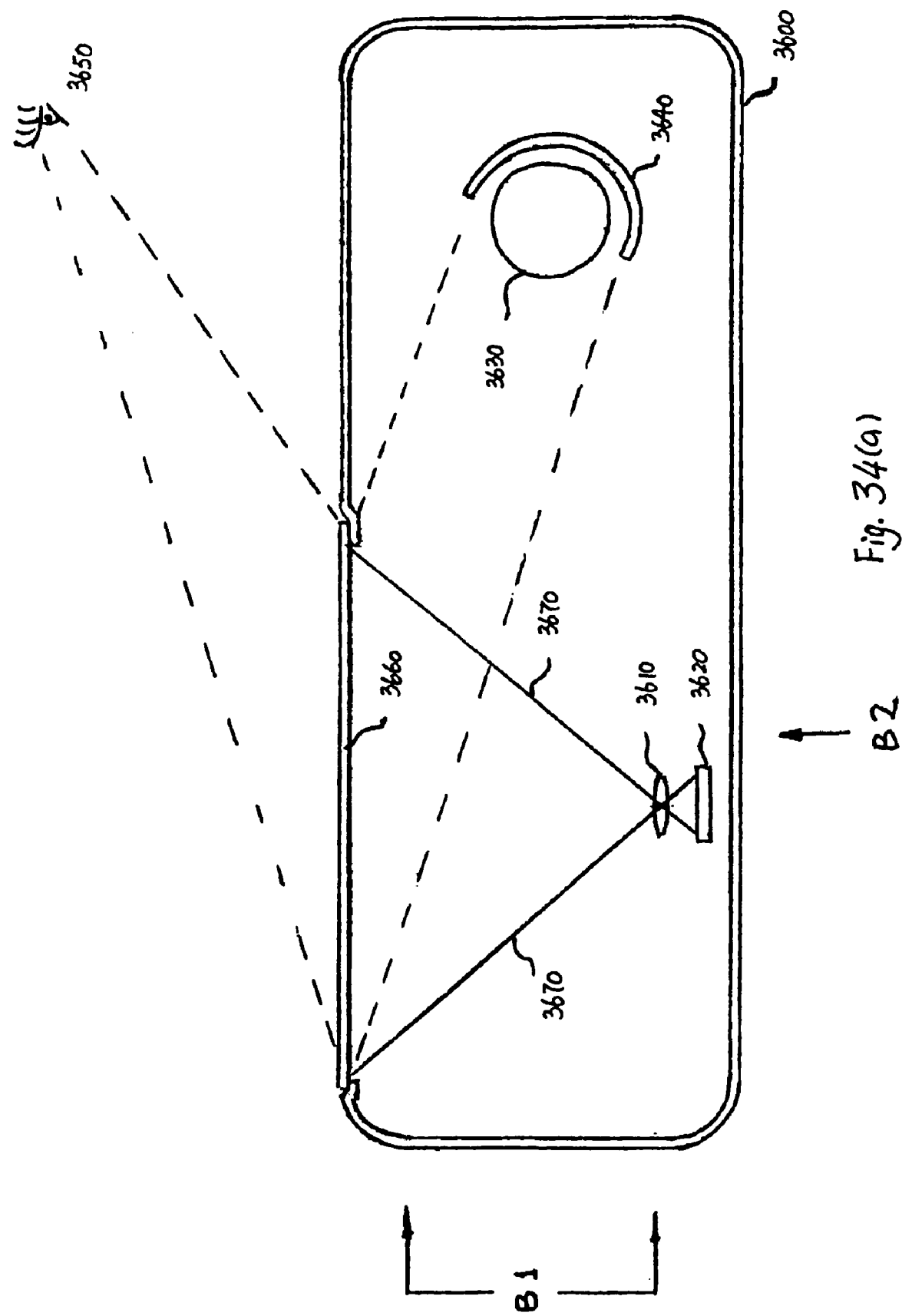

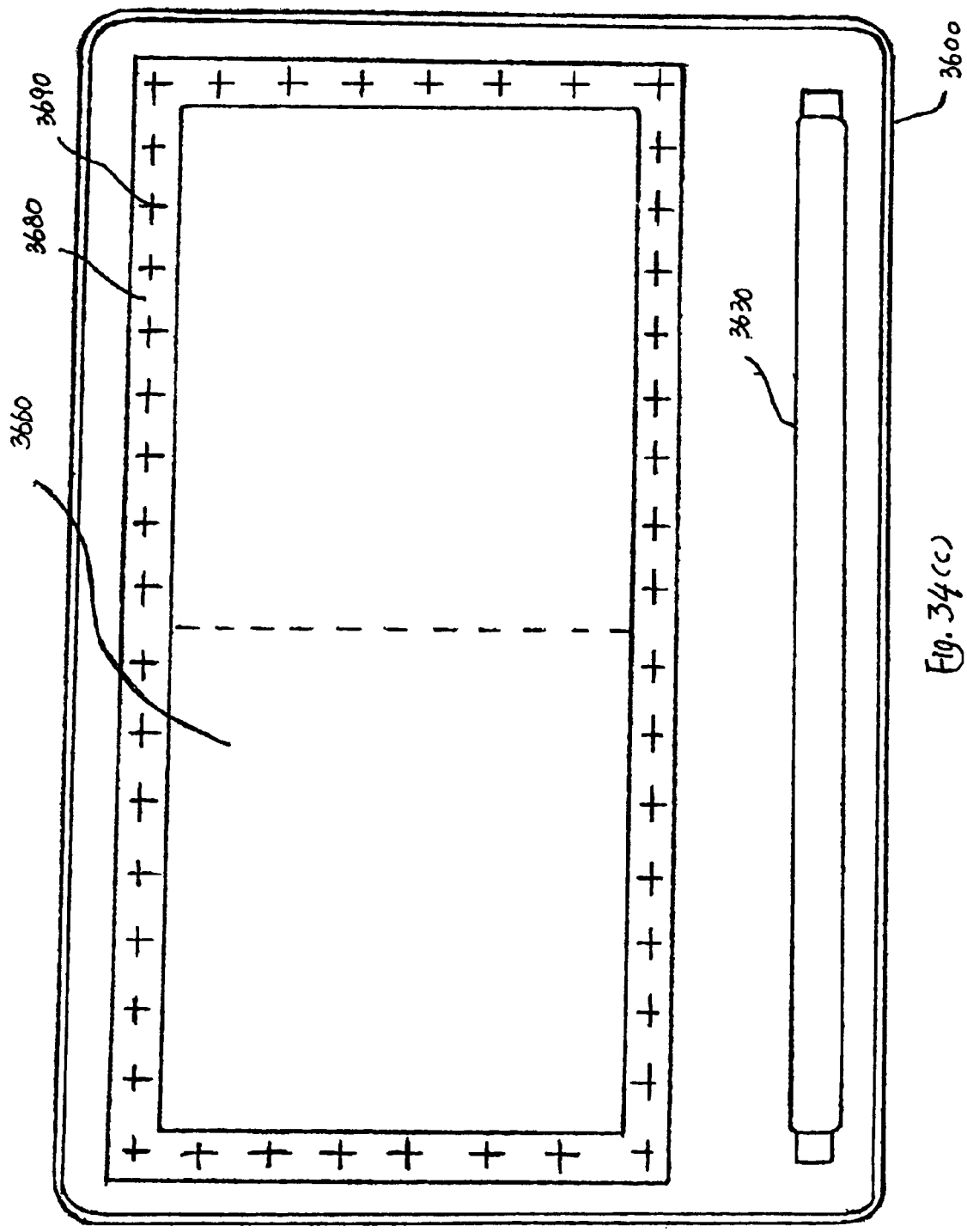

FAST SCANNER WITH ROTATABLE MIRROR AND IMAGE PROCESSING SYSTEM

CROSS-REFERENCE TO RELATED PATENT APPLICATION

This application claims the benefit, pursuant to 35 U.S.C. §119(e), of provisional U.S. Patent Application Ser. Nos. 60/510,185, 60/531,249, and 60/572,639, filed on Oct. 10, 2003, Dec. 19, 2003 and May 19, 2004, respectively, entitled "FAST SCANNER WITH ROTARY MIRROR AND IMAGE PROCESSING SYSTEM," by Yuping Yang, which are incorporated herein by reference in their entireties.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to a scanning device, and in particular to the utilization of image sensors and rotatable mirrors for high speed image scan and the utilization of mark images for high speed image process.

BACKGROUND OF THE INVENTION

Because of significant advantages such as ease of information sharing and management, saving of physical space, and less susceptible to data loss, storing documents electronically is becoming a common practice. Once images of documents are stored in a computer system, there exist quite a number of technologies, mostly in the form of software, to properly mark, index, store, bundle, and search these images. The demand for scanning paper-type documents into electronic files or documents has therefore increased significantly in the recent years. Two types of scanning devices currently are available commercially for converting paper-type documents into electronic documents. The first type is a so-called glass top flatbed scanner that is capable of scanning at speed of 0.033 to 0.143 pages per second. The second type is a sheet-feed scanner that is capable of scanning at speed up to 3 pages per second. Sheet-feed scanner can efficiently scan documents with uniform physical shape. Time saving becomes especially significant when the page number of a document to be scanned is large. Because not all documents can be fed through the slot of the sheet-feed scanners, a flatbed device is essential for offices and individuals. For instance, in account receivable office of hospitals, clinics, and various companies, large volumes of checks and payment explanation sheets arrive through mail daily. Although these paper documents are good candidates for electronic storage, because they vary significantly in sizes and shapes, often folded and stapled in some way, there is a lack of efficient means for scanning these documents into a computer system due to the speed limitation. Today these paper documents may still be sorted, marked, bundled, and searched manually.

Current commercial flatbed scanner is made up of a scan head with light source, mirrors, focus lens and optical sensor. All parts in scan head move together during scanning. The sensor receives optical signals scanned from a document and converts the optical signals into electric signals, which are then processed into images of the document.

Factors limiting the scan speed of the flatbed devices are, among other things, the moving speed of the scan head, line scan rate of optical sensor, data transferring speed, and image processing speed. The image processing speed can be achieved to far surpass the moving speed of the scan head. Data transferring speed depends on the choices of protocols. The most common universal serial bus (hereinafter "USB") port can transfer data at 1.5 MBps (megabyte per second). It only takes 0.2 second to transfer a 300 KB image file. Other protocols such as small computer system interface (hereinafter "SCSI") are orders of magnitude faster than USB ports. The new generation of highly sensitive optical sensors can scan up to 46,000 lines, for example, DALSA IT-P 1-2048 (DALSA Corp., Waterloo, Ontario, Canada) per second. If each page has 4,000 lines, the sensor is able to finish scanning in less than 0.1 second. The fact that current sheet-feed scanners and copiers can scan up to 190 pages per minute (ppm) has proved that none of the image processing speed, data transferring speed, and sensor line rate is a speed bottleneck.

The speed bottleneck for the flatbed devices is the slow moving scan head. More specifically, it is not that the stepping motor cannot drive the scan head fast enough, it is the back and forth movement of the scan head and the start-stop action that limit the moving speed of the scan head. Therefore, despite orders of magnitude increase in microprocessor speed and memory density in recent years, the increase in flatbed scan speed of the flatbed scanners has been incremental.

Comparing to the 0.033 to 0.143 pages per second scanning time required by a glass top flatbed scanner, video camera employing area sensors could capture image of a document instantly. One example of such an image scanning system is disclosed in U.S. Pat. No. 5,511,148 entitled "Interactive Copying System". Another example of such an image scanning system is disclosed in U.S. Pat. No. 6,493,469. It is understood that U.S. Pat. No. 6,747,764 also discloses a "camera box" like device in which an area sensor faces up to capture an image of a document that is faced down. The document is placed on top of a transparent platform. However, video camera employing area sensors usually do not have enough resolutions to replace an ordinary office scanner. Similar to the glass-top scanning devices, the flashing light emitting out of the scan area during scanning may discomfort and harm users and the device has limited scan area while the height of the device is high, due to the need for keeping sufficient distance between the to be scanned document and the area sensor.

Cameras employing line sensors, called line scan cameras, may produce higher image resolutions than one produced by video cameras employing area sensors. However, using line scan cameras for document scanning is inconvenient, for example, the document to be scanned usually needs to be faced up. Otherwise, a bulky scanning device needs to be constructed so as to place the line scan camera there below the document to be scanned. In addition, the line scan camera devices require strong scan lighting, which is uncomfortable for human eyes during frequent image capturing.

Based on the principle of the line scan camera, a scanner with a rotary mirror may work as a glass-top (or flatbed) scanner. But there are issues to be resolved before rotary mirror scanners become a popular product for routine use. One critic issue is that a certain distance is required between line sensors and the scan area. FIGS. 1 and 2 show a scanner utilizing a line sensor and a rotary mirror. The document to be scanned is placed on the surface of scan area 1 and faced down. A rotary mirror 2 reflects the imaging light of the original document to a condenser lens 3 and then to a line sensor 4. The rotary mirror is rotating around axis 5. This type of image scanner can scan original document at very high speed. However, this type of scanner has bulky construction and several other problems. As shown in FIG. 2, a viewing angle $\alpha_0$ is defined as the angle between the image path of the original document and the surface plane 1 of the original document at the far end of the scan area. The smaller the angle $\alpha_0$, the lower the resolution of the image taken from the original document near the far edge of the scan area, even after the distortion of the scanned image is eliminated. To maintain a certain resolution level, angle $\alpha_0$ must be greater than a certain threshold value at all times during scanning. Therefore, for scanning originals with certain size $L_0$, the height $H_0$ of the scanner cannot be made too small.

There are various attempts to shorten the distance between a document and rotary mirror and condenser lens. For examples, U.S. Pat. No. 6,396,648 uses a fish-eye lens and U.S. Pat. No. 6,324,014 uses a set of lenses. However, the shortening of the distance achieved by using different lenses is limited and further complicated by side effects of increasing distortion of image captured.

U.S. Pat. No. 6,493,469 takes two partial images of a document through two area sensor cameras. Each partial image has relatively small distortion and good resolution. The two images are combined to form a complete image of the original document. This design has several problems. Image capturing device such as a digital camera employing pricy area sensors that generally do not have sufficient resolution to replace the ordinary office scanners. The design also requires the document be placed facing up and camera facing down, occupies a relatively large space, is therefore not as convenient as flatbed scanners for frequent scanning. The proposed method to combine the two partial images is based on the captured images, which are unreliable in achieving a high-quality combined image.

U.S. Pat. No. 5,909,521 also discloses multiple partial images approach to obtain a complete image of a document. The image processing, however, is quite complex and the quality of alignments of partial images varies from scan to scan. As a result, the approach does not provide means for quickly and reliably combining partial images into one.

Another issue in designing rotary mirror scanner is to accurately time the coordination between image processing and angular position of the rotary mirror. Various methods have been proposed, for example, U.S. Pat. No. 6,088,167 discloses a method to use a dedicated light sensor, other than the image capturing optical sensor, to regularly capture the light beam when the light beam is in certain position so as to achieve the measurement of scanning position.

U.S. Pat. No. 5,757,518 proposes several methods to time the rotation of the rotary mirror. The first method is to count main scanning cycles, which requires no extra hardware for timing the scanning. However, timing main scanning cycles is difficult to implement if multiple partial images of the same original document need to be taken before they are combined into one complete image. Additionally, cycle counting errors may be accumulated. The second method is to measure angular displacement of reflecting mirrors. This method has the obvious drawback that extra components are needed. The third method of using an optical path length finder is also not desirable for the same reason.

U.S. Pat. No. 5,253,085 uses a synchronous sensor to detect the angular position of rotary mirror. Extra sensor and hardware mechanism are used to detect the angular position in U.S. Pat. No. 5,973,798.

The third issue in the design of a rotary mirror scanner is the correction of uneven shading of the image caused by uneven lighting exposure. It is known in the art of scanner that a standard white reference is needed for obtaining reference light intensity in order to lookup or compute shading data. There are numerous methods developed for shading correction, such as in U.S. Pat. No. 6,061,102, U.S. Pat. No. 5,724,456, U.S. Pat. No. 6,546,197, U.S. Pat. No. 6,195,469, U.S. Pat. No. 5,457,547, and U.S. Pat. Pub. No. U.S. 2003/0,142,367. However, in rotary mirror scanner design, the shading unevenness across the scan area would be greater than that in normal flatbed scanners. A much larger "standard white reference" area is therefore needed.

The fourth issue in the design of an image scanner is the elimination of distortions in the raw image initially taken by sensors. The captured raw images need to be processed to obtain undistorted image of the scanned documents. There are also numerous methods developed for distortion elimination, such as in U.S. Pat. No. 6,233,014, U.S. Pat. No. 5,253,085, and U.S. Pat. No. 6,219,446.

Still another issue is the strong light emitting out of the scan area during scanning. For very fast scanning, one method is to use a strong light to cover the entire scan area. This can be very uncomfortable for the eyes of a human operator. Another method is to use a strong and narrow light beam to scan the scan area following the imaging scan line. The second method minimizes the amount of illuminating light emitting out of the scan area during scanning. The light beam however, needs to scan the scan area in perfect synchronization with the imaging scanning. No solution so far has been provided to implement the second method.

Therefore, a heretofore unaddressed need exists in the art to address the aforementioned deficiencies and inadequacies.

SUMMARY OF THE INVENTION

The present invention, in one aspect, relates to a scanner for obtaining an image of an object placed on an at least partially transparent platform. The at least partially transparent platform has a first scan area and a second scan area, and each of the first scan area and the second scan area of the at least partially transparent platform has a first edge and a second edge, respectively.

In one embodiment, the scanner has a light source adapted for emitting a light. The scanner further has a rotatable mirror adapted for receiving the light from a first direction and reflecting the light to a second direction for scanning a partial image of the object on the at least partially transparent platform, and receiving the scanned partial image of the object from a third direction that is opposite to the second direction and reflecting the scanned partial image of the object to a fourth direction that is opposite to the first direction. Moreover, the scanner has a stationary mirror placed on optical paths between the rotatable mirror and the first scan area of the at least partially transparent platform for receiving the light reflected from the rotatable mirror at the second direction and reflecting the light received from the rotatable mirror to the first scan area of the at least partially transparent platform for scanning a partial image of the object, and receiving the scanned partial image of the object and reflecting the scanned partial image of the object to the third direction to the rotatable mirror. Furthermore, the scanner has an image sensor for receiving scanned partial images of the object from the fourth direction and outputting electronic signals corresponding to the received scanned partial images of the object. Additionally, the scanner has an image processing system for receiving the electronic signals from the image sensor and recording the electronic signals in a digital format. The scanner also has a condenser lens placed on an optical path between the rotatable mirror and the image sensor, and rotating means for rotating the rotatable mirror.

The rotatable mirror and the stationary mirror are arranged such that when rotated, the rotatable mirror causes the second direction of the light to change such that the corresponding light reflected from the stationary mirror along a fifth direction sequentially scans consecutive partial images of the object from the first edge to the second edge of the first scan area along a first scan direction A and from the first edge to the second edge of the second scan area along a second scan direction B, preferably, in no more than one full rotation of the rotatable mirror. The image processing system combines the partial images recorded therein to form a substantially complete image of the object corresponding to a full scan along the first scan direction A and the second scan direction B, respectively. In one embodiment, the at least partially transparent platform, the rotatable mirror, and the stationary mirror are arranged such that a first angle, $\alpha_1$, is defined between the at least partially transparent platform and an optical path connecting a lower edge of the stationary mirror and the first edge of the first scan area, and a second angle, $\alpha_2$, is defined between the at least partially transparent platform and an optical path connecting the intersection point of the first direction and the second direction and the first edge of the second scan area. Both of $\alpha_1$ and $\alpha_2$ are greater than the predetermined threshold angle $\alpha$.

The rotatable mirror includes a plane mirror having at least one reflecting surface. In one embodiment, the rotatable mirror has a polygon mirror. The stationary mirror, in one embodiment, includes a plane mirror. In another embodiment, the stationary mirror includes a curved mirror. In one embodiment, the image sensor comprises at least one of a line sensor, an area sensor, and a combination thereof. The light source, in one embodiment, includes one of a laser, a fluorescent light tube, a light emitting diode assembly, a tungsten lamp, a tungsten halogen lamp, a halogen lamp, a Xenon lamp, and any combination thereof. The at least partially transparent platform includes a plate made of an at least partially transparent material. In one embodiment, the at least partially transparent platform comprises a glass plate or a transparent plastic plate.

In another aspect, the present invention relates to a scanner for obtaining an image of an object placed on an at least partially transparent platform, wherein the at least partially transparent platform has at least a first scan area and a second scan area, and each of the first scan area and the second scan area has a first edge and a second edge, respectively.

In one embodiment, the scanner has at least one light source adapted for emitting a light. Furthermore, the scanner has at least one rotatable mirror that is adapted for receiving the light from a first direction and reflecting the light to a second direction for scanning a partial image of the object on the at least partially transparent platform, and receiving the scanned partial image of the object from a third direction and reflecting the scanned partial image of the object to a fourth direction. Moreover, the scanner has at least one image sensor for receiving scanned partial images of the object from the fourth direction and outputting electronic signals corresponding to the received scanned partial images of the object. Additionally, the scanner has an image processing system for receiving the electronic signals from the at least one image sensor and recording the electronic signals in a digital format. The scanner further has at least one condenser lens placed on an optical path between the at least one rotatable mirror and the at least one image sensor, and rotating means for rotating the at least one rotatable mirror.

The at least one light source, the at least one rotatable mirror and the at least one image sensor are arranged such that the first direction and the fourth direction define a first angle, $(180°-\beta)$, and the second direction and the third direction define a second angle, $(180°+\beta)$, where $\beta$ has a value in the range of $-15°$ to $15°$, and when rotated, the at least one rotatable mirror causes the second direction of the light to change such that the light sequentially scans consecutive partial images of the object from the first edge to the second edge of the first scan area along a first scan direction A and from the first edge to the second edge of the second scan area along a second scan direction B, preferably, in no more than one full rotation of the rotatable mirror. The image processing system combines the partial images recorded therein to form a substantially complete image of the object corresponding to a full scan along the first scan direction A and the second scan direction B, respectively.

In yet another aspect, the present invention relates to a method for obtaining an image of an object placed on an at least partially transparent platform, wherein the at least partially transparent platform is defined by edge portions and has at least a first scan area and a second scan area.

In one embodiment, the method includes the step of forming a white area at least partially around the edge portions of the at least partially transparent platform with a plurality of markers. Each marker is placed at a predetermined position in the white area. Each of the plurality of markers is identifiable from the white area. In one embodiment, at least one portion of the white area is adapted for a standard white reference. The method further includes the step of sequentially scanning consecutive partial images of the object from the first scan area and the second scan area, respectively, where each of the consecutive partial images includes an image of at least one of the plurality of markers. Moreover, the method includes the step of using the image of the at least one of the plurality of markers in each of the consecutive partial images as a reference to combine the consecutive partial images so as to form a substantially complete image of the object corresponding to a full scan of the first scan area and the second scan area. The using step further includes the steps of correcting the formed image of the object, and trimming off an image of the white area and an image of the plurality of markers, respectively, from the corrected image of the object so as to obtain an image of the object.

In a further aspect, the present invention relates to a scanner for obtaining an image of an object placed on an at least partially transparent platform, wherein the at least partially transparent platform is defined by edge portions and has at least a first scan area and a second scan area.

The scanner, in one embodiment, has a white area formed at least partially around the edge portions of the at least partially transparent platform with a plurality of markers, where each marker is placed at a predetermined position in the white area, and the plurality of markers is identifiable from the white area. In one embodiment, the at least one portion of the white area is adapted for a standard white reference. Furthermore the scanner has optical means for sequentially scanning consecutive partial images of the object from the first scan area and the second scan area, respectively, wherein each of the consecutive partial images includes an image of at least one of the plurality of markers. In one embodiment, the optical means includes at least one image sensor. The at least one image sensor comprises one of a line sensor, an area sensor, and a combination thereof. The scanner also has an image processing system for using the image of the at least one of the plurality of markers in each of the consecutive partial images as a reference to combine the consecutive partial images so as to form a substantially complete image of the object corresponding to a full scan of the first scan area and the second scan area. The image processing system, in one embodiment, has a controller, which further performs the steps of correcting the formed image of the object by trimming off an image of the white area and an image of the plurality of markers, respectively, from the corrected image of the object so as to obtain an image of the object.

In yet a further aspect, the present invention relates to a method for obtaining an image of an object placed on an at least partially transparent platform, wherein the at least partially transparent platform has a plurality of scan areas. In one embodiment, the method has the steps of sequentially scanning consecutive partial images of the object from each of the plurality of scan areas, respectively, and combining the consecutive partial images to form a substantially complete image of the object corresponding to a full scan of the plurality of scan areas.

In one embodiment, the at least partially transparent platform further has a plurality of marker with each placed at a predetermined position. Each of the consecutive partial images includes an image of at least one of the plurality of markers. The combining step comprises the step of using the image of the at least one of the plurality of marker in each of the consecutive partial images as a reference.

In another aspect, the present invention relates to a scanner for obtaining an image of an object placed on an at least partially transparent platform, wherein the at least partially transparent platform has a plurality of scan areas. The scanner, in one embodiment, has an optical means for sequentially scanning consecutive partial images of the object from each of the plurality of scan areas, respectively, and an processing means for combining the consecutive partial images received from the optical means to form a substantially complete image of the object corresponding to a full scan of the plurality of scan areas.

In one embodiment, the optical means comprises at least one image sensor. The at least one image sensor comprises one of a line sensor, an area sensor, and a combination thereof. The at least partially transparent platform further has a plurality of marker with each placed at a predetermined position. Each of the consecutive partial images includes an image of at least one of the plurality of markers, which is used as a reference.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 27 shows schematically a process of combining two partial images scanned by a scanner according to one embodiment of the present invention: (a) two partial images scanned along a first scan direction A and a second scan direction B, respectively, (b) a combination of the partial images, and (c) a processed image of the partial images.

DETAILED DESCRIPTION OF THE INVENTION

Figure 1:
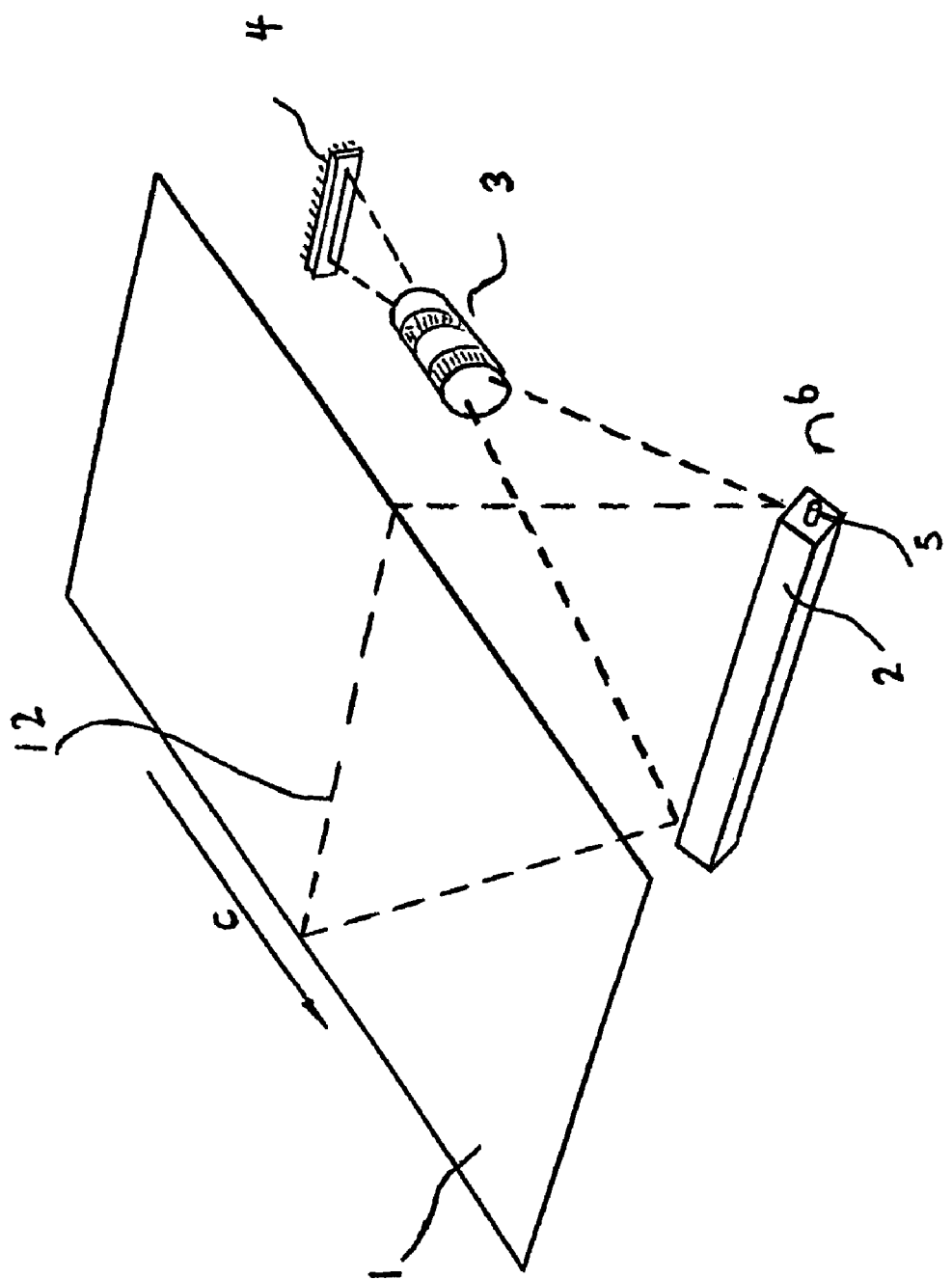
FIG. 1 shows a perspective view of a conventional rotatable mirror based scanner.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings 3–35. In accordance with the purposes of this invention, as embodied and broadly described herein, this invention, in one aspect, relates to a scanner for obtaining an image of an object placed on an at least partially transparent platform. The object includes a document, or the like.

Figure 3:
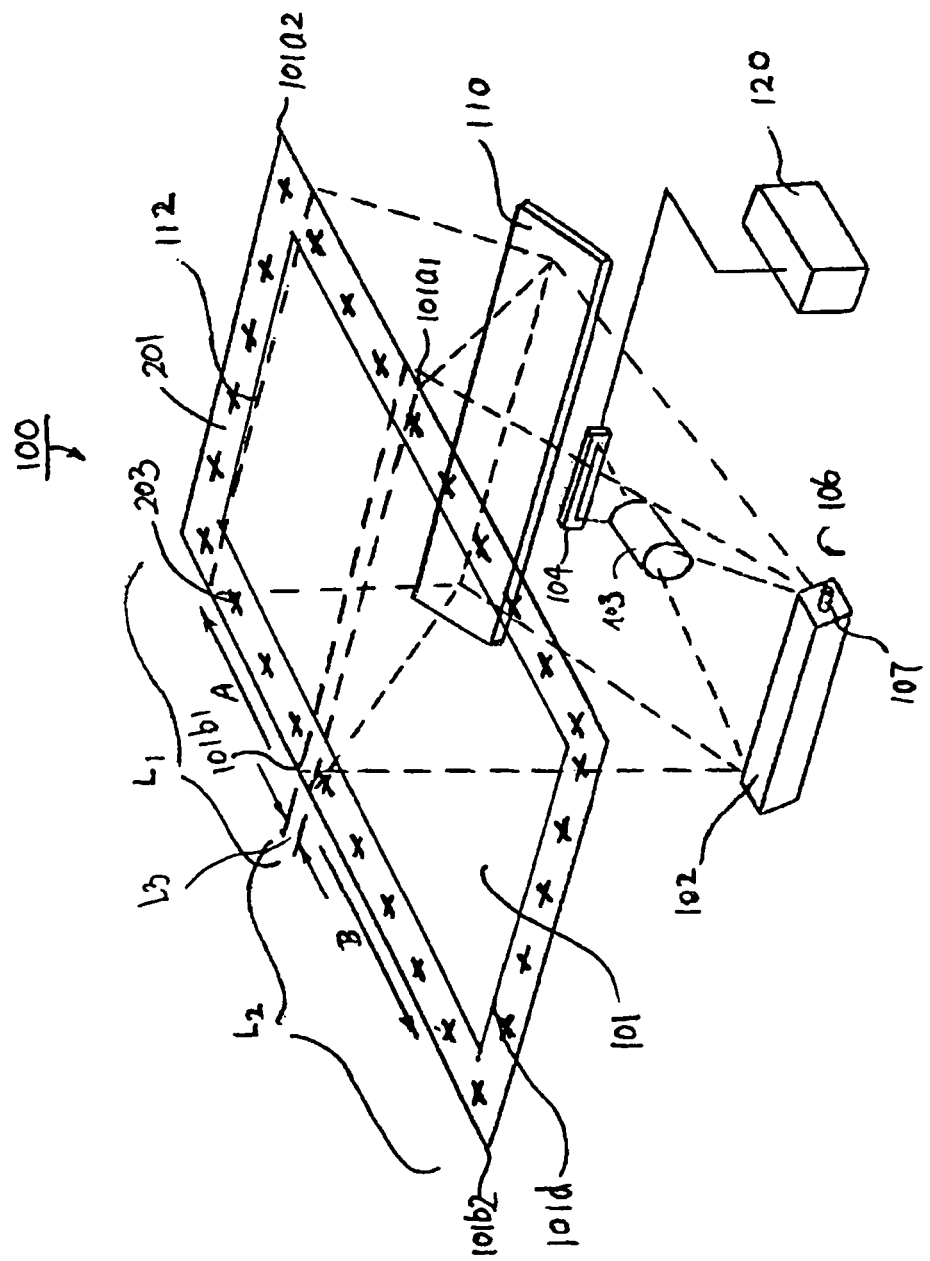
FIG. 3 shows schematically a perspective view of a scanner according to one embodiment of the present invention.
Figure 4:
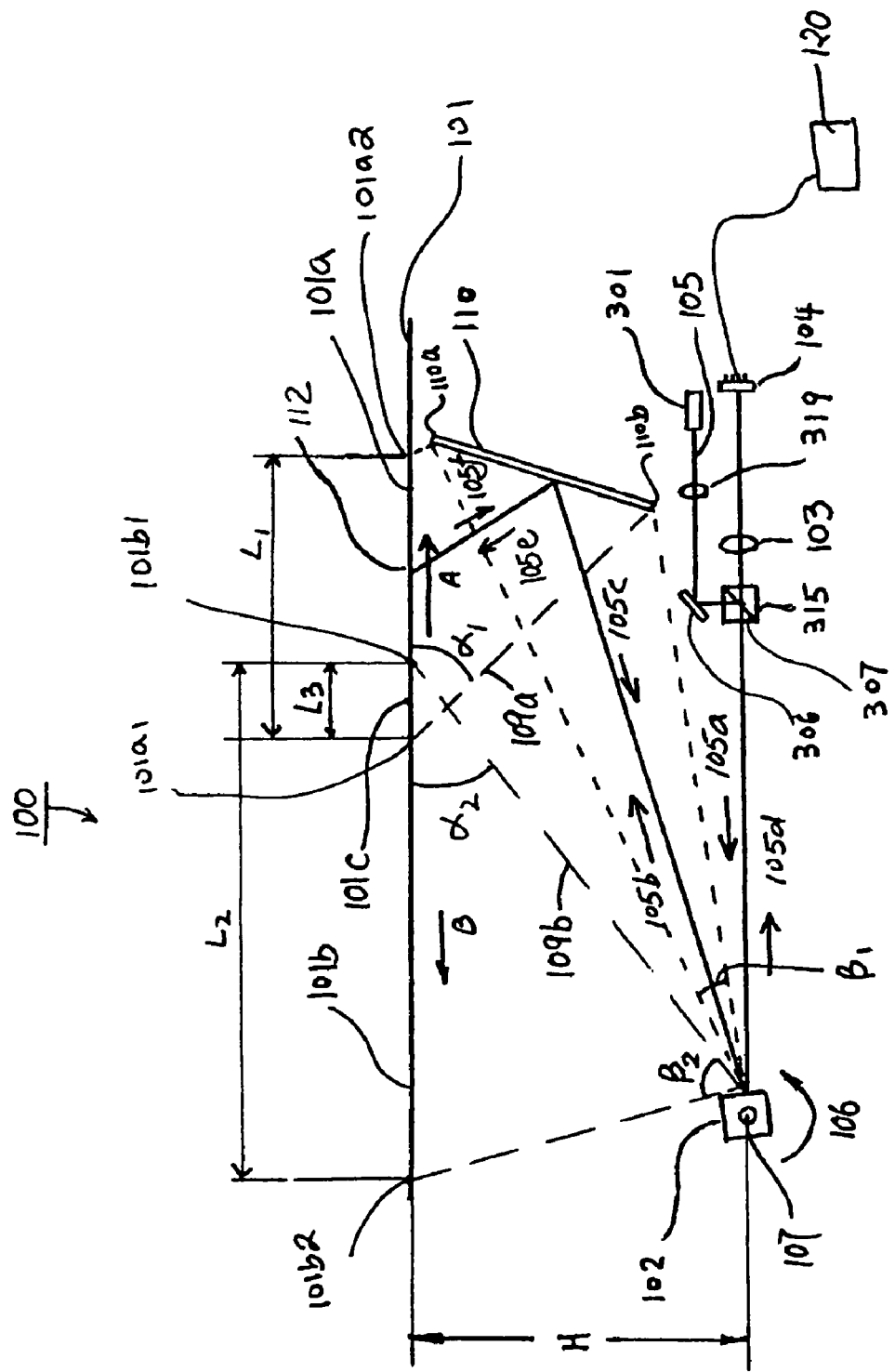
FIG. 4 shows schematically a side view of the scanner shown in FIG. 3, with an illustration of the optics of the scanner.

Referring to FIGS. 3 and 4, the scanner 100 according to one embodiment of the present invention includes an at least partially transparent platform 101, a light source 301, a rotatable mirror 102, a stationary mirror 110, an image sensor 104, a condenser lens 317, and an image processing system 120.

In the exemplary embodiment, the platform 101 has a first scan area 101a and a second scan area 101b. Each of the first scan area 101a and the second scan area 101b of the platform 101 has a first edge (101a1, 101b1) and a second edge (101a2, 101b2), respectively. A length and a direction from the first edge 101a1 to the second edge 101a2 of the first scan area 101a define a first scan length $L_1$, and a first scan direction A, respectively. Additionally, a length and a direction from the first edge 101b1 to the second edge 101b2 of the second scan area 101b define a second scan length $L_2$, and a second scan direction B, respectively. In one embodiment, the first scan area 101a and the second scan area 101b overlap so as to form an overlapped scan area 101c that has an overlapped scan length $L_3$. Accordingly, the platform 101 has an actual scan area that has a scan length $L=(L_1+L_2-L_3)$. The scan length L represents a maximal image length of an object that the scanner 100 can capture. As shown in FIG. 3, the platform 101 has a white area 201 formed at least partially around the edge portions 101d of the platform 101 with a plurality of markers 203. Each marker 203 is placed at a predetermined position in the white area 201. The plurality of the markers 203 are identifiable from the white area 201 and preferably in simple geometric shape, such as a cross. In one embodiment, the plurality of the markers 203 include cross markers. The platform 101 has a plate made of an at least partially transparent material. In one embodiment, the platform 101 has a glass plate or a transparent plastic plate.

The light source 301 is adapted for emitting a light 105. As shown in FIG. 4, the light source 301 is positioned such that when the light source emits a light beam 105, the light beam 105 is focused by a lens 319, deflected by a mirror 306, and then deflected by a beam splitter 315 to the rotatable mirror 102 along a first direction 105a. The light source 301 can be one of a laser, a fluorescent light tube, a light emitting diode (hereinafter "LED") assembly, a tungsten lamp, a tungsten halogen lamp, a halogen lamp, a Xenon lamp, or any combination thereof. For both the fluorescent light tube and Xenon lamp, a parabolic hood may need to be placed at a predetermined position for concentrating and collimating the emitted light in a predetermined direction. The Xenon lamp has a spectrum with wavelengths in a visible light range of about 400 nm to about 700 nm, and high output power. For example, Hamamatsu's Xenon short arc lamps, L2173 and L2193, (Hamamatsu Photonics, K.K., Hamamatsu, Japan), have an output power of 35 W. In one embodiment, the Xenon lamp is used to practice the current invention.

The rotatable mirror 102 is adapted for receiving the light 105 from the first direction 105a and reflecting the light to a second direction 105b for scanning a partial image of an object such as a document placed on the platform 101, and receiving the scanned partial image of the object from a third direction 105c and reflecting the scanned partial image of the object to a fourth direction 105d. In one embodiment, the third direction 105c is opposite to the second direction 105b, and the fourth direction 105d is opposite to the first direction 105a. In the illustrated embodiment as shown in FIG. 4, the scanned partial image of the object reflected to the fourth direction 105d is directed, via the beam splitter 315, to the condenser lens 103 and then to the image sensor 104. The rotatable mirror 102 includes a plane mirror having at least one reflecting surface, which is coupled to an image processing system 120. In one embodiment, the rotatable mirror 102 includes a polygon mirror. In operation, as shown in FIG. 4, the rotatable mirror 102 is rotated with a constant angular velocity at a predetermined direction 106 by a rotating means 107, such as a rotary motor. The angular velocity may be adjustable.

The stationary mirror 110 is placed on optical paths between the rotatable mirror 102 and the first scan area 101a of the platform 101 for receiving the light reflected from the rotatable mirror 102 at the second direction 105b and reflecting the light received from the rotatable mirror 102 to the first scan area 101a of the platform 101 at a fifth direction 105e for scanning a partial image of the object at a position 112, and receiving the scanned partial image of the object at the position 112 from a sixth direction 105f that is oppose to the fifth direction 105e and reflecting the scanned partial image of the object at the position 112 to the third direction 105c to the rotatable mirror 102. The stationary mirror 110, in one embodiment, includes a plane mirror. In another embodiment, the stationary mirror 110 includes a curved mirror.

Figure 2:
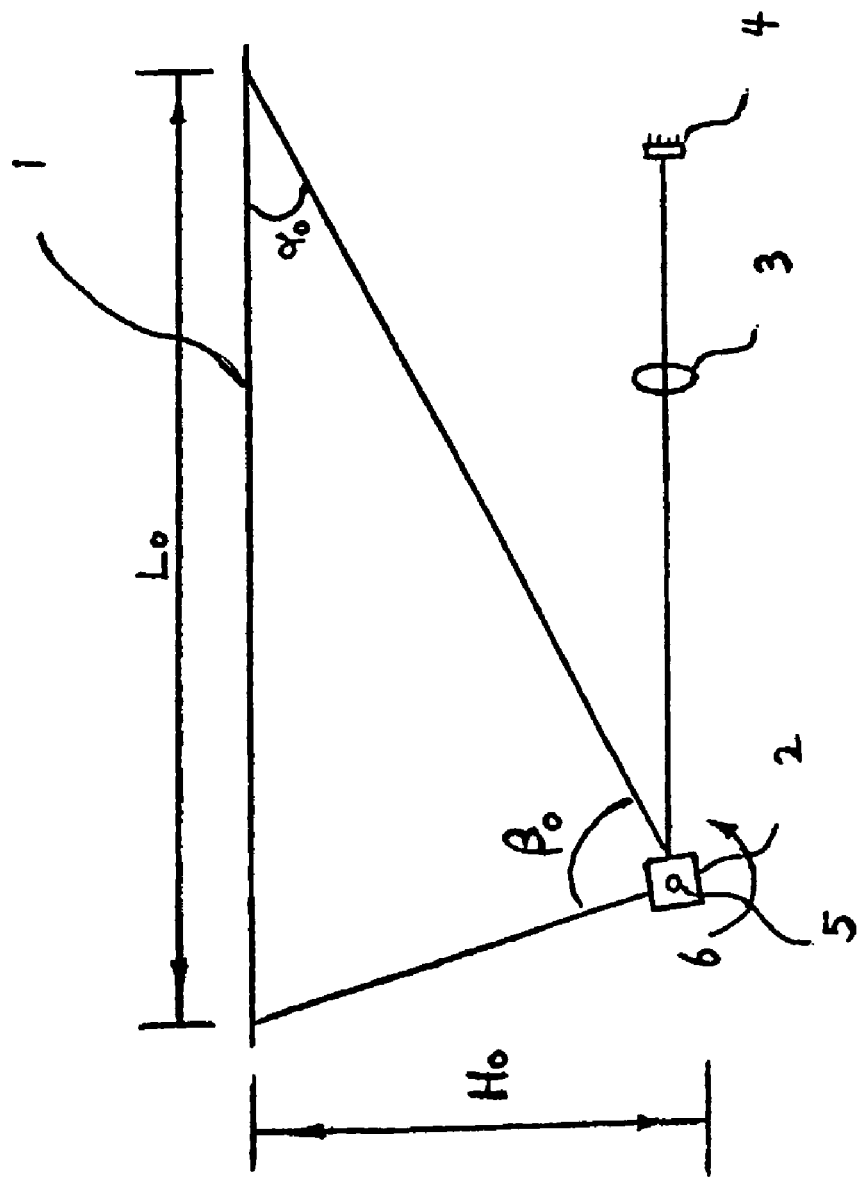
FIG. 2 shows schematically a side view of the scanner shown in FIG. 1.

The platform 101, the rotatable mirror 102 and the stationary mirror 110 are arranged such that when rotated, the rotatable mirror 102 causes the second direction 105b of the light sequentially scanning consecutive partial images of the object from the first edge 101a1 to the second edge 101a2 of the first scan area 101a along the first scan direction A and from the first edge 101b1 to the second edge 101b2 of the second scan area 101b along the second scan direction B, preferably, in no more than one full rotation of the rotatable mirror 102. In such an arrangement, a first angle $\alpha_1$ is defined between the platform 101 and an optical path 109a connecting a lower edge 110b of the stationary mirror 110 and the first edge 101a1 of the first scan area 101a. A second angle $\alpha_2$ is defined between the at least partially transparent platform 101 and an optical path 109b connecting the intersection point of the first direction 105a and the second direction 105b and the first edge 101b1 of the second scan area 101. For this embodiment, both of $\alpha_1$ and $\alpha_2$ are greater than a predetermined threshold angle $\alpha$. In one embodiment, the predetermined threshold angle $\alpha$ corresponds to a worst case of an image distortion of a scanner, and determines a minimal height of the scanner in practice. Comparing with a conventional scanner shown in FIGS. 1 and 2, the scanner of the present invention, as shown in FIGS. 3 and 4, is more compact than the conventional scanner such that $H < H_0$, provided both the invented scanner and the conventional scanner have the same scan length and the same worst image distortion, that is, $\alpha_1 = \alpha_2 = \alpha_0 = \alpha$.

The image sensor 104 is used for receiving the scanned partial images of the object that are reflected by the rotatable mirror 102 and passed through the condenser lens 103 from the fourth direction 105d and outputting electrical signals corresponding to the received scanned partial images of the object to the image processing system 120. The image sensor 104 can be a line sensor, an area sensor, or a combination thereof. For a scanner using a line image sensor, a line rate of the line sensor is essential to increase a scan speed of the scanner. For example, both line sensors μPD3747 and μPD8670 from NEC Corp. Tokyo, Japan, have 7400 pixels and a data output rate of 44 MHz, which is translated to a line rate of 5.95 kHz. These line sensors can be used for a scan speed of one page per second at a resolution of 300 dpi. Sensor DALSA IT-P1-2048 from DALSA Corp., has a line rate of 46 kHz, which can be used for a scan speed of two pages per second at a resolution of 600 dpi. Other commercial line sensors can also be employed to practice the current invention.

The image processing system 120 is used for receiving the electrical signals from the image sensor 104 and recording the electrical signals in a digital format. The image processing system 120 combines the partial images recorded therein to form a substantially complete image of the object corresponding to a full scan along the first scan direction A and the second scan direction B, respectively. The image processing can be implemented by either software or firmware and can be executed by computing devices communicating with the scanner physically located either inside the scanner or outside the scanner. In one embodiment, the image processing system 120 includes a computer having microprocessors and software packages installed. Commercial microprocessors, such as Silicon Optics sxW1/sxW1-LX (Silicon Optics Inc., Salt Lake City, Utah), are fast enough for the need of image processing within a fraction of a second. The software package, such as Halcon (MVTEC Software GmbH, München, Germany), can be utilized to process the electrical signals received from the image sensor 104 into a complete image of the object. Other microprocessors, software packages, and custom made software can also be employed to practice the current invention.

Figure 5:
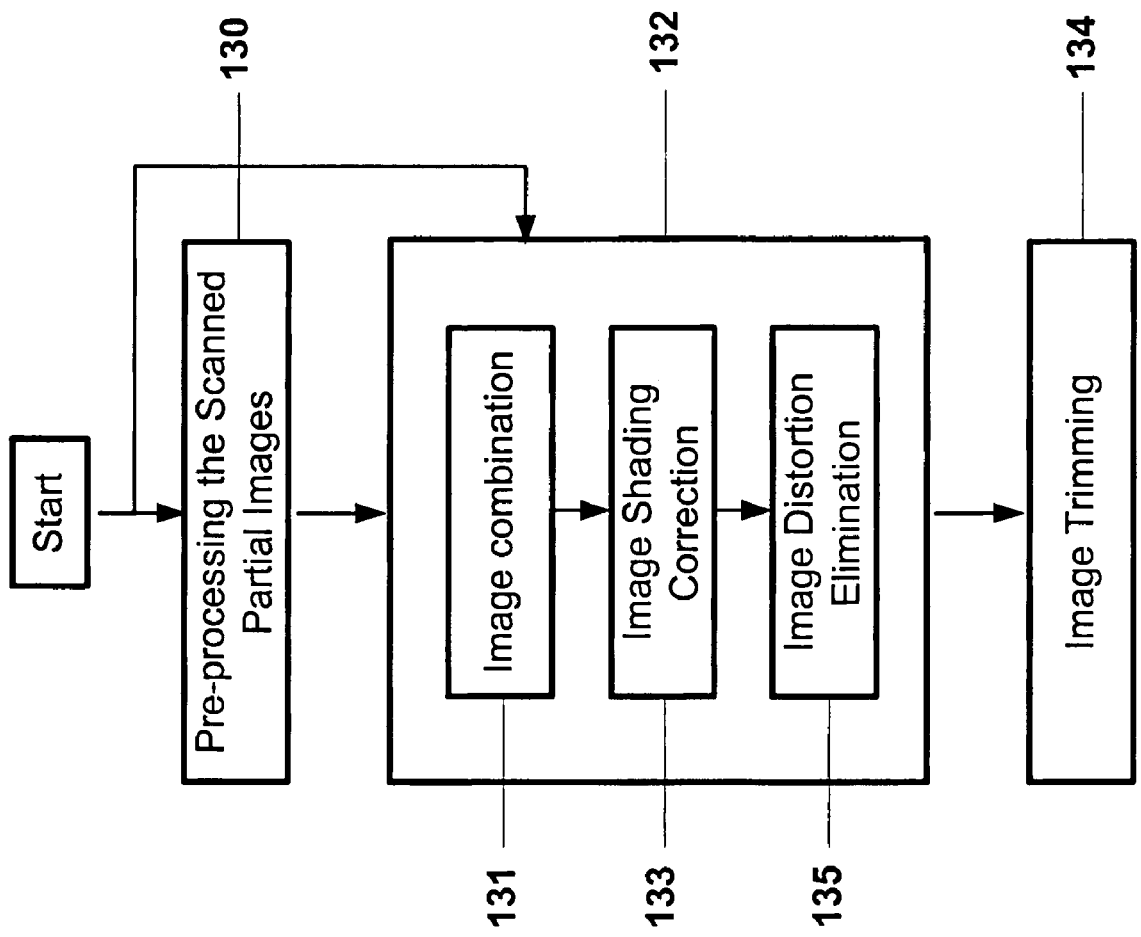
FIG. 5 shows a block diagram of image processing flow of a scanner according to one embodiment of the present invention.
Figure 6:
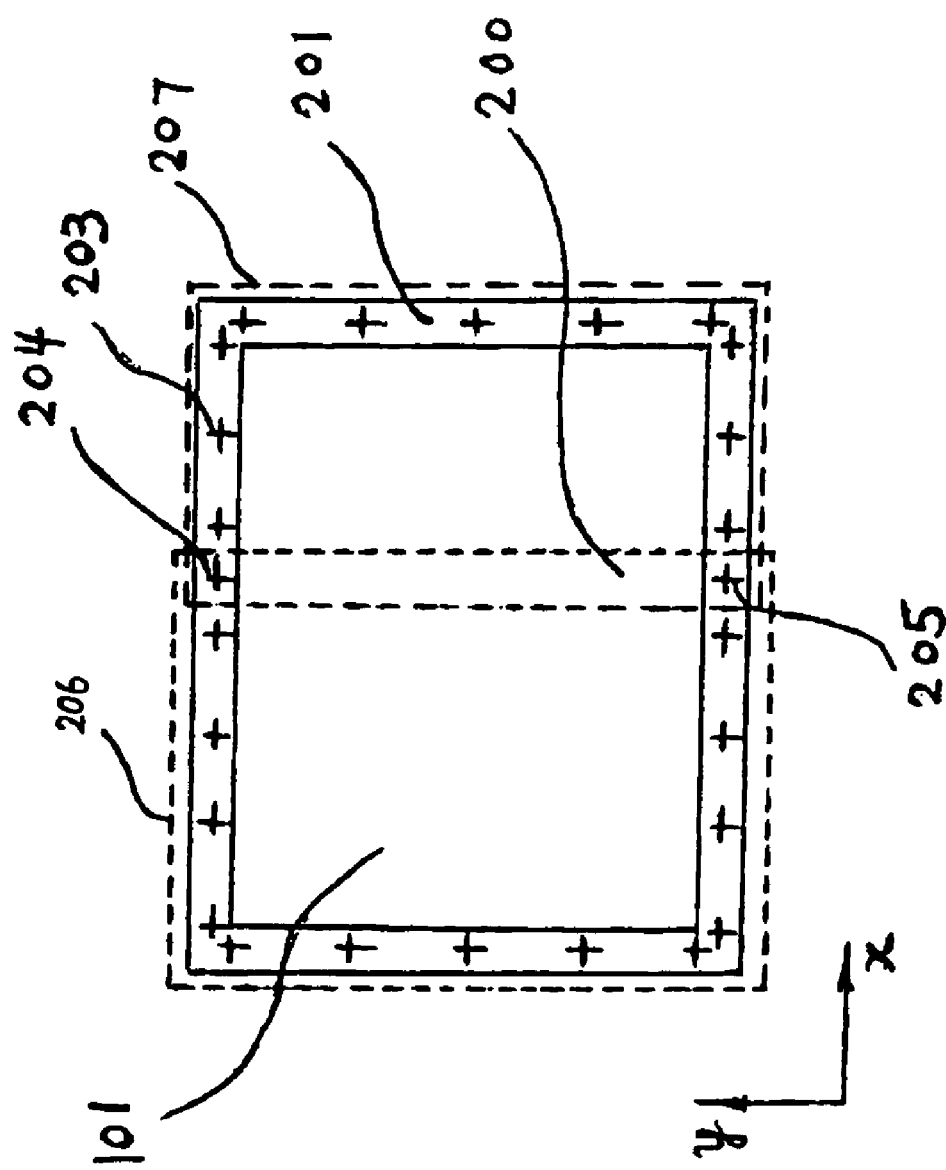
FIG. 6 shows schematically a bottom view of an at least partially transparent platform having a white area with a plurality of markers according to one embodiment of the present invention.

Referring to FIGS. 5 and 6, and particularly to FIG. 5 first, the image processing system according to one embodiment of the present invention performs the following steps: at step 130, the scanned partial images of the object received from the image sensor are pre-processed, where isolated black pixels are whitened and isolated white pixels are blackened to extract high gradient images called reference images. At step 132, the images are corrected using the reference images. The image correcting step 132 includes the image combining step 131, the image shading intensity correcting step 133 and the image distortion eliminating step 135. The order of the image processing flow among these three steps 131, 133 and 135 may vary in different embodiments. In any order, the scanned partial images from a document need to be combined together, shading intensity of the images need to corrected, and distortions of the images need to be eliminated. FIG. 5 shows one of several possible image processing flows inside the image processing system 120 of the scanner shown in FIGS. 3 and 4.

To reduce time needed for image processing, the plurality of markers placed on the white area of the platform 101 may be, used for fast, reliable, and precise partial images combination into one complete image, timing of the angular position of the rotary mirror, as well as image distortion elimination. The standard whiteness of the white area is used for shading intensity reference for shading correction. For example, as shown in FIG. 6, overlapped portions of scanned partial images 206 and 207 that are near common markers 204 and 205 of scanned partial images 206 and 207 are processed into reference images. Other portions can also be processed into reference images. There is a one-to-one correspondence between pixels in the extracted reference images and pixels in the originally scanned partial images. A pixel in the reference image corresponds to a pixel in the original scanned image in the same position. Proper aligning and combining of the reference images lead to desired alignment and combination of the originally scanned partial images. Because of the simplicity and the expected shape of the markers in the overlapped portions of the reference images, the image processing to align and combine the reference images so as to align and combine the originally scanned partial images can be executed very fast and reliably. The reference images as described above are optional in the image processing system of the present invention. The scanned partial images of the object can also be aligned and combined directly using the plurality of markers 203 on the white area 201.

The shading correction is done in the shading intensity correcting step 133. Because there are several partial images and different portions of the partial images are obtained at different viewing angles as well as different distances, shading intensity is different in different portions in the same or different partial images. In one embodiment, the shading intensity correction is performed during the signal readings from the original partial image, based on shading data obtained by reading a reference white area with a plurality of markers illustrated in FIG. 6. For the reasons that are similar to the cause of shading variations, different portions of the scanned partial image have different distortions and the image distortions need to be eliminated in the image distortion eliminating step 135. Finally, the image of the white area is trimmed off from the processed image in the image trimming step 134 so as to obtain a complete, desired image of the object.

For a flatbed scanner, during image scanning, a document needs to be put on and taken off the scanner manually, that is, there is a scanning interruption. The scanning time for the scanner also includes the time of putting the document on and taking the document off the scanner manually. Thus, the average scan speed for scanning a large volume of documents is slower than the scan speed for scanning a few pages of documents. For example, without a scanning interruption, a scanner according to one embodiment of the present invention may continuously scan 20 pages of documents in 10 seconds, or 120 pages of documents in 1 minute. Accordingly, the scanning speed of the scanner is two pages per second. However, if the scanner is manually operated for about 10 minutes, with about 5 minutes interruption, only can a total of 600 pages of documents be scanned. The overall, effective scanning speed of the operation for the large volume of documents then becomes one page per second. Although the numbers described above are hypothetical, they serve to illustrate the fact that the scan speed of large volume scanning is substantially slower than that for scanning a few pages of documents. When scanned partial images are temporarily stored in memory buffers in an image processing system of a scanner according to one embodiment of the present invention, the image processing system can use the processing power of a computer, which is coupled to the scanner, for example, via USB ports, or wireless protocols. The computer can be used for purposes other than the image processing as well, not necessarily dedicated only to the usage of the scanner. Accordingly, the cost of scanner is further reduced.

Figure 7:
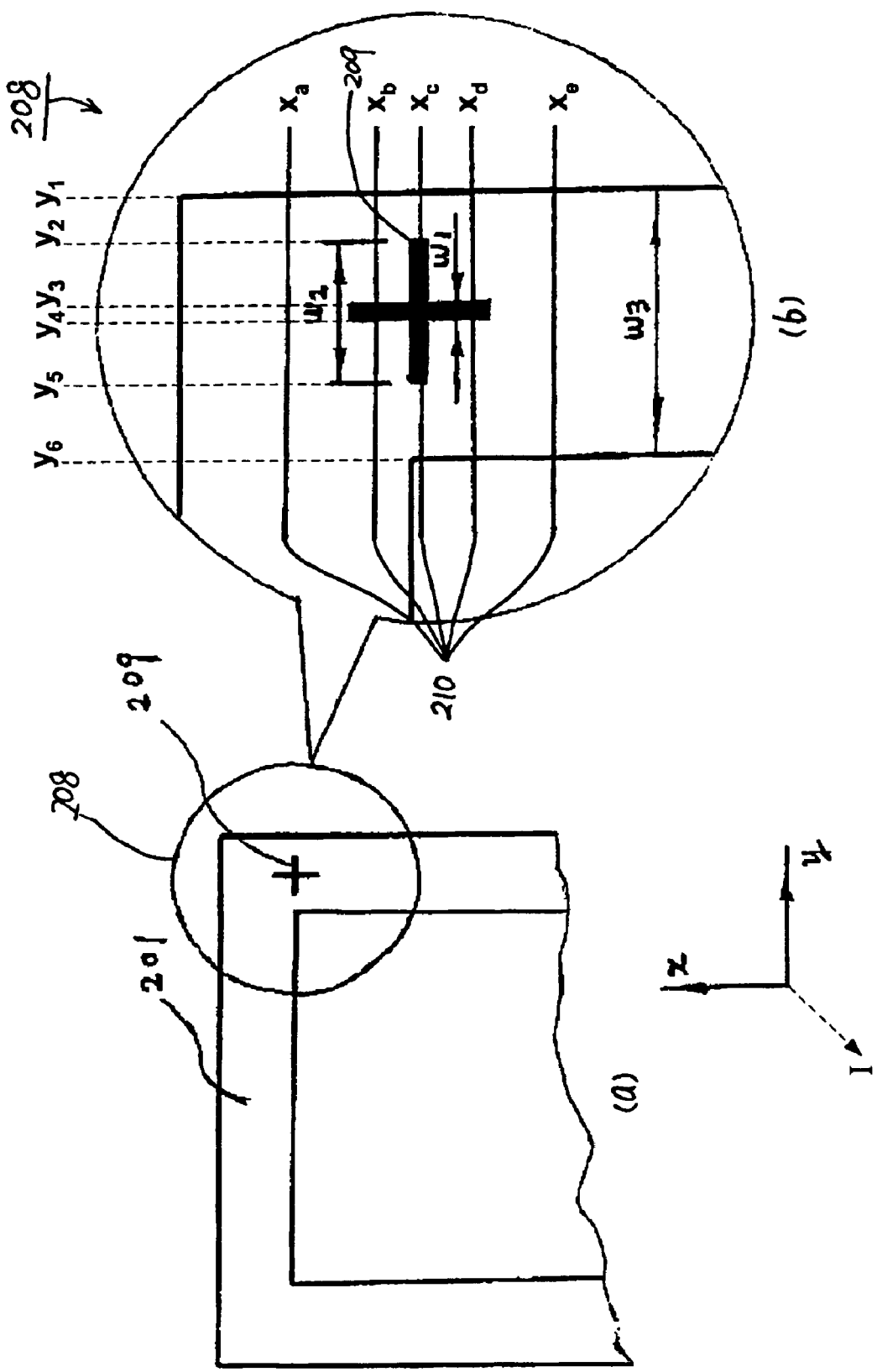
FIG. 7 shows schematically a process of identifying a position of a scan line using a marker according to one embodiment of the present invention: (a) a portion of an at least partially transparent platform with a marker, and (b) an enlarged image of the marker with the scan line at different position.
Figure 8:
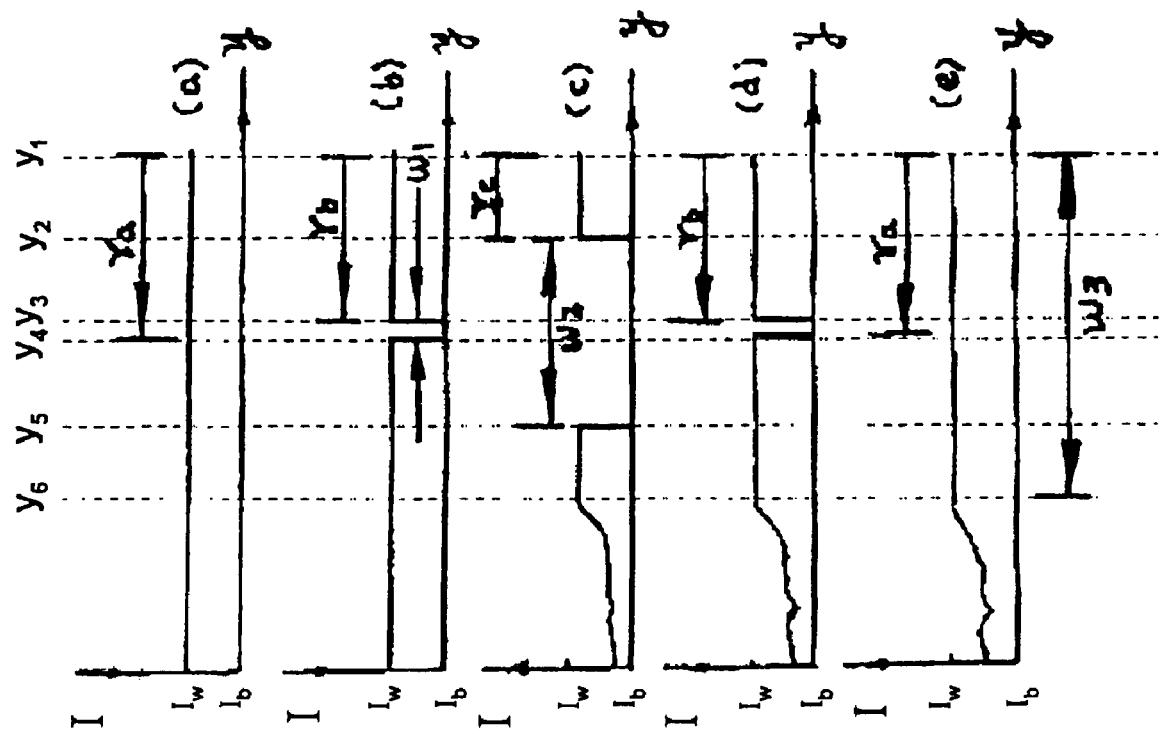
FIG. 8 shows electronic signals corresponding to the image of the marker of FIG. 7: (a)–(d) are corresponding electronic signals of the image of the marker at different positions, respectively.

To further reduce the cost of processing, the plurality of markers, as shown in FIG. 6, each is preferred to be in a simple and uniformed geometric shape, such as a cross. In such an arrangement, as illustrated in FIG. 7 and FIG. 8, only a few pre-defined simple image signal patterns need to be stored in the image processing system for comparison with the actual signal taken from the scan line, for example, scan line 112 in FIGS. 3 and 4, for recognizing the markers and for recognizing the relative position of the scan line relative to the markers. The simple shape of markers can reduce the amount of the image recognition work in the image-processing system. Alternatively, markers can take different shapes.

This approach of timing the rotation of the rotatable mirror in scanning is quite tolerant on geometric errors of the structure of the scanner due to imprecise manufacturing process or deformation of materials after years of use. Also, the motor (not shown) to drive the rotatable mirror does not need to be precisely coordinated with the scanning process. The only requirement for the driving motor is to rotate at a steady angular speed. Thus, the use of expensive step motor and control circuitry can be avoided. Therefore, the image scanner of the present invention can be made with low cost and is quite durable.

Also, to allow easy synchronization between physical mirror rotation and electronic image processing, an image can be read in more than one scan. This is possible because the rotation of the rotatable mirror can accomplish scan speed much faster than expected by the user. So, using two or more scans to accomplish a scan of a document is still fast enough for the user. The first scan can be used to recognize the positions of markers and to synchronize the image processing. The second scan can be used to actually read in images for processing. Because the rotatable mirror is rotating at a steady angular speed, when the first scan is completed, the starting time for the second scan can be easily and precisely calculated. The physical rotation of the rotatable mirror and the image processing of the scanned image therefore can be synchronized in the second scan. Optionally, if two scans are used for capturing one image of the scanned document, both the first scan and the second scan can capture the image of the document. The image captured in the first scan can serve as "pre-scan image", allowing the image-processing unit to calculate the necessary adjustment for capturing the second scan. This approach has some additional benefits. The calculated adjustment of light intensity can be used to change the illumination light intensity for the second scan. For example, if an LED is used as light source, because the LED can be turned on and off quickly, its light intensity can be changed quickly by supplying different voltages of electric power. Thus, the quality of the image captured by the second scan can be improved.

In the present invention, for methods used for scan line locating and image composition, there is no need for relatively expensive step motor, complicated mechanism for angular position and speed measurement, as well as speed control. The main requirement for the rotation motor of the rotatable mirror is that it can rotate at an even speed. The burden of synchronization between the angular position of the rotatable mirror and the imaging scanning process is placed upon the image processing system, which locates the positions of scan lines by recognizing the positions of markers. This arrangement uses minimal number of physical components and lowers the requirements on the precision of manufacturing process of the scanner of the present invention.

Further details of the utilization of the simple shape of markers for effectively processing the scanned images are described infra.

Referring now to FIGS. 7 and 8, and first to FIG. 7, a partial image of a scan area 101 with a white area 201, a marker 209 and an enlarged image of the circled area 208 in FIG. 7(a) with x-y coordinates are respectively shown. Coordinates $x_a$, $x_b$, $x_c$, $x_d$, and $x_e$ are positions of scan lines 210, respectively. Width $w_3$ is the width of the white area 201. Width $w_1$ is the width of one of the arms of the cross-shaped marker 209. Width $w_2$ is the width of the cross of the cross-shaped marker 209. Coordinates $y_1$, $y_2$, $y_3$, $y_4$, $y_5$, and $y_6$ are positions of the outer edge of the white area 201, outer edge of the horizontal arm of the marker 209, outer edge of the vertical arm of the marker 209, inner edge of the vertical arm of the marker 209, inner edge of the horizontal arm of the marker 209, and the inner edge of the white area 201, respectively. FIGS. 8(a)–8(e) show I-Y plane views of scan lines $x_a$, $x_b$, $x_c$, $x_d$, and $x_e$ of FIG. 7, respectively, where I represents the shading intensity. Assuming the image processing starting at position $y_1$ and runs in opposite direction of y-axis, the processing time needed for recognizing that the scan line is at position $x_a$ is $t(r_a)$, where $r_a$ is the number of pixels between the starting position $y_1$ and position $y_4$ and is much smaller than the numbers of pixels on the entire scan line at position $x_a$. Because image-processing time is proportional to the number of pixels needs to be processed, less pixels means less processing time. More specifically, as soon as the processing system checks the signal taken from the scan line up to distance $y_4$ from position $y_1$, the processing logic should have recognized that the scan line is not going to hit the marker 209 as shown in FIG. 7.

Since $r_c < r_b < r_a$, as shown in FIG. 8, the processing times for recognizing scan lines at the positions $x_b$ or $x_c$ are even shorter than $t(r_a)$. As illustrated in FIG. 7, if the scan line 210 at the last position does not hit the marker 209 and at the current position $x_b$ of the scan line 210, the processing encounters a signal intensity change on the scan line 210 from white to black, illustrated as $I_w$ to $I_b$ in FIG. 8, respectively, at distance $y_3$ from $y_1$. The processing logic can then recognize that the scan line is at the top end of the marker 209 as shown in FIG. 7. Similar decision logic can be used to determine the locations of scan lines $x_c$, $x_d$, and $x_e$.

The scanned partial images themselves are also constructed using signals from the line sensor as the scan line passes over the entire scan area along both the scan directions A and B as shown in FIG. 3. Because of the amount of image processing involved in the scanner of the present invention, reducing the amount of computation is of significance. FIGS. 7 and 8 show a way to utilize the marker 209 on the white area to detect the position of the scan line 210. When the scan line 210 is at position $x_a$, the entire scan line 210 is on the white area 201. As shown in FIG. 8(a), an image signal taken on the scan line 210 at the reflective surface of the white area 201 is white with an intensity of $I_w$.

When the scan line 210 is at position $x_b$, the scan line 210 crosses a part of the marker 209. As shown in FIG. 8(b), the signal taken from the scan line 210 at the reflective surface of the white area 201 has a dark segment whose width is equal to the width $w_1$ of the marker 209. At position $x_c$, the scan line 210 crosses a middle part of the marker 209. As shown in FIG. 8(c), the signal taken from the scan line 210 has a dark segment whose width $w_2$ is equal to the width $w_2$ of the entire marker as illustrated in FIG. 7. In FIGS. 7 and 8, $w_3$ represents the width of the white area 201. As shown in FIG. 8(d), at position $x_d$, the signal taken from the scan line 210, when restricted to the area of the white area 201, has the same shape as it was at position $x_b$. In FIG. 8(e), at position $x_e$, the signal taken from the scan line 210, when restricted to the area of the white area 201, has the same shape as it was at position $x_a$.

Because the positions and shape(s) of markers are predetermined and stored in the image processing system, the markers can be used to quickly and reliably to detect the x-coordinates as well as the y-coordinates of any pixel on the scan line. More specifically, if the position of a scan line relative to the markers is known, by interpolation, position of any pixel on the scan line is also determined.

Once the coordinates of each pixel in the scan line and the coordinate of scan line are determined, it is a quick and straightforward process to combine scan lines into a two dimensional image. The processing cost of composing a two dimensional image is low because the position and shape of markers are known to the image processing system.

Figure 9:
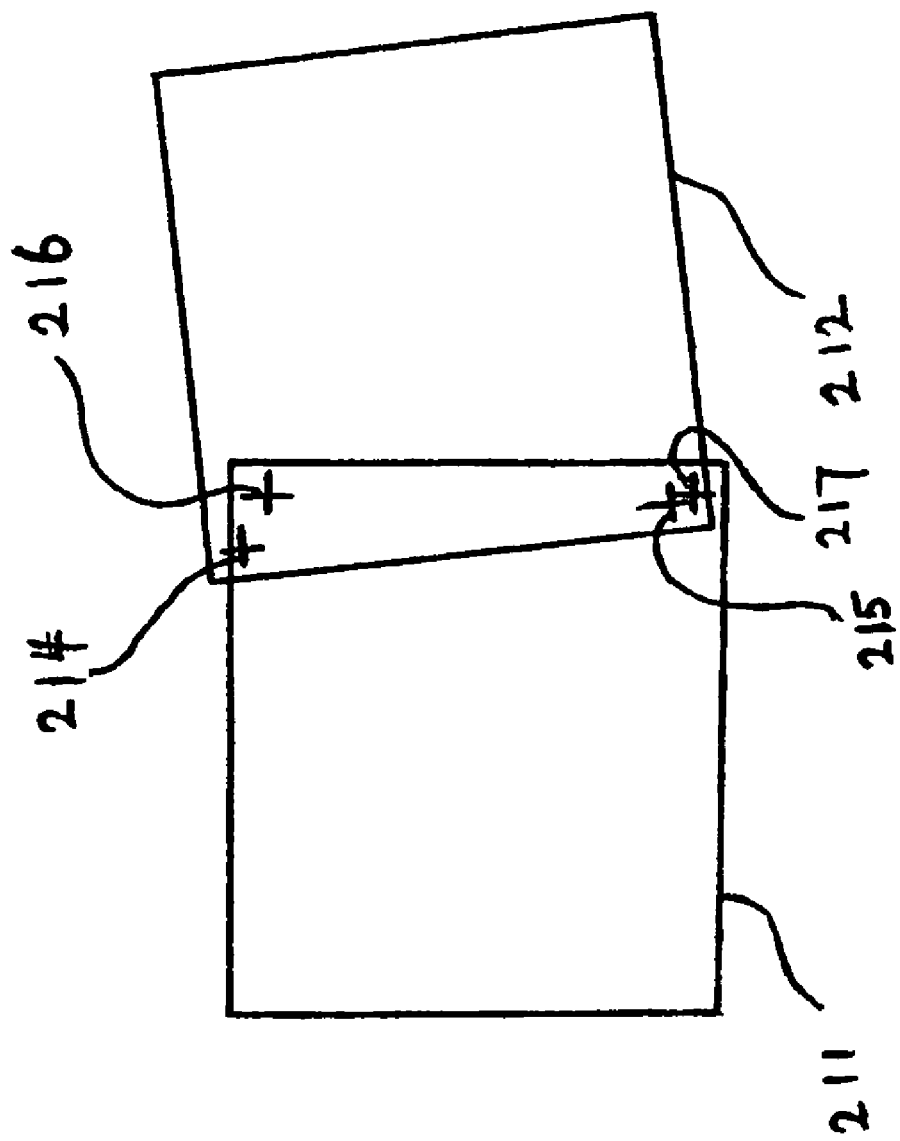
FIG. 9 shows schematically a pre-alignment of two partial images using the images of common markers according to one embodiment of the present invention.

Referring to FIG. 9, the two partial images 211 and 212 scanned from the scanner according to one embodiment of the present invention are pre-aligned by the image processing system. The scanned partial image 211 has marker images 214 and 215, which respectively correspond to the markers 204 and 205 in the corresponding white areas of the overlapped scan area 200 as shown in FIG. 6. The scanned partial image 212 has marker images 216 and 217, which respectively correspond to the same markers 204 and 205 in the corresponding white areas of the overlapped scan area 200 as shown in FIG. 6. The marker images 214 and 215 in the scanned partial images 211 and the corresponding marker images 216 and 217 in the scanned partial images 212 are used to further align the two images 211 and 212. In a perfect alignment, marker images 214 and 216 should overlap completely and marker images 215 and 217 should also overlap completely. The simple geometric shape and strong color contrast of the markers with its surrounding white area enable the partial images 211 and 212 to be quickly and reliably aligned in the combining step 131 of FIG. 5.

The partial image combining process can also be performed in a similar way if the two partial images do not share images of common markers such as marker 204 and 205 in FIG. 6.

Figure 10:
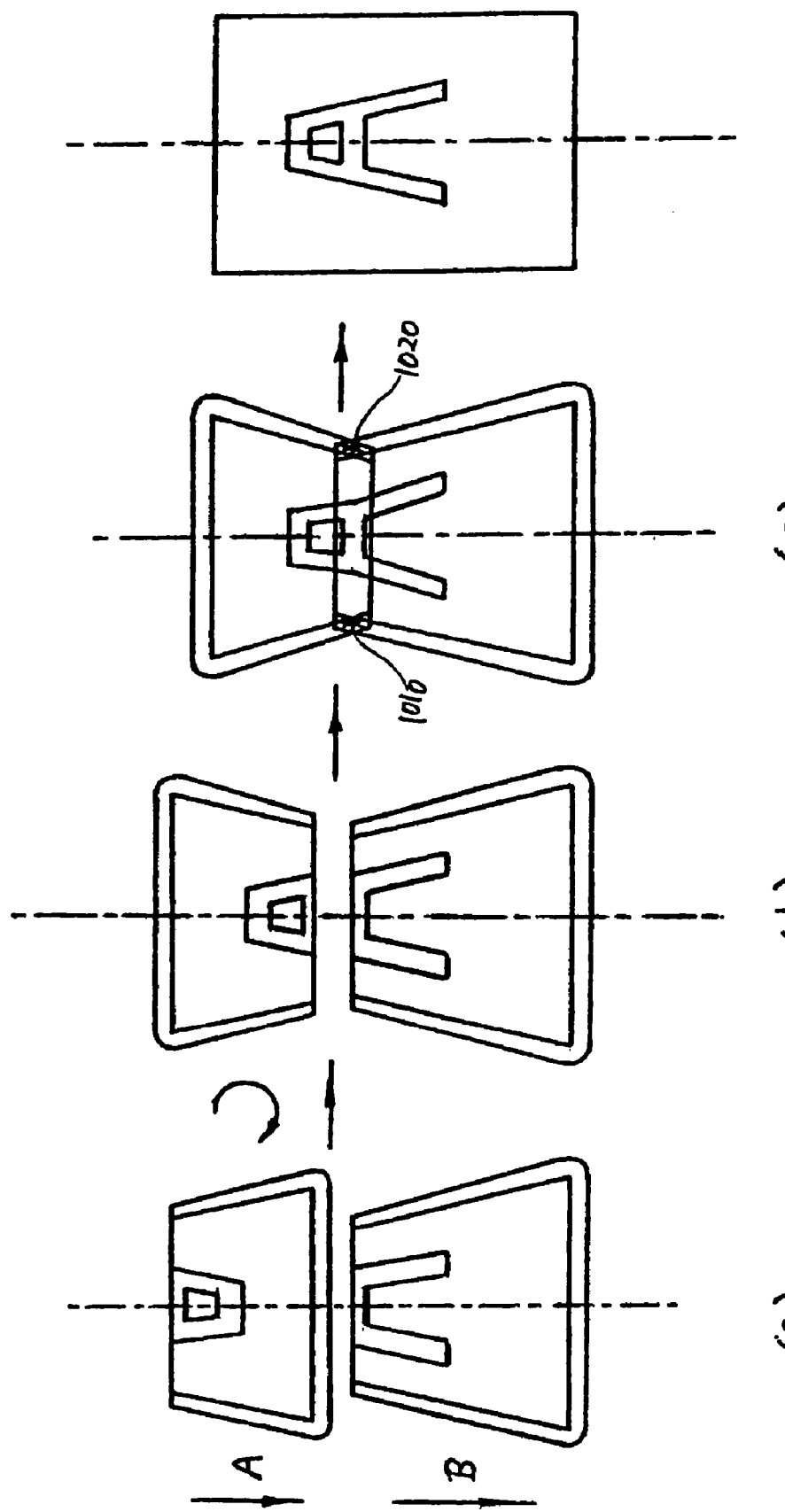
FIG. 10 shows schematically a process of combining two partial images scanned by a scanner according to one embodiment of the present invention: (a) two partial images scanned along a first scan direction A and a second scan direction B, respectively, (b) a pre-alignment of the partial images, (c) a combination of the partial images, and (d) a processed image of the partial images.

FIG. 10 further illustrates the combining process of a pair of partial images obtained from a single scan cycle of a document in the embodiment of scanner shown in FIG. 3 and FIG. 4. As scanning progresses, the image signal comes into the image processing system in the order as indicated by the directions of A and B. In other words, image scanning progresses in the directions of A and B. Scans A and B can be accomplished within a single rotation of the rotatable mirror. Depending upon individual implementation, either A can be scanned before B or B can be scanned before A within a single rotation of the rotatable mirror 102. As shown in FIG. 4, scan A obtains the image through a rotatable mirror 102 and a plane mirror 110. So, scan A generates a flipped image as shown in FIG. 10(a). The flipped image need to be flipped over again, as shown in FIG. 10(b), and then be combined with the other partial image obtained through scan B with the assistance of markers such as 1010 and 1020 on the joining white area, as shown in FIG. 10(c). Finally, the distortion of the image is eliminated as shown in FIG. 10(d).

Referring to FIG. 5, the elimination of distortion is done in the distortion-eliminating process 135.

Figure 11:
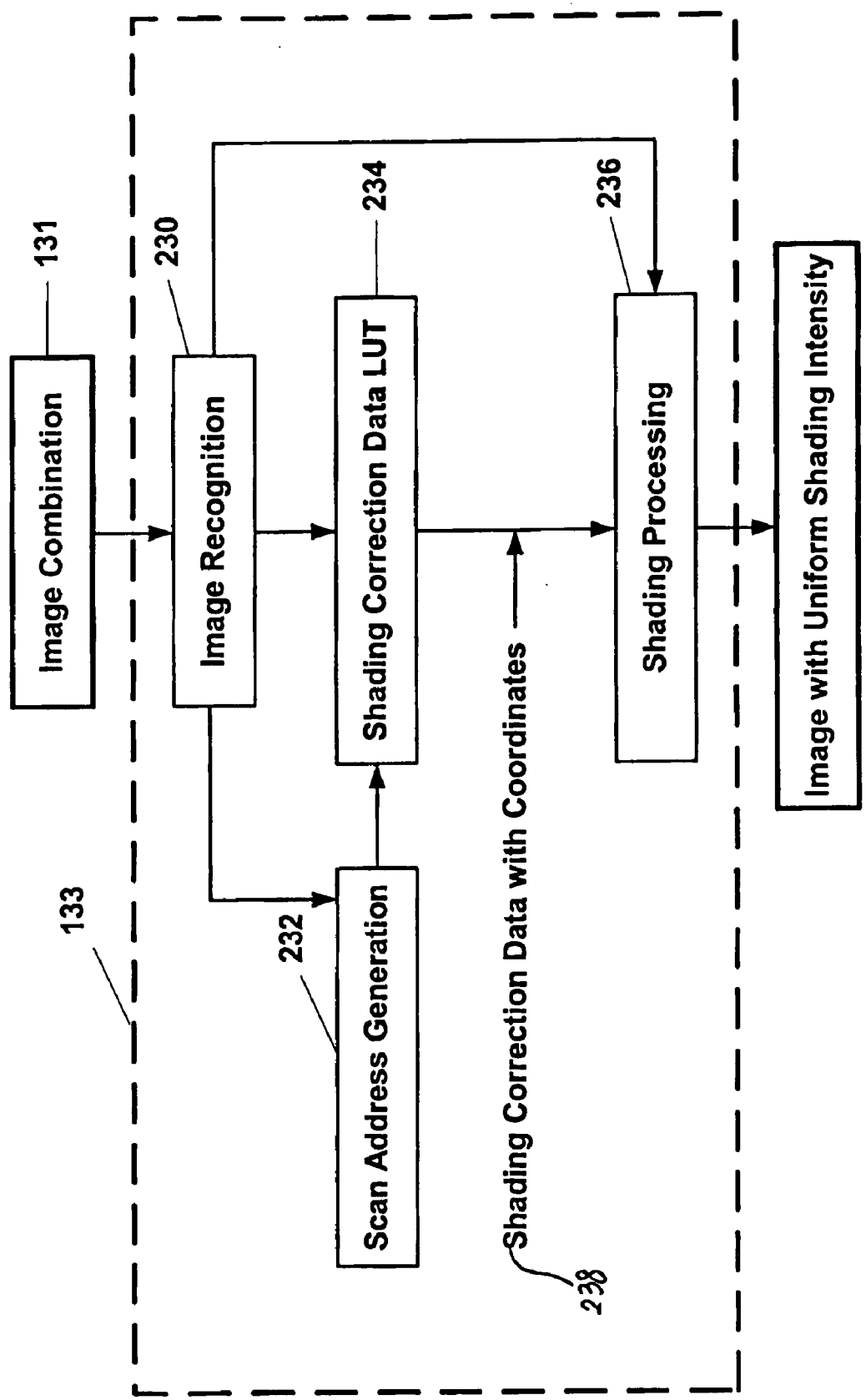
FIG. 11 shows schematically a flowchart of a shading intensity correction process of an image.

Referring in general to FIGS. 11–15 and first to FIG. 11, it shows a flowchart of one of three systems provided for red-green-blue (hereinafter "RGB") model in shading intensity correcting process 133 of FIG. 5. According to the exemplary embodiment shown in FIG. 5, the image signal outputting from the line sensor includes two-dimensional partial images, which are combined into a complete scanned image of a document through the image combining process 131 of FIG. 5. As shown in FIG. 11, the shading intensity correcting process 133 includes image recognizing process 230, scan address generating process 232, shading correction data lookup table (hereinafter "LUT") 234, shading correction data with coordinates 238, and the shading processing 236. In one embodiment, the image recognizing process 230 serves to identify markers and their positions on the image to be processed. Then, the positions of the markers are used in scan address generating process 232 to calculate the coordinates for each pixel on the image. The calculated coordinates are translated into addresses in the shading correction data LUT 234. The looked up shading correction data along with the coordinates of the shading correction data 238 are sent to shading processing unit 236 where the actual shading data from the image of the white area are used to calculate the amount of correction needed and the shading intensity of the image is corrected accordingly.

Figure 12:
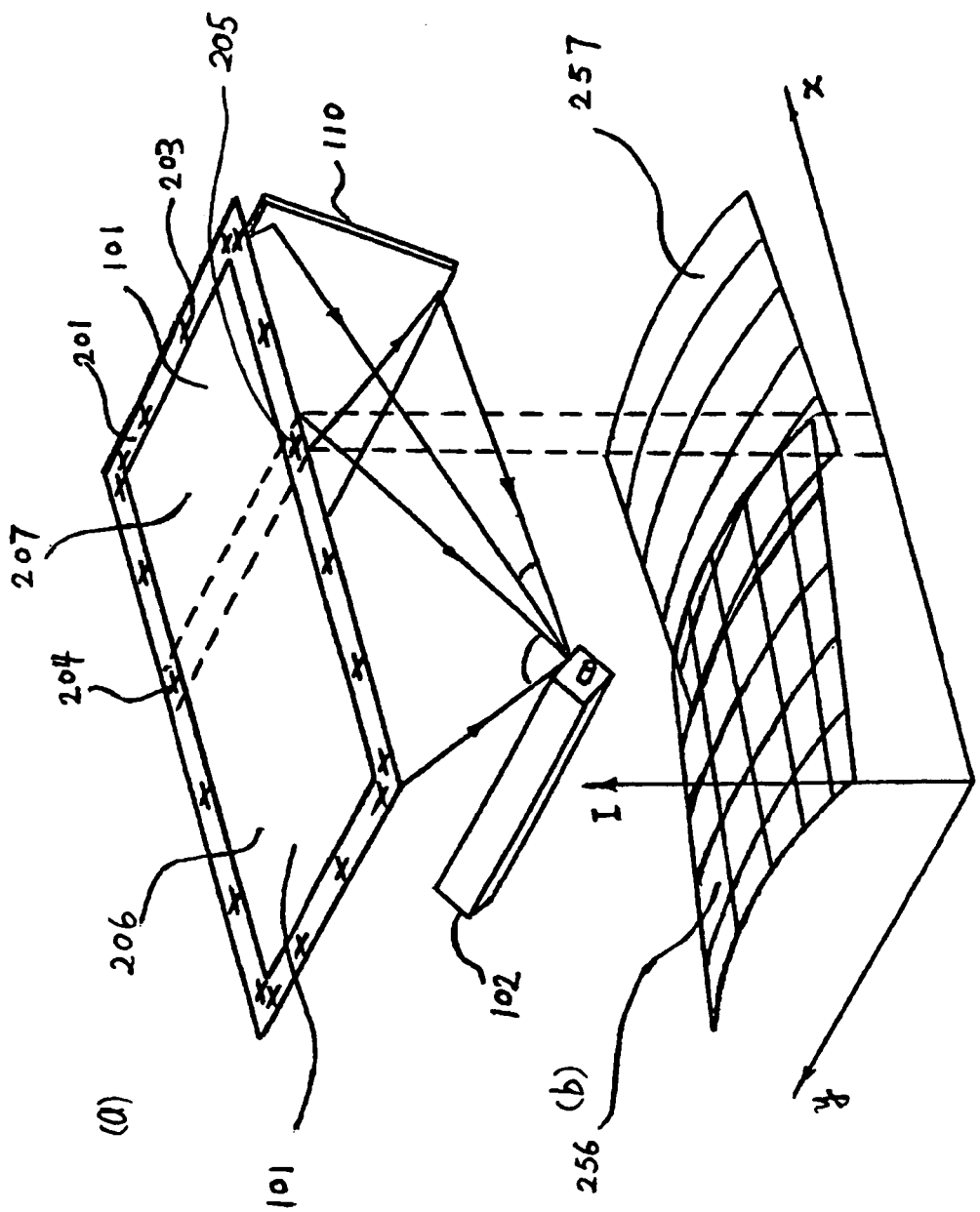
FIG. 12 shows schematically (a) a perspective view of a scanner s according to one embodiment of the present invention, and (b) a 3D shading intensity distribution of two partial images scanned by the scanner.

The signals of the scanned image of a document are subjected to a shading correction in a shading correcting process 133 shown in FIG. 11. The computation of the shading correction process is further illustrated in FIGS. 12 to 15. FIG. 12(a) shows a perspective view of the scanner according to the embodiment of the present invention as shown in FIGS. 3 and 4. While FIG. 12(b) schematically illustrates the shading intensity in the scan area 101 of the scanner. FIGS. 12(a) and 12(b) are aligned to show the relationship between the regions 206 and 207 of the scan area 101 and the corresponding shading intensity surfaces 256 and 257. The shading intensity surface 256 represents the shading intensity in region 206, including the white area at the edge of 206. The shading intensity surface 257 represents the shading intensity in region 207, including the white area at the edge of 207.

Figure 13:
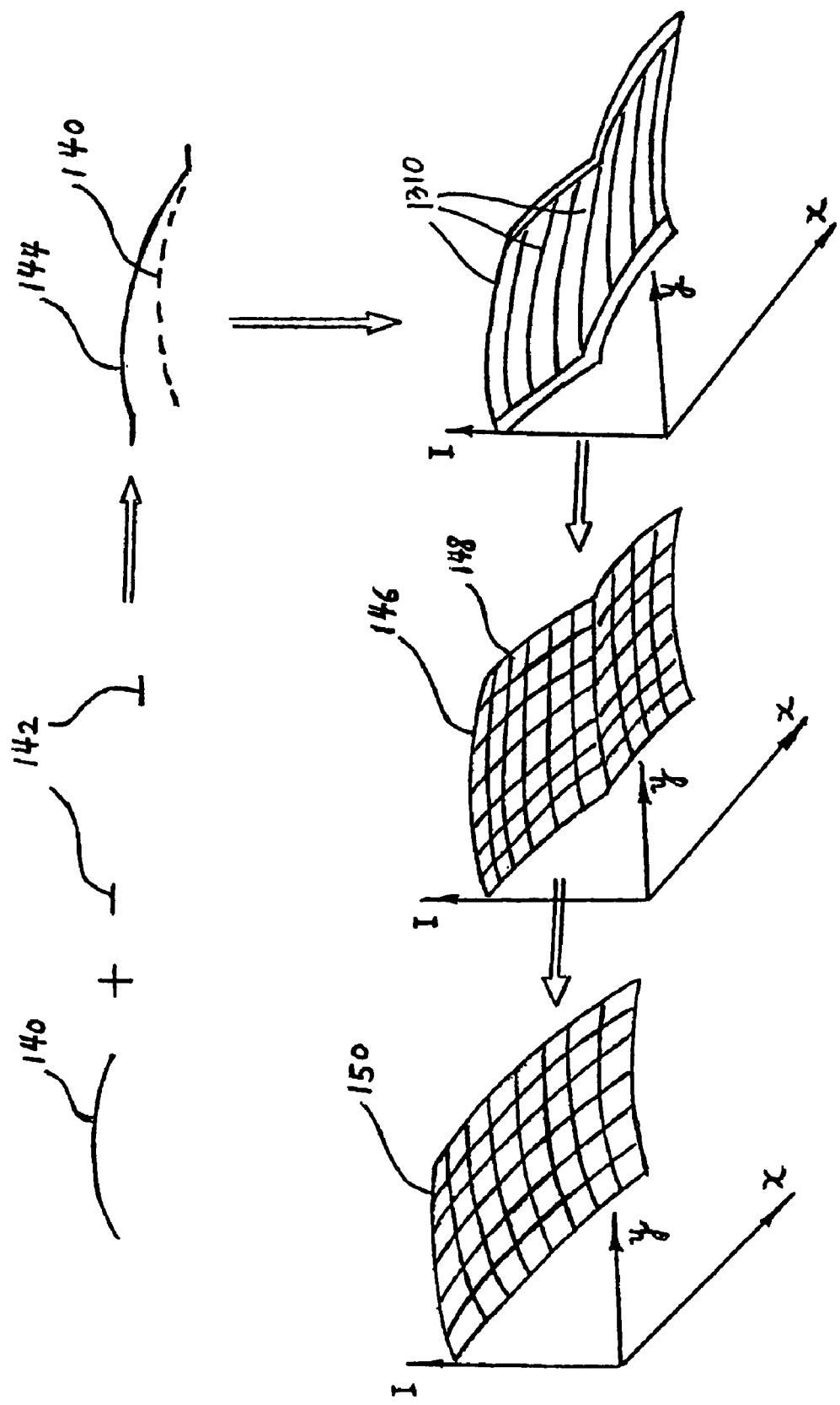
FIG. 13 shows schematically a shading intensity correction process.

The computation process involved in the shading process 236 step of FIG. 11 is further illustrated in FIG. 13. Curve 140 represents, in a graphical form and as an example, the stored shading correction data in the shading correction data LUT 234 in FIG. 11. The values of these data only have meaning relative to each other. In other words, it is the shape of the curve dictated by the shading correction data that is useful in the shading correction process. When the shading correction data of the curve are looked up from 234 of FIG. 11, the values of the end of the curve are then matched to the actual shading intensity from the image of white area 142 of FIG. 13, which represents the light intensity data from the image of the white area graphically. The actual shading intensity is measured from the acquired image of the white area. All values on curve 140 are adjusted according to the end values of the curve while keeping the shape of the curve unchanged. In this way, the curve is transformed from 140 to 144, which represents the adjusted shading intensity correction data, using the image of the white area.

As shown in FIG. 13, all individually looked up curves are adjusted based on the shading intensity values at the two ends of the curves and the curves such as 1310 represent the adjusted shading intensity correction data, which form a surface 146 in FIG. 13. Shading correction curves can be looked up from both x and y directions in shading correction data LUT 234 of FIG. 11. The curved surface may need to be further processed to make it "smooth". As shown in FIG. 13, the shading intensity on the edge 148 of the curved surface 146 is the actual shading data obtained from the image of the white area. The final step of the shading data correction process is to compute, for each location (x, y), the difference between the desired shading intensity surface 150 and the measured shading intensity 146 and to use these differences to correct the shading intensity of the image of the original document.

Figure 14:
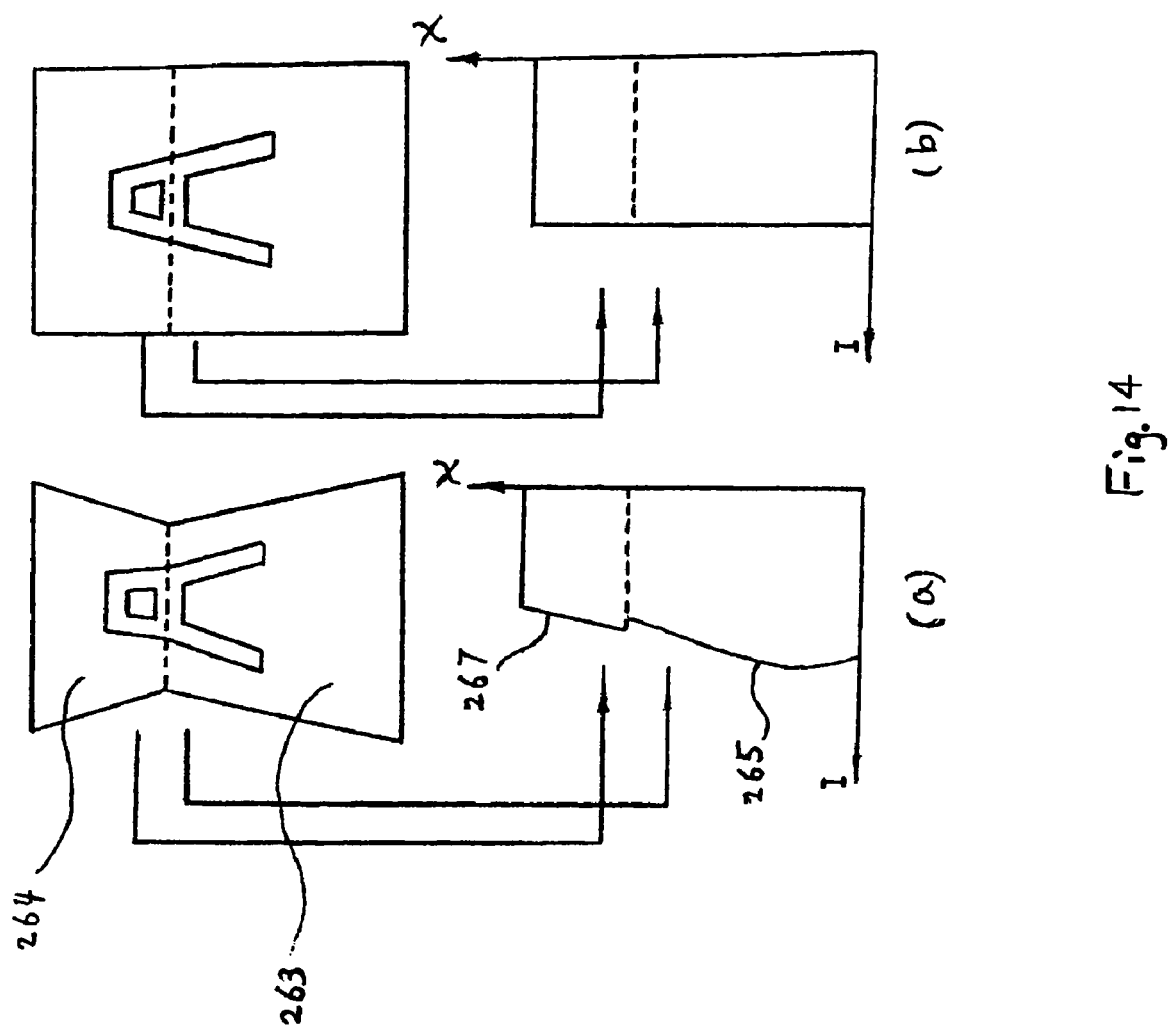
FIG. 14 shows schematically a cross-sectional view of the shading intensity distribution in FIG. 13 along x-axis: (a) before the shading intensity correction process, and (b) after the shading intensity correction process.

FIG. 14 shows a cross-sectional view of the measured shading intensity surface and the corrected shading intensity surface projected on I-X plane. Specifically, FIG. 14(a) shows the light intensity before shading correction. Curves 265 and 267 represent shading intensities of partial images 263 and 264. FIG. 14(b) shows the shading intensity after shading correction.

Figure 15:
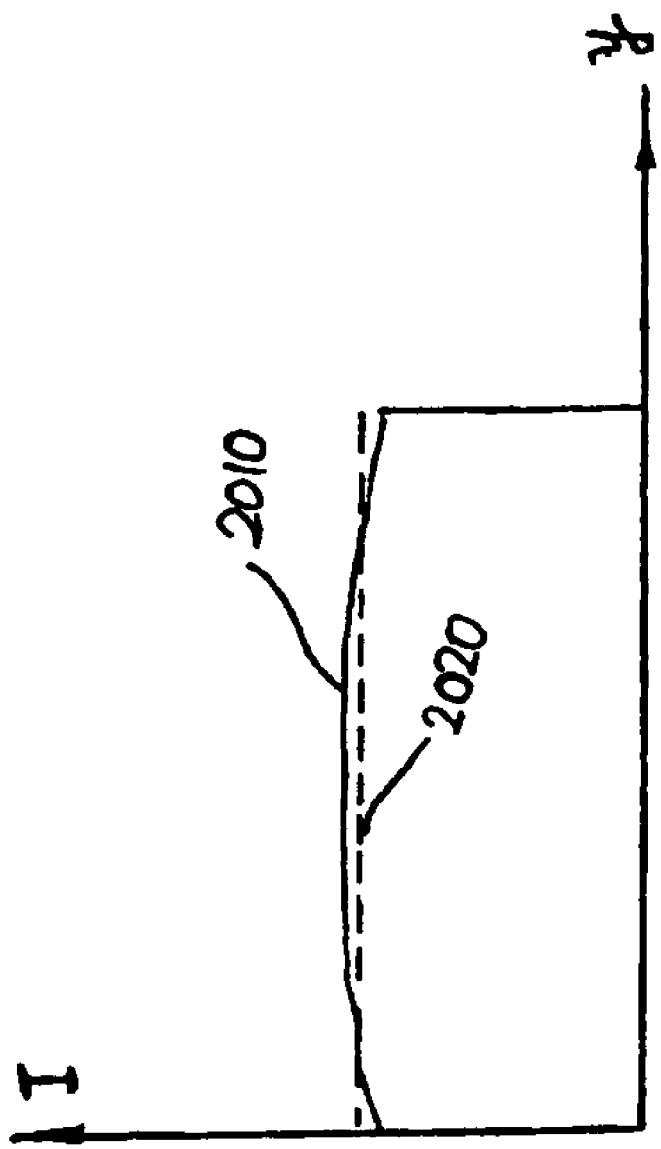
FIG. 15 shows schematically a cross-sectional view of the shading intensity distribution in FIG. 13 along y-axis.

FIG. 15 shows a view on I-Y plane, a projection of a part of the measured shading intensity surface 256 in FIG. 12, represented by the solid line 2010 in FIG. 15, and the corrected shading intensity surface, represented by the dashed line 2020 in FIG. 15.

Figure 16:
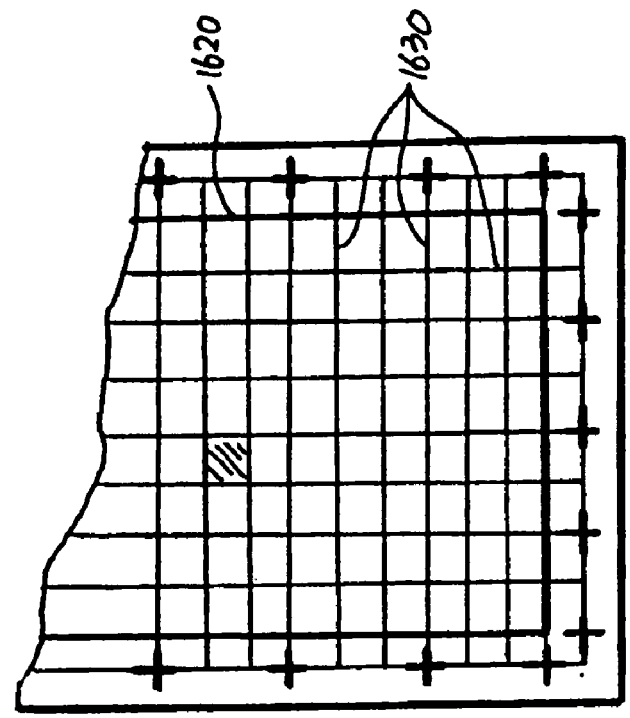
FIG. 16 shows schematically an image distortion elimination process using marker images according to one embodiment of the present invention: (a) and (b) illustrating how reference grids are created, (c) and (d) showing an iterative process in refining reference grids on a distorted image, (e) and (f) illustrating how the coordinates of a pixel at position P inside a reference grid is corrected for image distortion elimination, (g) illustrating uneven distances between scan lines in a distorted image that has not gone through distortion elimination, and (h) illustrating the process of fitting stored coordinates of markers and reference grids to actual image of markers and the reference grids.
Figure 16:
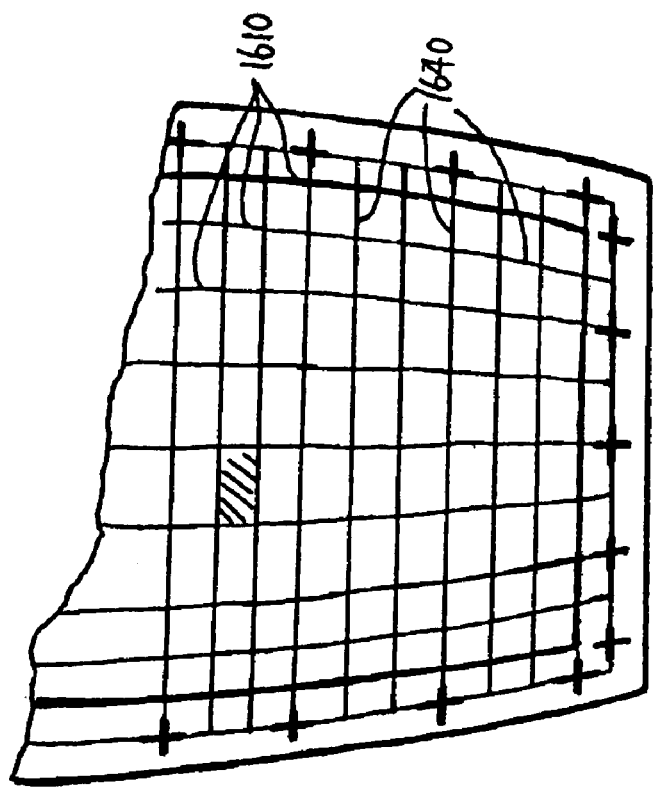

FIG. 16 shows schematically an image distortion eliminating process using the white area with markers according to one embodiment of the present invention. Methods for generating, storing, and using the data of reference grids in the image processing system, for fitting the reference grids to the distorted raw image, and for image-processing to eliminate distortion to obtain the undistorted original image of the scanned document are also shown. For simplicity of description, in the following description, the word "pixel" is used to refer to small area of approximate pixel size on the image and may or may not correspond to actual pixel dot on the image. Also, for convenience, in the following discussion, processed image having no or little distortion is called the processed image and the image that to be processed for distortion elimination is called the raw image.

FIG. 16(a) illustrates how reference grids are created. In general, the lines that constitute the reference grids in the raw image such as 1610 are not straight lines. There are many ways to construct and store the data of these lines in the image processing system. The following description presents one example on how these lines can be constructed and stored.

To obtain the data for constructing reference grids, a reverse engineering approach can be used. A white reference board 1620, which is different from the white area on the scanner, such as the one shown in FIG. 16(b), with sufficiently fine grid of straight lines of dark or reflective color such as 1630, is placed on the scan area. An image of this board is taken by using a scanner of the present invention. The reference grids on the raw image are shown in FIG. 16(a). The data for constructing the reference grids can be obtained by comparing coordinates of the reference grids such as 1630 on the white board without scanning involved with that on the image of the white board such as 1640, which have been scanned in.

Data of the reference grids can be stored in the image processing system in one of several methods. These methods are well known to those skilled in the art. For example, one method is to store the coordinates of a sufficient number of points on the lines of the reference grids. Another method is to store only the coordinates of some points on the reference grids along with the data for constructing curves (such as spline curves) to fit these points. Each of them can be utilized to practice the present invention.

Figure 16D:
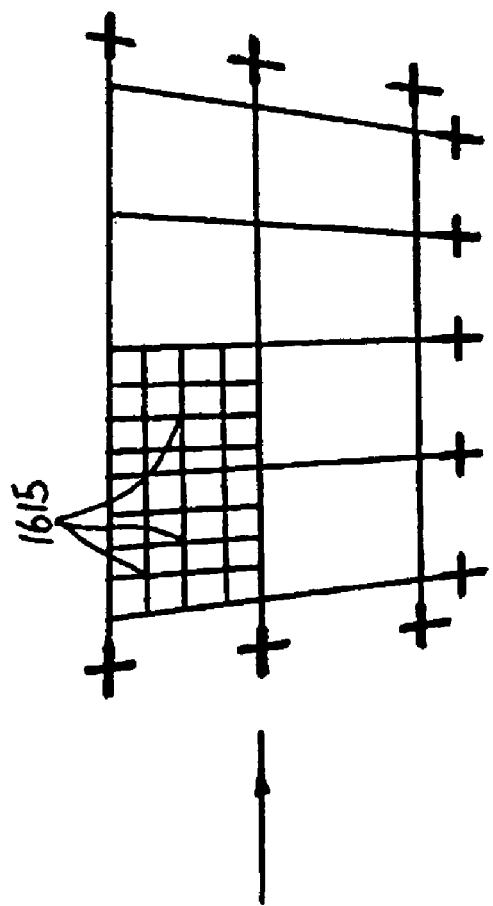
Figure 16C:
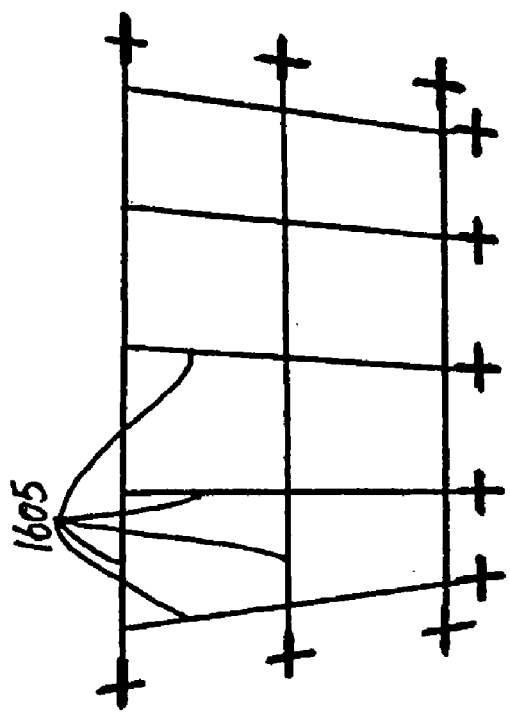
Figure 16:
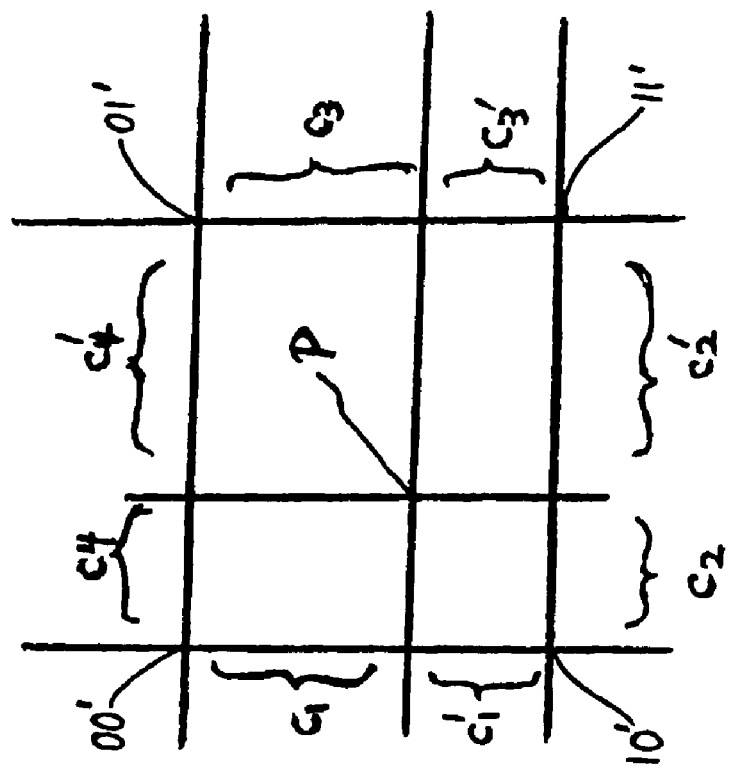
Figure 16:
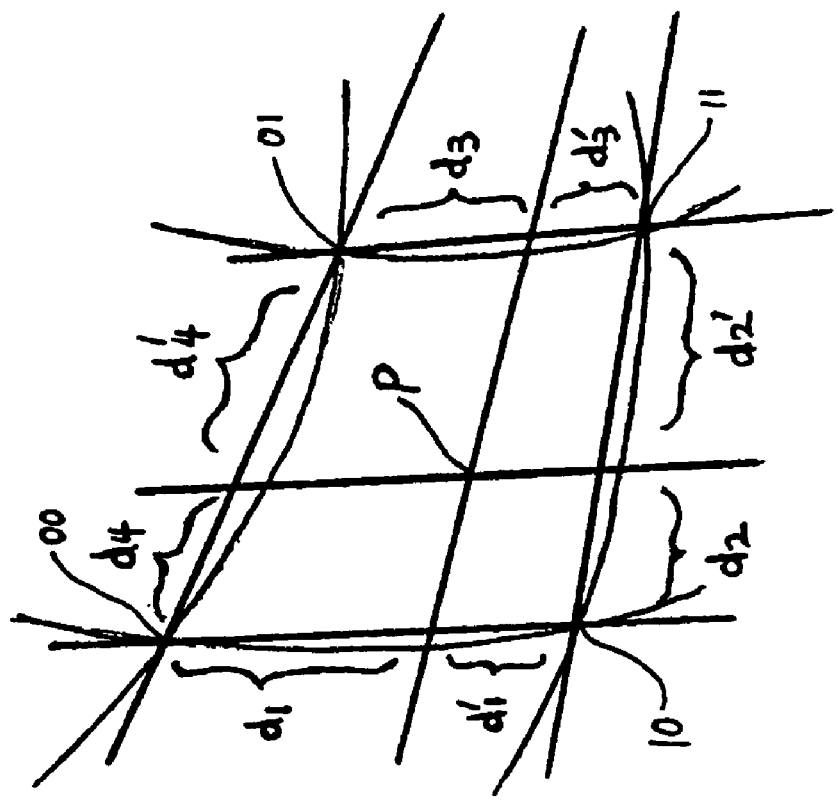
Figure 16:
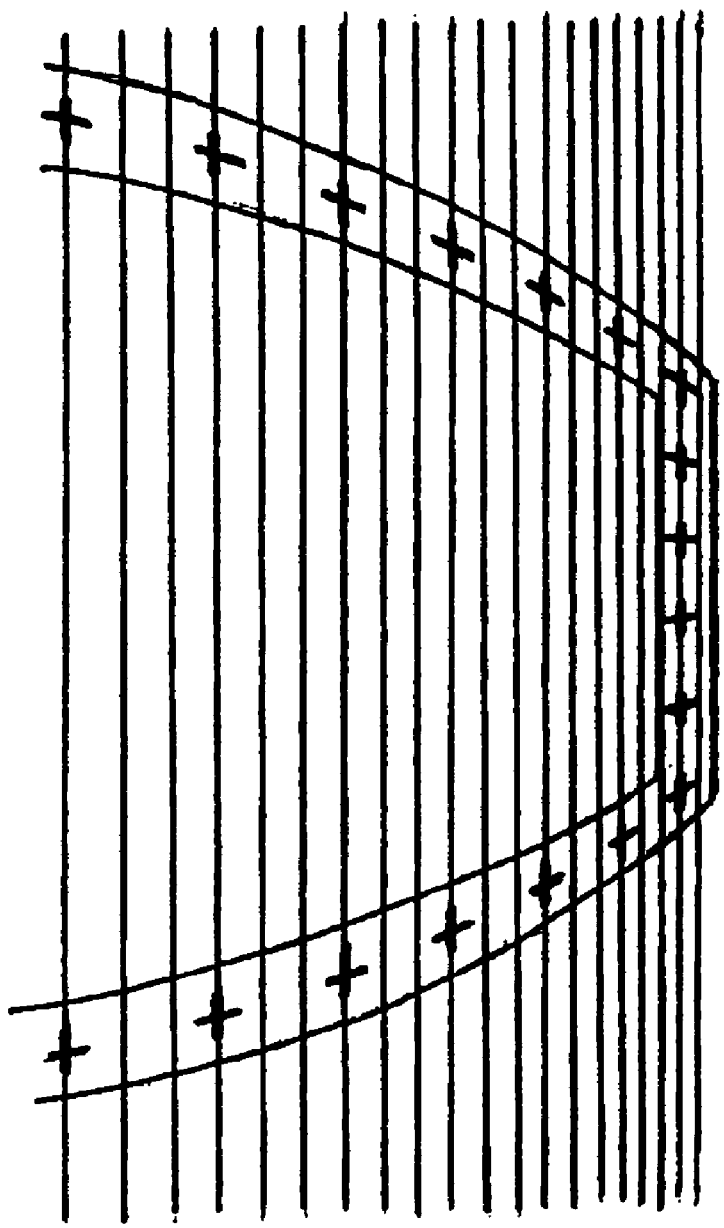
Figure 16:
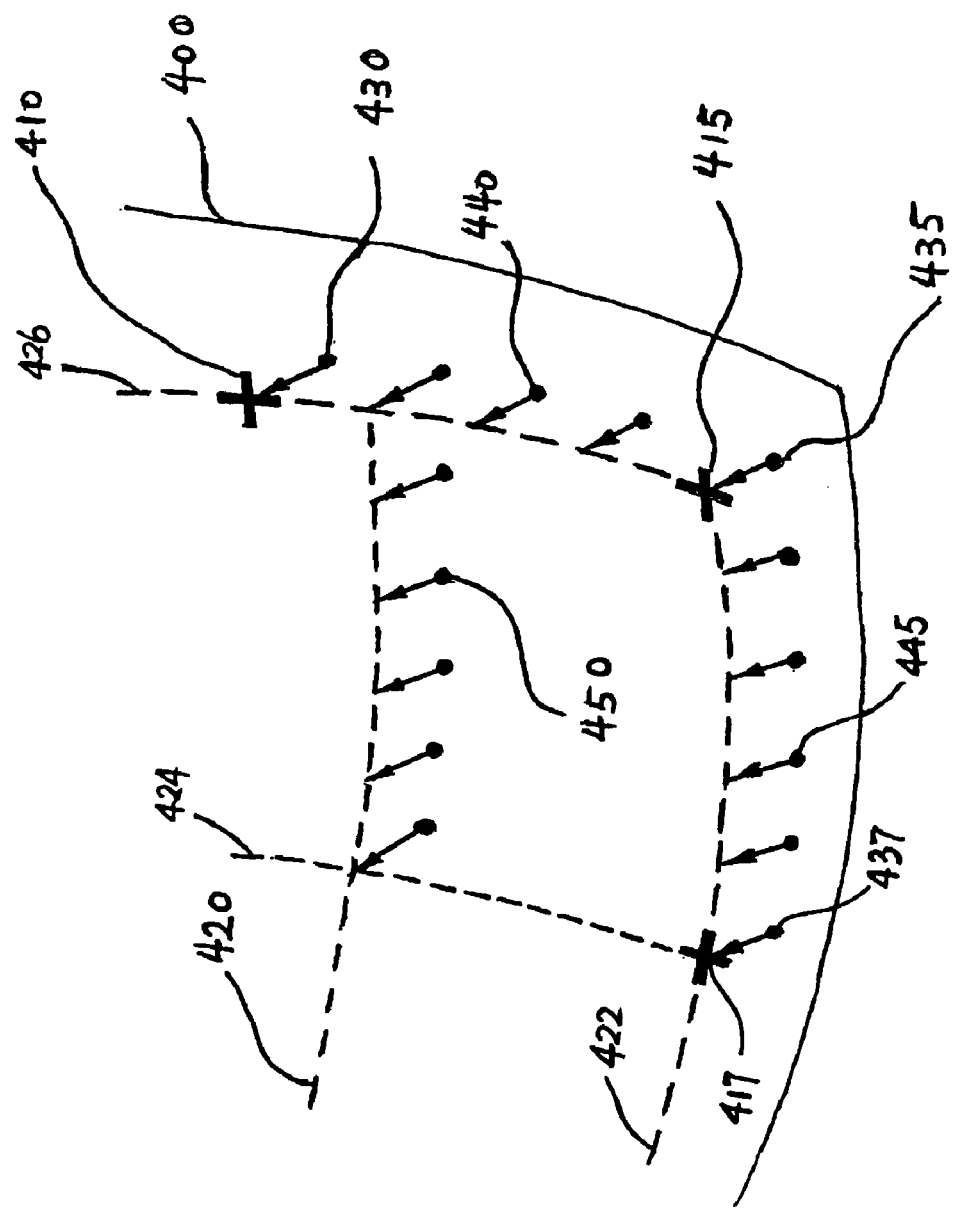

FIGS. 16(c) and 16(d) illustrate the process of interpolation to form reference grids on the image of the scan area with the assistance of markers on the white area of the scanner. The reference grids are used to assist the image processing system for fast distortion elimination. At the first step, as illustrated in FIG. 16(c), markers on the distorted image are connected with lines to form coarse reference grids such as 1605 with relatively large grid size and anchored at markers. More specifically, the coordinates of pixels on the coarse reference grids such as 1605 are computed by interpolation based on the known coordinates of markers. Then, in the second step, as illustrated in FIG. 16(d), finer reference grids such as 1615 are constructed based on the coordinates of pixels on the coarse reference grids such as 1605 that have been constructed in the first step. More specifically, the coordinates of the pixels on the finer reference grids are computed by interpolating from the known coordinates of pixels on the coarse reference grids that have been constructed in the first step. To reduce the size of memory needed for the computation, only coordinates of some selected points on the grids are actually computed and stored. This process can be repeated to obtain even finer reference grids based on reference grids constructed in the previous steps. Discussions infra assume that two levels (coarse and fine) of reference grids provide enough precision for executing distortion elimination in various embodiments of the present invention.

During the process of distortion elimination, the coordinates of markers in the processed image (the target of transform) are computed first. Then, the coordinates of pixels in processed image on the coarse reference grids of some selected points of the finer reference grids are computed. After that, it is a very fast process to compute the processed image from the raw image. FIG. 16(e) and FIG. 16(f) illustrate the computation processes involved for distortion elimination of an arbitrary pixel P inside a reference grid and the pixel is not on the edge of the reference grid. Although not necessary, it is convenient to assume that the reference grids in FIG. 16(e) are sufficiently small for the given level of distortion rate so that the four edges of the second level (the finer, or the smaller sized) reference grids can be approximately assumed as straight lines. The position of the pixel P in the raw image can be determined by the coordinates of four corner points 00, 01, 10, and 11 in the raw image, as well as ratios $d_1/d'_1$, $d_2/d'_2$, $d_3/d'_3$ and $d_4/d'_4$. The position of the same pixel P in the processed image as illustrated in FIG. 16(f) is also determined by the coordinates of the corresponding four corner points 00', 01', 10', and 11' in the processed image, as well as ratios $c_1/c'_1$, $c_2/c'_2$, $c_3/c'_3$ and $c_4/c'_4$. The radios are preserved before and after the distortion elimination, that is, $d_1/d'_1=c_1/c'_1$, $d_2/d'_2=c_2/c'_2$, $d_3/d'_3=c_3/c'_3$, $d_4/d'_4=c_4/c'_4$. Therefore, after the coordinates of the four corner points in the processed image are computed, amount of computation is very small for getting the coordinate of the pixel P in the processed image. Since the volume of the data of coordinates of the pixels inside the grid is much larger than the volume of the data of coordinates of the four corners of the grid, the computation for the distortion elimination transformation is very efficient. FIG. 16(a) and FIG. 16(b) present a global view of the process of distortion elimination of a partial image using the processing method discussed supra.

FIG. 16(g) illustrates the distortions due to different inclinations at different angular position of a rotatable mirror. This distortion can be eliminated along with other distortions such as those shown in FIG. 16(a) using the reference grids method mentioned above.

Illustrated in FIG. 16(h) is a description of a process of fitting the coordinates of the stored reference grids to the distorted raw image, along with images of white area and markers that have been taken from a scanned document. The reference grids are stored using the storage method mentioned above, that is, to store a sufficient number of points (instead of points and coefficients of functions that do interpolations) on the lines of the references grids. The description of the process refers only to a local area of the distorted image but it is understood that the same process is carried out throughout the entire image. During a scanning process, raw image 400 is obtained through scanning from an original document. This raw image 400 includes images of markers 410, 415, and 417 on the white area. Lines 420, 422, 424, and 426 are raw images of reference grids on the raw image 400. Point 450 is a point on the stored reference grids, whose coordinates are already stored in the image processing system. Because distortions occurred during the scanning process, point 450, which is supposed to be on line 420, is off the line 420 on the raw image 400. There exist, therefore, a need to "fit" 450 to 420. The first step in the fitting process is to fit the stored boundary marker points 430, 435 and 437 to the actual positions of the images of markers 410, 415 and 417, respectively, on the raw image 400 as shown by the direction of the arrows illustrated in FIG. 16(h). Upon the completion of the fitting, all points on stored reference grids that are supposed to be at the positions of markers are fitted to the corresponding markers on the raw image. In the second step, the stored coordinates of other points, such as points 440 and 445, which are supposed to be on the boundary of the reference grids, are fitted to appropriate positions on the raw image of the boundary of reference grids 422 and 426, respectively. The fitting process is based on the marker positions on raw image, because points 440 and 445 keep their relative position to points 430, 435 and 437. Further, as shown in FIG. 16(h), point 450 on internal line of the stored reference grids is fitted to appropriate position on the line 420 of reference grids on the raw image (because point 450 will keep the relative positions to points 430, 435, 440, 445, and 437) while keeping the shape of the reference grids.

Processes illustrated in FIGS. 16(a)–16(h) present several methods for storing the data of reference grids in the image processing system, for fitting the reference grids to the distorted raw image, and for processing to eliminate distortion to obtain the undistorted original image of the scanned document. These methods can be carried out very fast. Besides the extra computation needed for constructing reference grids and fitting the reference grids to the distorted raw image, the bulk of the computation for distortion elimination involves copying pixel data one by one from their positions in the distorted raw image into the corresponding positions in undistorted processed image. For black and white image, the pixel data includes pixel coordinates and the light intensity of the pixel. For color image, the pixel data includes pixel coordinates and the light intensity of red, blue, and green lights of the pixel. Roughly estimated, if an image is composed of 1024×768 pixels, the distortion elimination can be accomplished by using 786,000 pixel-copying operations.

If the image processing work is carried out by software executing in a separate personal computer outside but coupled to the scanner, with today's mid-range personal computers having clock speed around 1–3 GHz, the distortion elimination process can be completed in a fraction of a second for a large high resolution image. If the scanner is equipped with its own computing device with dedicated processors, because the execution of copying pixel data from the raw image to the processed image is the type of operation that parallel execution can easily be implemented, when the image processing is executed in parallel, the execution time for distortion elimination can be further reduced.

The amount of extra computation needed for reference grids construction and fitting to the raw image depends on the requirement of distortion elimination. If the finest grids, which are constructed based on the coarse grids, are assumed approximately to be straight lines, because pixels are assumed to be orderly and linearly packed in the reference grids, the larger the sizes of the finest grids, the larger the errors are introduced using straight lines assumption. Conversely, the larger the sizes of the finest grids, the less the amount of computation is needed for constructing and fitting reference grids on the raw image. Consequently, the computation of distortion correction will be the faster.

The above-mentioned methods of using reference grids for conducting distortion elimination also have the advantage that errors are distributed evenly across the entire image so as not to visibly affect the quality of the processed image.

Both the algorithms and the data for partial image combining, distortion elimination, and the shading correction computations can be fixed at the time the scanner is made or is tuned up. Alternatively, the algorithms and the data for partial image combining, distortion elimination, and the shading correction computations can be dynamically selected and corrected during each scanning run, based on the images of markers and the white area in the scanned or pre-scanned image. The second approach uses more system resource and possibly results a more expensive scanner. The benefits of the second approach however, is that the scanner using the second approach is much more tolerant to deformation, geometric errors, and light intensity changes than that of the scanner using the first approach. In both approaches, the computation processes utilize the "standard white" of the white area as references and the positions of the markers on it as basis for computations.

Figure 17:
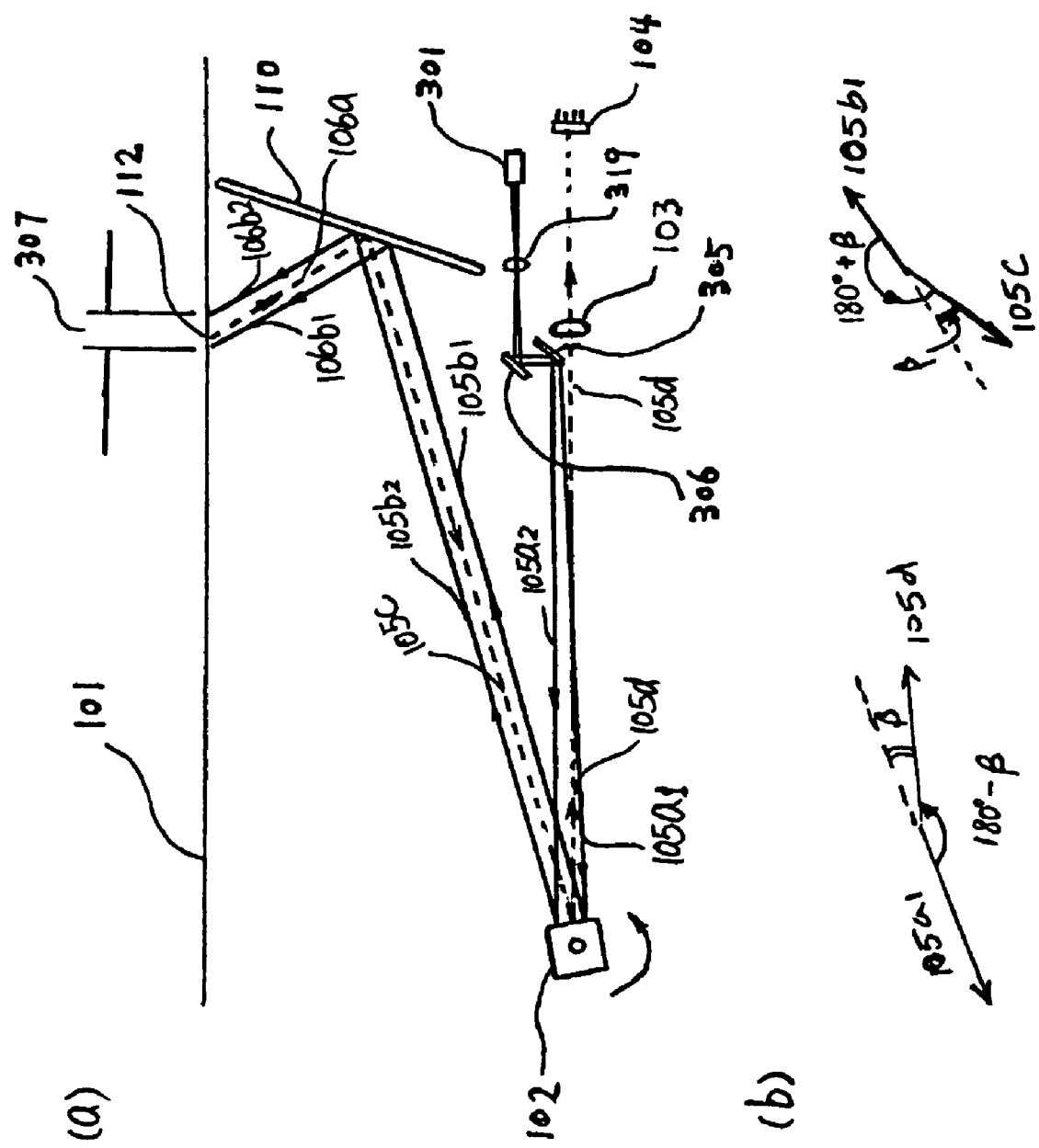
FIG. 17 shows schematically a scanner according to one embodiment of the present invention: (a) a side view of the scanner, and (b) geometric diagrams of the optics of the scanner.

Referring now to FIG. 17, a scanner according to one embodiment of the present invention is shown. A light source 301 emits a light beam. The emitted light beam passes through a lens 319 to be focused and then reflected respectively by mirrors 306 and 305. Mirror 305 is placed close to the imaging optical path 105$d$. The light beam with size defining boundaries 105$a$1 and 105$a$2 after reflected by mirror 305 travels in a path that is close to the imaging optical path 105$d$, but in the opposite direction. After reflected by 305, light beam reaches rotatable mirror 102 and is reflected by the rotatable mirror 102 and travels inside boundaries 105$b$1 and 105$b$2, corresponding to previous boundaries 105$a$1 and 105$a$2, respectively. The light beam further reaches mirror 110 and is reflected by the mirror 110 and travels inside boundaries 106$b$1 and 106$b$2, corresponding to previous boundaries 105$b$1 and 105$b$2, respectively. As illustrated in FIG. 17, the width of the light beam, the closeness of the mirror 305 to the image path 105$d$, and the angle of the mirror 305 are arranged such that during the entire scan of the original document, the light beam defined between 106$b$1 and 106$b$2, lights an area 307 on the scan area 101, moves along with the scan image line 112 and always covers the scan image line 112. In other words, the area at and near a scan image line such as 112, which moves during the scanning, is illuminated during the scan process. The image of 112 travels along 106$a$, is reflected by mirror 110 to travel along 105$c$, which is reflected by rotatable mirror 102 to travel along 105$d$ and arrives at optical sensor 104. The angle defined between 105$b$1 and 105$c$ equals to 180°+β. The angle defined between 105$a$1 and 105$d$ equals to 180°−β. Angle β has a value in the range of −15° to 15°. Preferably, the value of angle β is substantially close to zero.

Figure 18:
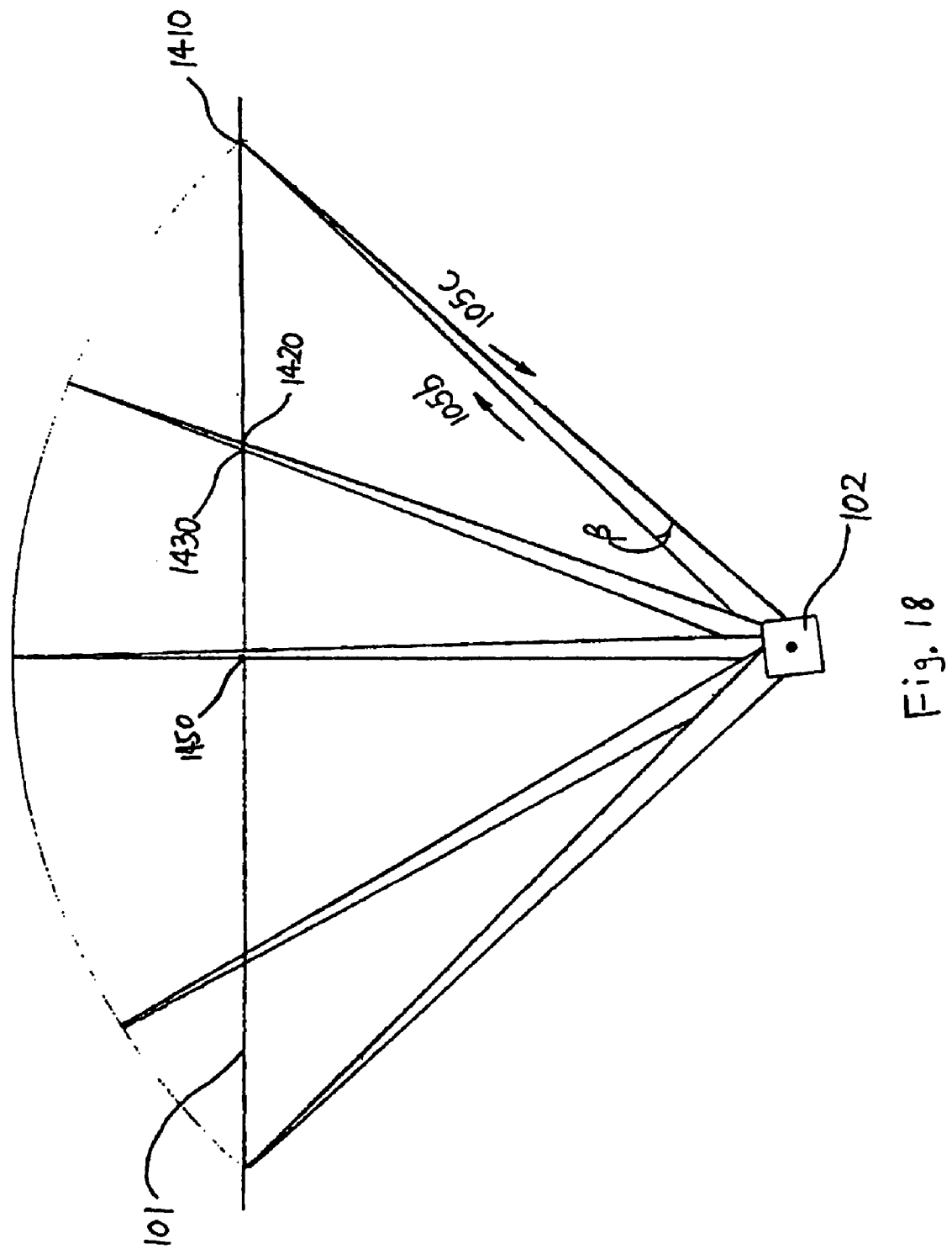
FIG. 18 shows schematically an illumination of a scanner according to one embodiment of the present invention.

FIG. 18 illustrates schematically an illumination of a scanner according to one embodiment of the present invention. The lighting optical path 105$b$ has a constant angle β relative to the imaging optical path 105$c$ during scanning. The two optical paths only cross each other at a certain distance from the rotatable mirror 102. This distance can be chosen as the distance between the rotatable mirror 102 and the point where lighting optical path hits the scan area at one end 1410 of the scan area 101. In other words, the lighting optical path and the imaging optical path both hit the scan area at the same position 1410 while scanning occurs at one end of the scan area 101. While scanning progresses towards the center of the scan area 1450, the two optical paths hit the scan area at slightly different locations such as 1420 and 1430. The closer is the scanning to the center of the scan area, the further apart are the two locations of the two optical paths hitting the scan area 101.

This phenomenon creates two effects. First effect is that the scan lines at positions at or near 1410 is better illuminated than that in the more centered positions such as 1420, 1430, and 1450 of the scan area 101. This is because the lighting optical path hits the scan area at exactly the same location as that of the imaging optical path at the end of the scan area such as at position 1410. This effect has the benefit to balance the lighting intensity across the scan area because the end of the scan area such as position 1410 needs stronger illumination light than the area near the center of the scan area such as positions 1420, 1430, and 1450. The extent of this effect can be adjusted by changing the focus of the scan light beam, and by changing the geometries of the various light source, mirrors, and lenses on the lighting optical path. A more intensely focused light beam from the light source creates a narrower illuminated area around scan line on the scan area than a less focused light beam. Consequently, a more intensely focused scan light has a stronger illumination balancing effect as described above, i.e., larger difference between the illumination intensity of the scan line while the rotatable mirror is scanning at the end of the scan area such as position 1410 and the illumination intensity of the scan line while the rotatable mirror 102 is scanning at the center of the scan area such as positions 1420, 1430, and 1450. A less focused scan light has a weaker illumination balancing effect.

The second effect is that at any point during scanning, following principles of the geometric optics, the optical path starting from the lighting source to the scan area and then back to the optical sensor, i.e., a whole loop optical path, does not reach the optical sensor while scanning is at or near the center of the scan area. This means that while the segment of the imaging optical path between the rotatable mirror and the scan area is at about the vertical direction, the possible strong reflecting light from the document supporting material that is used to support the document such as glass or any shinning surface on the document will not flood the optical sensor. The quality of image therefore, is less likely to be corrupted. The extent of this effect can be adjusted by changing the focus of the scan light beam, changing the angular scope of the scanning, and changing the positions of mirrors, light source, sensors, etc.

On the other hand, in this arrangement, the lighting optical path never parallels the imaging optical path during the entire scanning process. Let the "direct reflection" be defined as the reflection light from the document supporting glass (or any other transparent material that support the scan document) of the scanner that has the same incident angle as the illuminating light, but at the opposite side of, i.e., symmetric to, the normal line that pass through the illuminating light reflection point at the scan area, as would be predicated by geometric optics about the relationship of the incident angle and the reflection angle. When the direct reflection does not hit the rotatable mirror (this happens when the scanning is at regions away from the center regions), there is no possibility that the direct reflection, which may contain a strong, unwanted strong glare, overshadows the real imaging light from the document at the optical sensor. When the direct reflection does hit the rotatable mirror (this happens at some points when the imaging optical path is or nearly perpendicular to the scan area), because the optical path of the direct reflection does not parallel the imaging optical path (see FIG. 18), and because the long optical path from the rotatable mirror to the optical sensor, the direct reflection can not reach the optical sensor. In this way, the possible glare due to direct reflection is eliminated.

An alternative or complementary approach to eliminate the strong glare at about the 90-degree angle as mentioned above is that in both of the two scanning lighting arrangements, if the scanning lighting is so arranged that the light beam never hit the surface on scan area near or at the scan line and is perpendicular to the scan area (that is, at about 90-degree angle to the scan area), the glare from the reflection of the light can be completely eliminated. However, this approach does have the shortcoming that the relative size of the scan area is small as compared to the vertical dimension of the scanner. This is because the segment of imaging optical path between the scan area and the rotatable mirror cannot be perpendicular to the scan area. Also, anti-reflective coatings on all lenses and on the scan area of the scanner can also reduce the reflection and improve image quality.

Both lighting arrangements illustrated in FIG. 4 and FIG. 17 provide concentrated light at and near the scan line such as 112 while scanning is in progress. A cylindrical lens or lens system 319 between the light source 301 and the first reflective mirror 306 is used to focus the light emitting out of the light source 301 and make a narrow beam of high intensity light around the scan line such as 1112. The high intensity light beam makes it possible for the scanner to make high speed scanning.

An alternative and/or complementary approach as compared to the lighting balancing effect illustrated in FIG. 18 to adjust the lighting intensity across the scan area is described as follows. To compensate for the effect that the length of the light path is changing during scanning, and the angle of the light path to the scan area is also changing, the power supply to the light source 301 can optionally be modulated by the rotation angle of the rotatable mirror. To be more specific, the control logic can be executed in the following steps: (1) the angular position of the rotatable mirror is determined by recognizing the marker positions on the partially scanned image in real time; (2) the detected angular position of the rotatable mirror is used to lookup the needed light intensity correction data needed at that moment, which is then used to control the power supply to the light source 301. In general, when the light path is long and the incident angle of the light path to the scan area is large, the light source 301 needs more power. Otherwise, light source 301 needs less power. The light intensity of LED light source can be quickly adjusted by changing the power supply and is suitable to be used in this situation.

Figure 19:
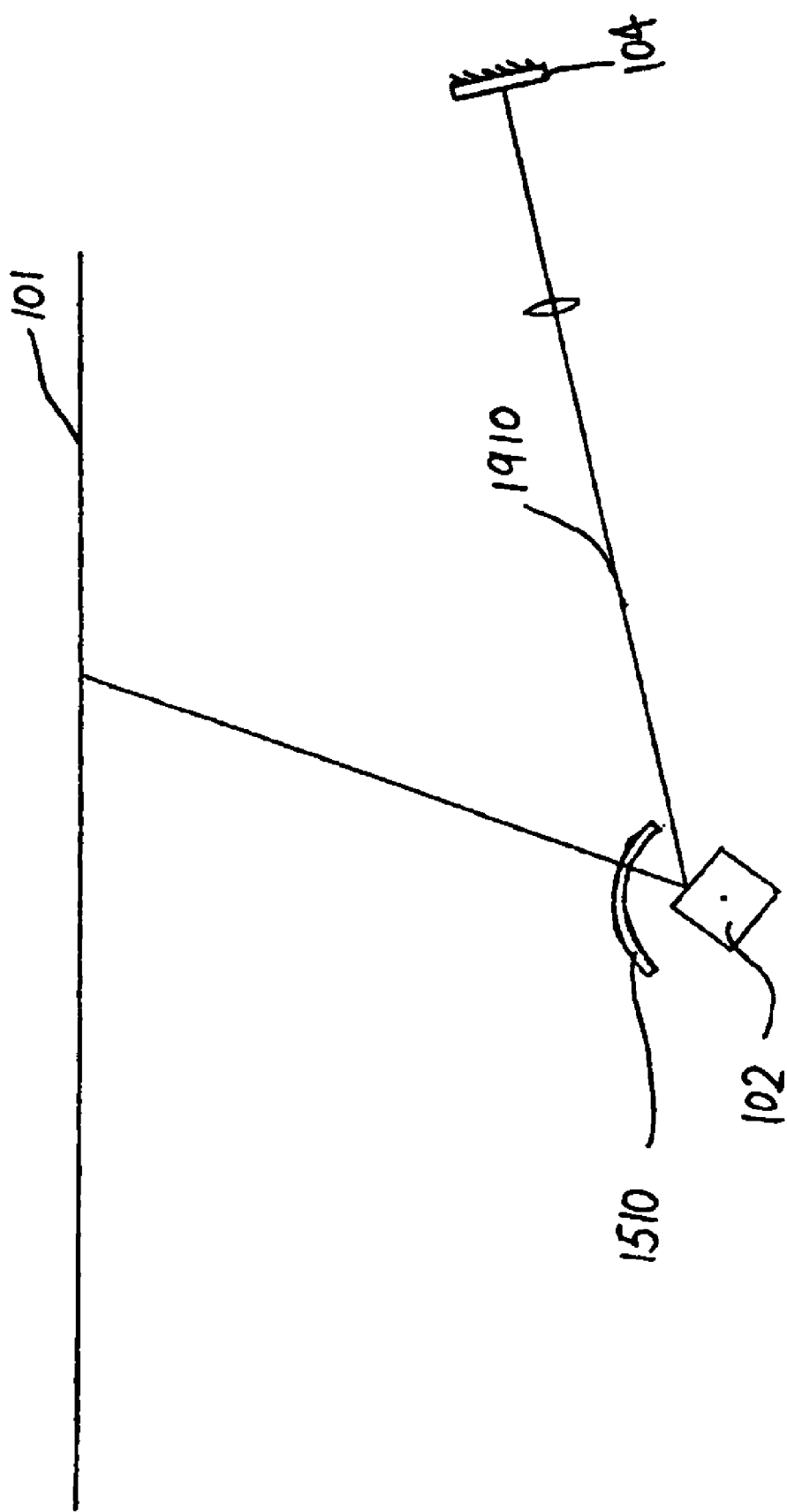
FIG. 19 shows schematically a side view of a scanner having a shading hood according to one embodiment of the present invention.

A still another approach, alternatively or complementary to the above mentioned two approaches for lighting balancing, is to have a shading hood 1510 placed between the rotatable mirror 102 and the scan area 101 as shown in FIG. 19. The shading hood 1510 has varying degrees of transparency (not shown) at different angles during the rotation of the rotatable mirror 102. The different transparency levels at different angles can be used to adjust the lighting intensity at the scan area as well as the amount of reflected light 1910 travels back into the optical sensor 104.

Figure 20:
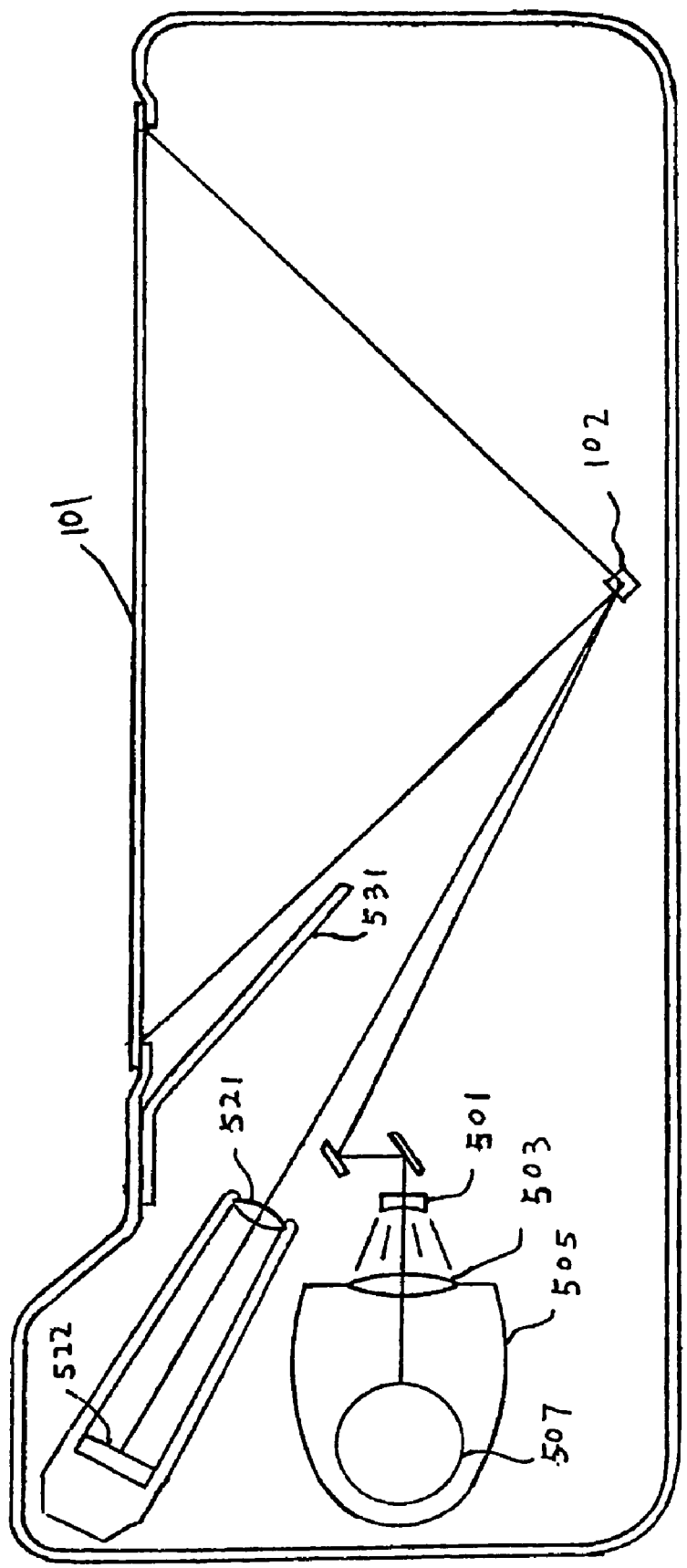
FIG. 20 shows schematically a side view of a scanner according to one embodiment of the present invention.

FIG. 20 presents a scanner according to one embodiment of the present invention. The drawing in FIG. 20 shows the imaging optical path (starting from the scan line on the scan area and ending at the optical sensor) as well as the lighting optical path (starting from the light source and ending at the scan line on the scan area) inside a scanner. Lens 501 and 503 focus the light from the light source 507 into a light beam that is narrow in vertical dimension and wide in horizontal dimension, and is parallel to the scan line. Reflection hood 505 concentrates the light from the light source 507 onto lens 503. Focusing lens 521 focuses the imaging light reflected from the scan line and directly coming from the rotatable mirror 102 onto the optical sensor 522. A non-transparent shield 531 prevents stray light from directly emitting out of the scan area 101 so that the only light that illuminates the scan line on the scan area 101 is from the rotatable mirror 102. Compared with FIG. 4, the embodiment in FIG. 20 uses only one rotatable mirror with no additional mirror such as the plane mirror 110 in FIG. 4. Using one rotatable mirror results in a relatively small scan area as compared to the vertical dimension of the scanner. Or, in other words, for the same size of the scan area, the vertical dimension (thickness) of the scanner in FIG. 20 is relatively large. The novelties in this embodiment of the present invention are the lighting arrangement as explained in FIG. 17 and the use of white area and the markers. If it is necessary, the shading hood illustrated in FIG. 19 can be placed on top of the rotatable mirror to balance the light intensity across the scan area.

As shown in FIG. 20, a fluorescent light tube 507 is used as the light source. Fluorescent light has low cost, good white light spectrum, and is very efficient. However, fluorescent light flicks due to modulated electric current passing through the fluorescent light tube. Current fluorescent light technology uses high frequency electronic ballasts that can generate modulated electric current at frequency about 25 kHz to 40 kHz. If the scan area has a length of 12 inches, scan resolution is 600 dpi (dots per inch), and the scanner takes one second to scan one page, then, within one second, the total number of lines scanned is 7,200 and the total number of flicks is 40,000 (assume the flickering frequency of the fluorescent light is 40 kHz). Each line has its share of 40000/7200=5.5 flicks. The flickering of the fluorescent light lowers the quality of the scanned image. However, the random nature of the flicks distributed over the scanned lines of image makes the flickering unnoticeable on the overall scanned image. Other types of light sources, such as tungsten lamp, tungsten halogen lamp, Xenon lamp, and LED can also be used. These other types of light sourced generally do not have the flickering problem coming with the fluorescent light source. The scan speed, when using the other types of light sources therefore, can be higher than the scan speed when the fluorescent light source is used. Each light source has its own advantages and disadvantages. LED light can be turn on and off instantly, produces concentrated and directional light, and does not generate much heat. However, in general, LED is less efficient than the fluorescent light and is not very bright. Xenon lamp has good light spectrum, is very strong, but requires high-voltage power suppliers, which makes it expensive and bulky. The tungsten lamp is not very efficient and produces intense heat. Because it is a point light source while fluorescent light and LED light can be linear light source, it requires complicated design of reflection hood and lens to transform the spot light into a linear light beam. The halogen tungsten lamp is only slightly more efficient than the tungsten lamp and has the similar problem as that of tungsten lamp.

Figure 21:
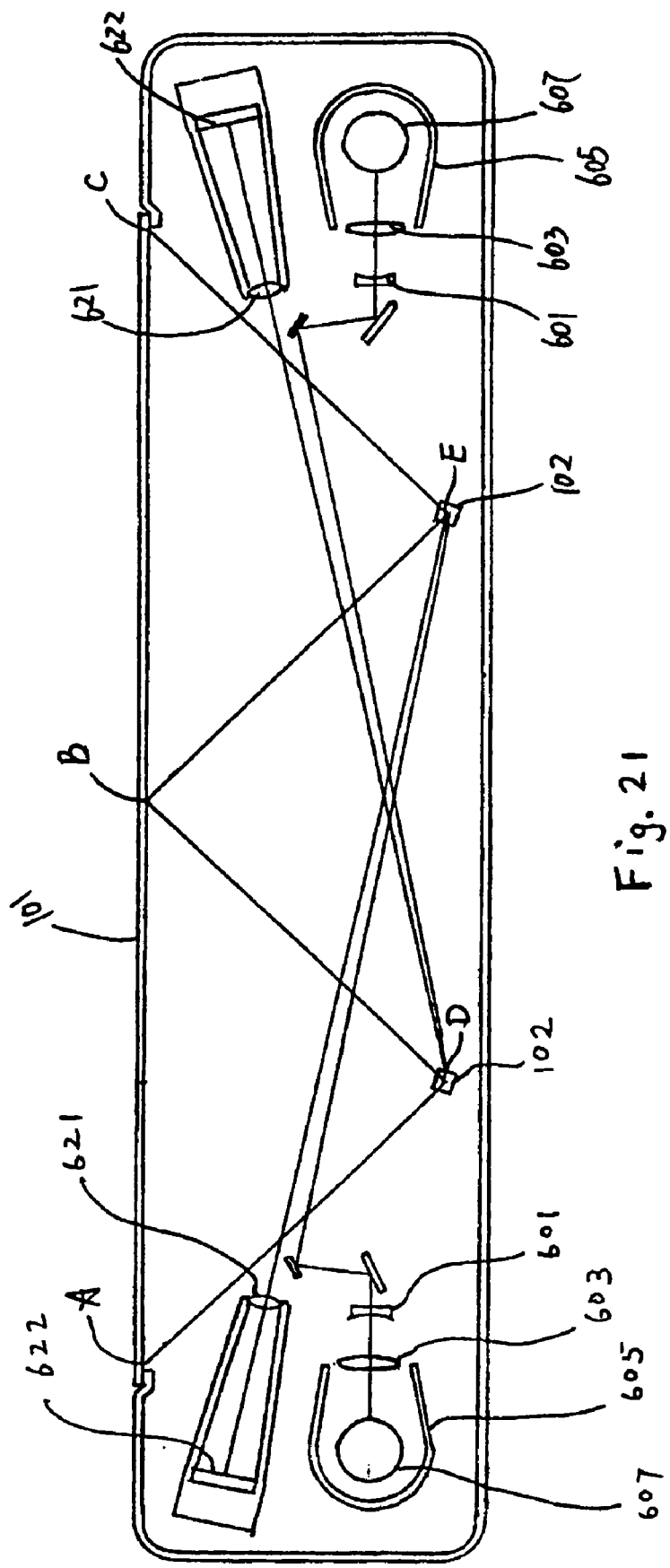
FIG. 21 is schematically a side view of a scanner according to another embodiment of the present invention.

FIG. 21 presents a scanner according to one embodiment of the current invention. In this embodiment, two rotatable mirrors, two optical sensors, and two light sources are used to achieve a large scan area while maintaining a small vertical dimension of the scanner. Light source 607, along with reflection hood 605, lenses 603 and 601 generate a strong, narrow, and concentrated light beam that is parallel to the scan line to be used for scanning. The light beams are deflected by rotatable mirrors such as 102 and are projected to the scan area 101 around scan lines. Focusing lens 621 focuses the imaging light reflected from the scan line, which is on the scan area, into the optical sensor 622. The combining of the two partial images scanned by the two rotatable mirrors are done in image processing software with the assistance of the markers on the white area, which is placed around the scan area. No precise mechanical synchronization is needed between the rotations of the two rotatable mirrors, as long as the two rotatable mirrors can scan images in a reasonably short period of time, for example, both rotatable mirrors are rotating reasonably fast, and the image processing system can capture the two partial images in time and process them. The drawing in FIG. 21 shows both the two imaging optical paths, starting from the scan area 101 and ending at the optical sensors 622, as well as the two lighting optical paths, starting from the light sources 607 and ending at the scan area 101. If it is necessary, two shading hoods, as illustrated in FIG. 19, can be placed on top of the two rotatable mirrors, between the rotatable mirrors and the scan area, to balance the light intensity across the scan area.

Figure 22:
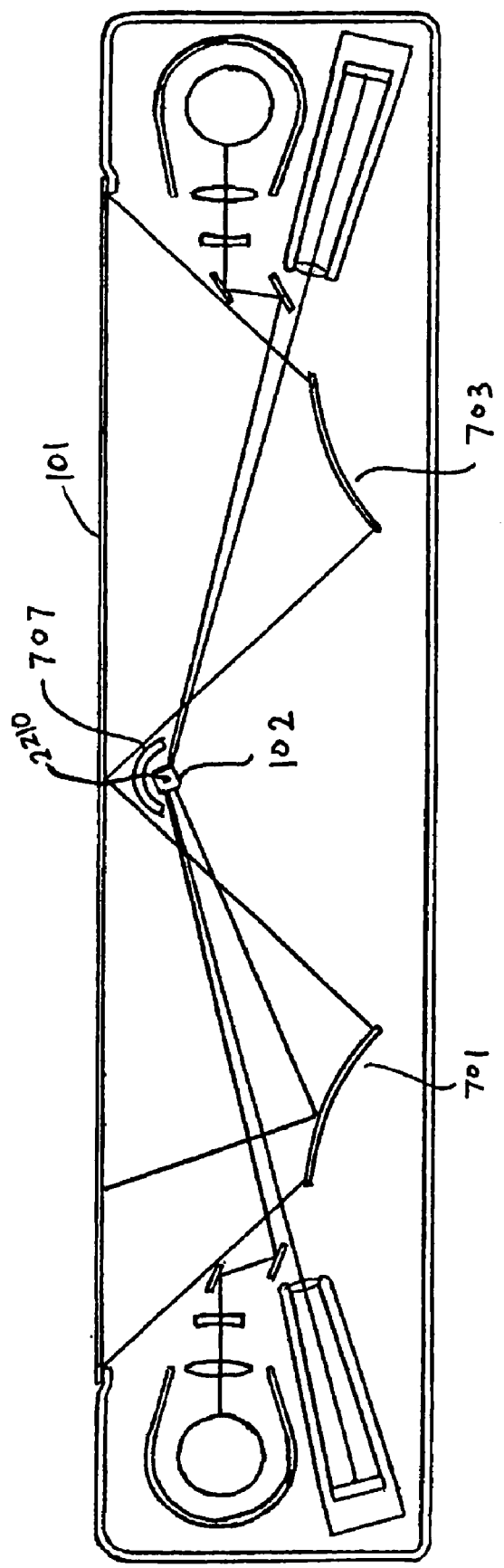
FIG. 22 is schematically a side view of a scanner according to an alternative embodiment of the present invention.

FIG. 22 presents a scanner according to another embodiment of the current invention. In this embodiment, one rotatable mirror and two optical sensors are used. To achieve a large scan area while maintaining a small vertical dimension of the scanner, two auxiliary mirrors 701 and 703 are used. It is beneficial, though not necessarily, to make the reflecting surface of the auxiliary mirrors 701 and 703 in curved shape. The benefits of the curved shape of the auxiliary mirrors include: small mirror surface, easy geometric arrangement to place optical sensors and light sources, and low overall vertical dimension of the scanner. If it is necessary, a shading hood, as illustrated in FIG. 19, can be placed below the rotatable mirror, between the rotatable mirror 102 and the two curved auxiliary mirrors 701 and 703, to balance the light intensity across the scan area. Non-transparent hood 707 is used to block the stray light from the rotatable mirror 102 to directly emit out of the scan area. This is done to protect the eyes of human users when he/she is operating the scanner.

In FIG. 22, the curvatures of the curved auxiliary mirrors can be determined graphically or manually by precise drawing so that it is easier for the image processing system to make distortion elimination, partial image combining and shading correction for the scanned images. The shapes of the curved mirrors are not unique.

Figure 23:
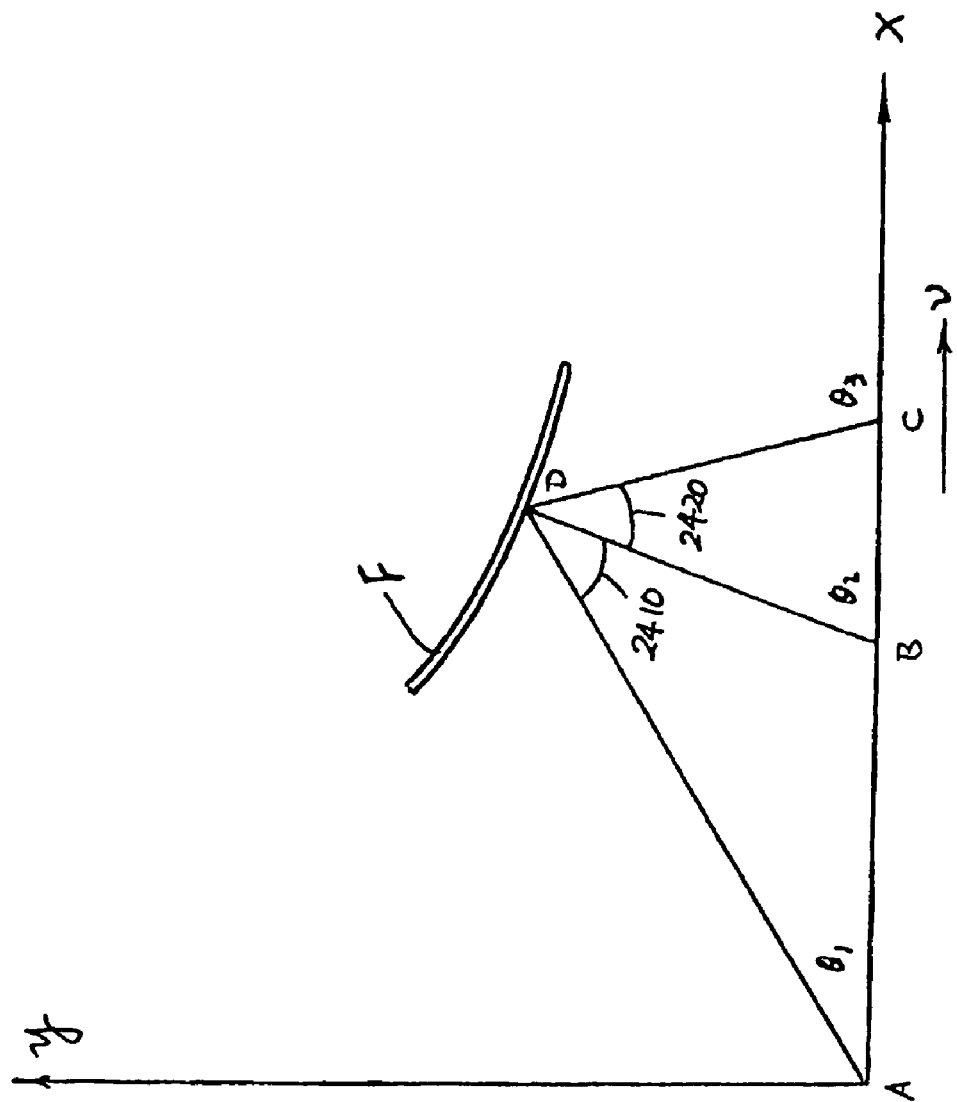
FIG. 23 shows a geometric diagram to compute curvatures of the curved auxiliary mirrors in FIG. 22.

The curvatures of the curved auxiliary mirrors can also be determined mathematically through computation. One example of such a computation is given as follows. Referring to FIGS. 22 and 23, point A is the rotation center 2210 of the rotatable mirror 102. The illuminating light is reflected from point A and hits the curved mirror surface F at point D. Because the diameter of the rotatable mirror is not zero, this assumption introduces a small error. This small error can be ignored for this discussion if the diameter of the rotatable mirror is small enough, that is, the rotatable mirror is "thin and slander" enough. Assuming the projection of surface F onto the X-Y plan is represented by function $y=f(x)$. DB is the normal line of the curved mirror surface F at point D, which passes through point D and is perpendicular to the tangent line of $f(x)$ at point D. Assume angle BDC(2420)=angle ADB(2410) and axis X represents the scan area 101, then, the slope of AD is $\tan(\theta_1)=f(x)/x$ and the slope of DB is $\tan(\theta_2)=-1/f'(x)$. An equation can be established between $\theta_1$, $\theta_2$, x, and $f(x)$ as follows:

$$1/\tan(\theta_1)-1/\tan(\theta_2)=x/f(x)+f'(x).$$

Also, it is known from geometry that, $$1/\tan(\theta_1)-1/\tan(\theta_2)=AB/f(x).$$

Combining the above two equations, the following equation is obtained, $$AB/f(x)=x/f(x)+f'(x).$$

Re-arranging the above equation, $$AB=x+f(x)f'(x)$$

and then taking derivatives of both sides of the equation obtained, the following equation is obtained, $$d(AB)/d(\theta_1)=d(x)/d(\theta_1)+f(x)*df(x)/d(\theta_1)+f(x)*df'(x)/d(\theta_1).$$

The above differential equation can also be written as $$d(AB)/d(\theta_1)=d(x)/d(\theta_1)+\partial f(x)/\partial x*df(x)/d(\theta_1)+f(x)*d(\partial f(x)/\partial x)/d(\theta_1)$$

As a design objective, as the rotatable mirror 102 turns, angle $\theta_1$ changes and line AD turns around point A. The speed v of the movement of point C on X axis is either a constant, i.e. $dv/d\theta_1=K_1$, where $K_1$ is a constant, or at least changes smoothly, i.e. $d^2v/d^2\theta_1=K_2$, where $K_2$ is a constant. An approximation of the first objective stated above is to have the speed of movement of point B being constant relative to $\theta_1$, $dAB/d\theta_1=K_3$, $K_3$ is a constant, AB represents the length of the line segment from A to B.

In FIG. 23, assuming the angular speed of $\theta_1$ is constant, and if the movement speed of point B is set as constant then $d^2(AB)/d^2(\theta_1)=0$. The above differential equation can then be converted to a second-order differential equation and be solved numerically to obtain the function $f(x)$, which represents the desired shape of the curved mirror. Function $f(x)$ will contain some unknown constants due to integration. The constants can be determined in actual mechanical design by adjusting the end positions of the curved mirrors 701 and 703.

Figure 24:
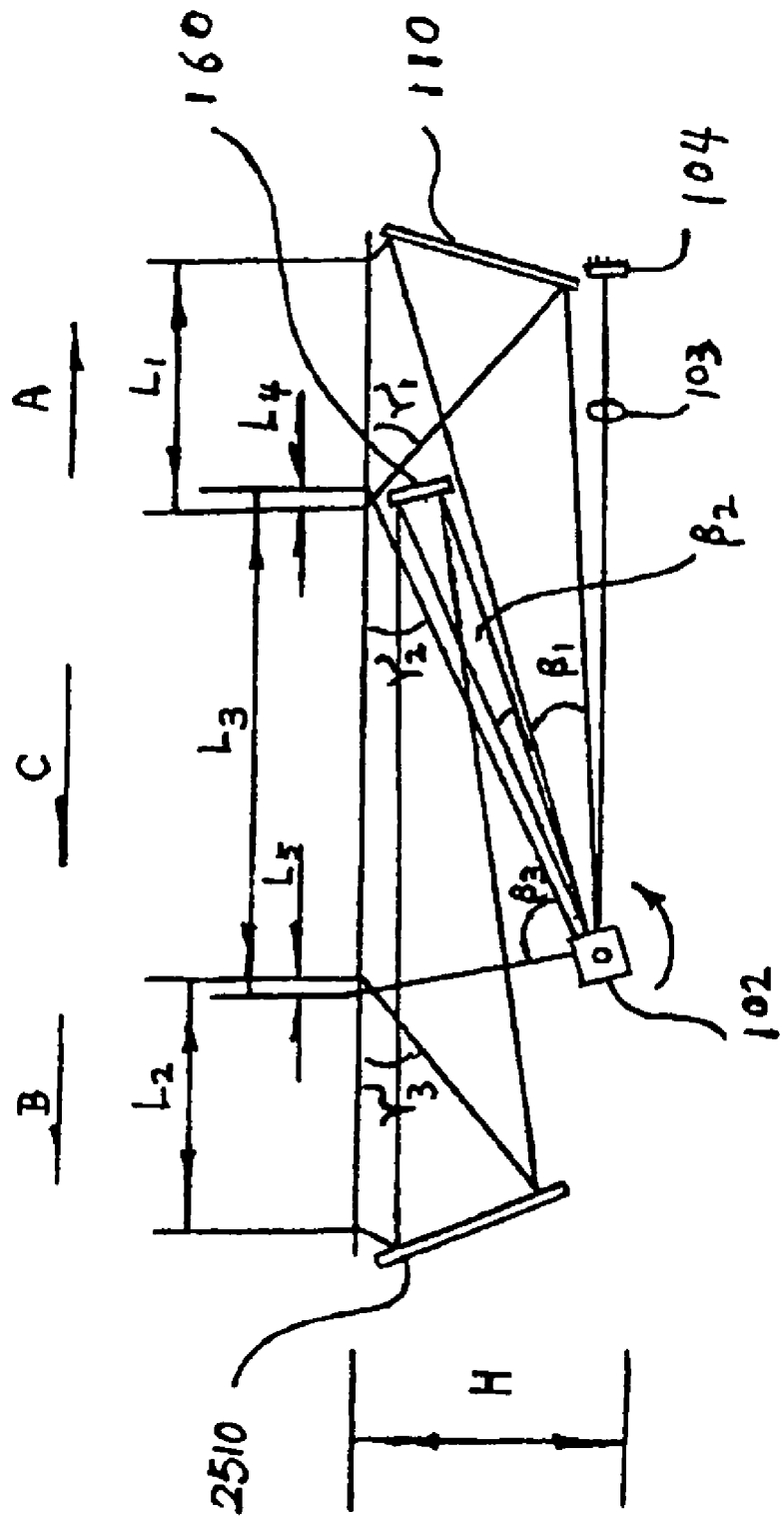
FIG. 24 presents schematically a view of a scanner according to one embodiment of the present invention.

FIG. 24 presents a scanner according to another embodiment of the present invention. Compared with FIG. 4, the scanner in FIG. 24 has an additional plane mirror 160 in front of plane mirror 10. The size, shape and position of the plane mirror 160 are such that mirror 160 does not block any part of the image path from region $L_1$ and $L_3$ to the rotatable mirror 102. The image of the scanned document in region $L_2$ is reflected first by a plane mirror 2510 and then by plane mirror 160 to the rotatable mirror, and eventually travels to the line sensor 104. The addition of plane mirrors 2510 and 160 extends the scan area by length $L_2-L_5$. If $L_1+L_2+L_3-L_4-L_5$ in FIG. 24 equals $L_1+L_2-L_3$ in FIG. 4 (so that both scanners can have the same length for their scan areas), and the minimum of $\alpha_1$ and $\alpha_2$ in FIG. 4 equals the minimum of $\gamma_1$, $\gamma_2$, and $\gamma_3$ in FIG. 24 (so that the distortions of partial images that are just scanned off the document without being further processed are limited by the same inclination), then the height H in the embodiment of FIG. 24 can be made smaller than the height H in the embodiment of FIG. 4. Thus, the addition of plane mirrors 2510 and 160 lowers the height of the scanner, making the physical construction of the image scanning apparatus in present invention an even lower construction. Angle $\beta_1$ is the maximal viewing angle of the rotatable mirror while image is reflected through plane lens 110. Angle $\beta_2$ is the maximal viewing angle of the rotatable mirror 102 while image is reflected through plane mirrors 2510 and 160. Angle $\beta_3$ is the maximal viewing angle of the rotatable mirror when the image directly reaches the rotatable mirror.

Figure 25:
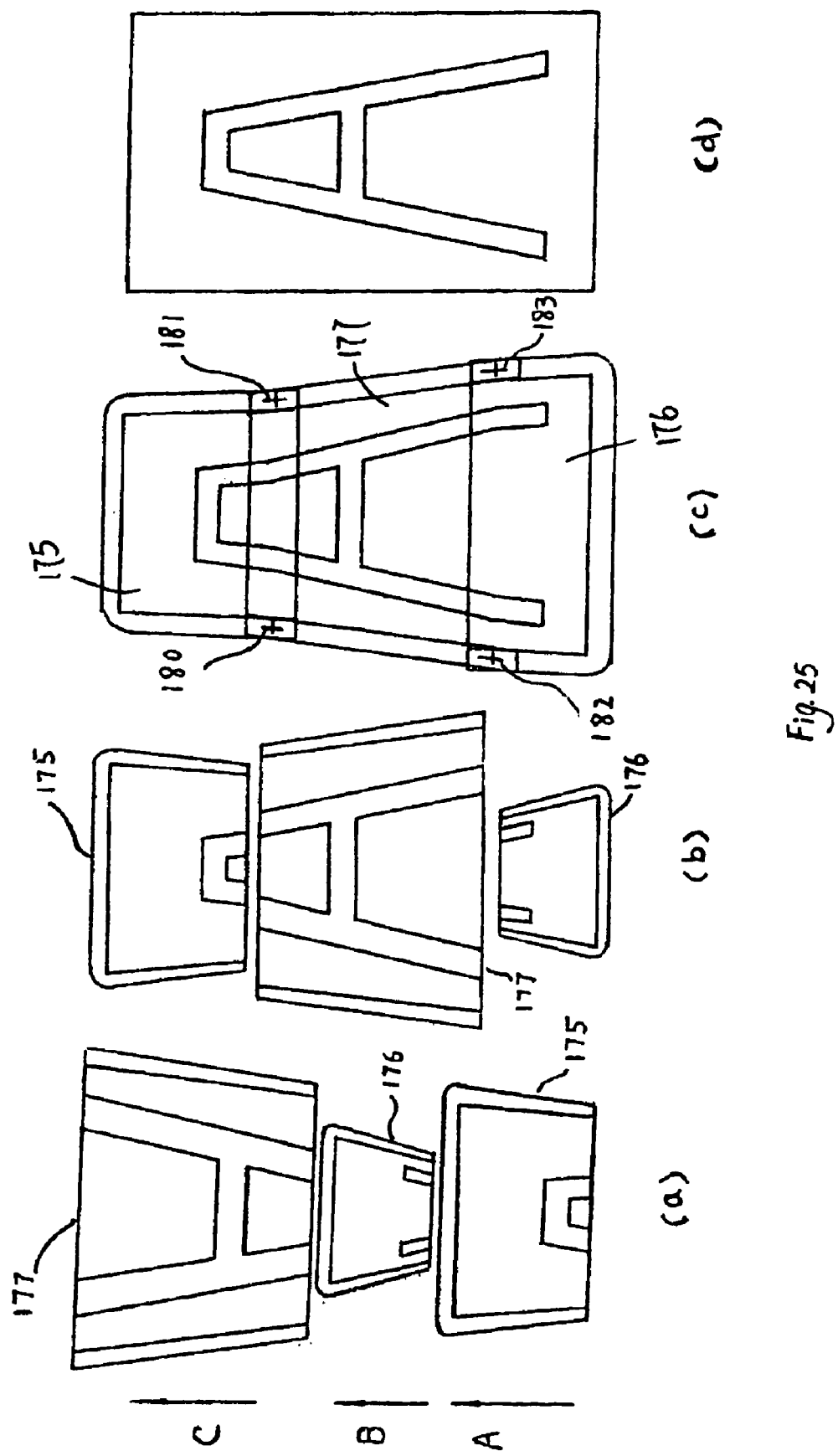
FIG. 25 shows schematically a process of combining three partial images scanned by a scanner according to one embodiment of the present invention: (a) three partial images scanned along directions A, B and C, respectively, (b) a pre-alignment of the partial images, (c) a combination of the partial images, and (d) a processed image of the partial images.

FIGS. 25(a)–25(d) illustrate the steps of combining and transforming the partial images taken from the original document in scanner of FIG. 24 into a complete front view image of the original document. The scan sequence of the three partial images are A, B, and C, and scanning progresses in the directions of the arrows associated with A, B, and C. FIG. 25(a) shows three partial images obtained from scanning. The scanned partial images 176 and 177 are flipped over and the relative positions of partial images 175, 176, and 177 are exchanged and the result is shown in FIG. 25(b). In FIG. 25(c), three partial images, 175, 176, and 177 are combined. The combining of partial images is assisted with the images of positional markers 180, 181, 182, and 183. More specifically, 180 represents two images of a marker, one on partial image 175 and one on partial image 177. The two said images of the marker are taken from the same marker on the white area of the scanner. The two said images of the marker are superimposed into one image when the partial images are combined. The same description can be applied for 181, 182, and 183.

Figure 26:
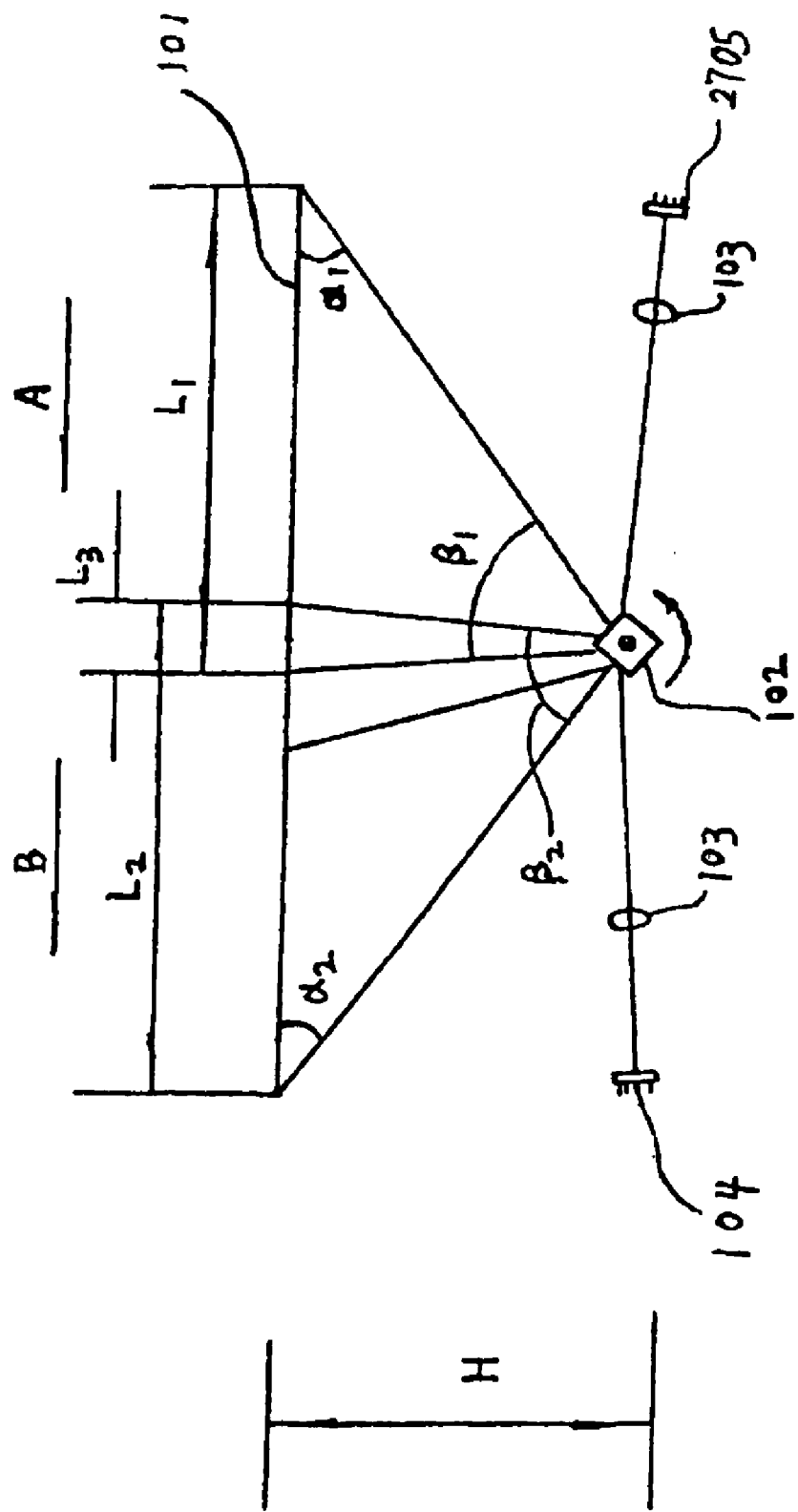
FIG. 26 shows schematically a side view of a scanner according to another embodiment of the present invention.

FIG. 26 is schematically a diagram of one embodiment of the present invention. This embodiment uses two line sensors 104 and 2705 for the purpose of extending the length of the scan area 101 while keeping the height H of the scanner low. $\alpha_1$ and $\alpha_2$ are inclinations viewed from line sensor 104 and 2705 through reflecting rotatable mirror 102, respectively. The image of the scanned document on the scan area 101 is reflected by the rotatable mirror 102, focused by lenses 103, and then reaches the line sensors 104 and 2705. The rotation of rotatable mirror 102 accomplishes the scanning. Viewing angle $\beta_1$ corresponds to the maximal distance $L_1$ on scan area that can be scanned using line sensor 2705. Viewing angle $\beta_2$ corresponds to the maximal distance $L_2$ on scan area that can be scanned using sensor 104. Letters A and B in FIG. 26 represent the scan directions corresponding to the rotation direction of the rotatable mirror in FIG. 26. While keeping the height H the same as that in FIG. 2, $L_1+L_2-L_3$ can be made larger than L. FIG. 27 illustrates the steps for processing the partial images taken from the original document in scanner of FIG. 26 into a complete front view image of the original document in this embodiment.

Figure 28:
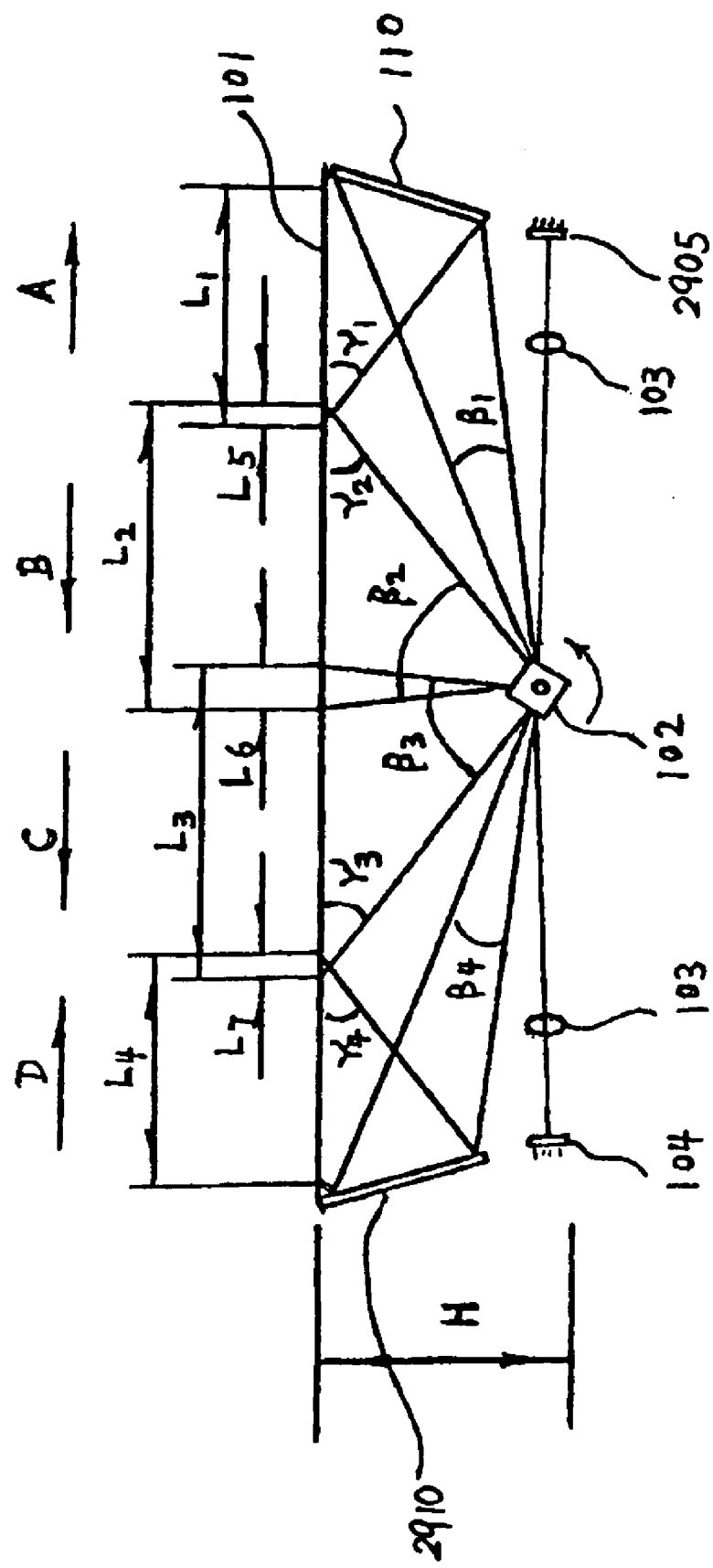
FIG. 28 shows schematically a view of a scanner according to an alternative embodiment of the present invention.

FIG. 28 is schematically a diagram of an alternative embodiment of the present invention. This embodiment also uses two line sensors 104 and 2905. The difference between the embodiment in FIG. 26 and the embodiment in FIG. 28 is that two extra plane mirrors 110 and 2910 are used to further extend the length of the scan area. The portions of the image of the scanned document in regions $L_1$ and $L_4$ on scan area 101 are reflected by plane mirrors 110 and 2910 and then reach the rotatable mirror 102. The portions of the image of the scanned document in regions $L_2$ and $L_3$ directly reach the rotatable mirror 102. Then, the reflected images from the rotatable mirror 102 reach line sensors 104 and 2905 through lenses 103. Specifically, images from regions $L_1$ and $L_2$ reach line sensor 2905 and images from regions $L_3$ and $L_4$ reach line sensor 104. Angle $\beta_1$ is the maximal viewing angle corresponding to distance $L_1$ on the scan area. Angle $\beta_2$ is the maximal viewing angle corresponding to distance $L_2$. Angle $\beta_3$ is the maximal viewing angle corresponding to distance $L_3$. Angle $\beta_4$ is the maximal viewing angle corresponding to distance $L_4$. Distances $L_5$, $L_6$, and $L_7$ represent the overlapped areas of neighboring regions $L_1$, $L_2$, $L_3$, and $L_4$, respectively. $\gamma_1$, $\gamma_2$, $\gamma_3$, and $\gamma_4$ are minimal inclinations in viewing images in regions $L_1$, $L_2$, $L_3$, and $L_4$, respectively. If the minimum of $\gamma_1$, $\gamma_2$, $\gamma_3$, and $\gamma_4$ in FIG. 28 is equal to the minimum of $\alpha_1$, and $\alpha_2$ in FIG. 26 (to ensure the distortions are equally limited in both scanners when the images are first scanned off the document before applying image processing to eliminate the distortions), and length $L_1+L_2+L_3+L_4-L_5-L_6-L_7$ in FIG. 28 equals $L_1+L_2-L_3$ in FIG. 27 (to ensure both scanners have the same length of scan area), then the height H in the embodiment of FIG. 28 can be made lower than the height H in the embodiment of FIG. 26. A, B, C, D represent the direction of the travel of scan line on the scan area 101. When rotatable mirror is rotating, the whole scan area can be scanned in the order of A, B, C, D, in the directions shown by the arrows associated with these letters. There is no mandatory order of scanning among A, B, C, and D and it is not mandatory that all scanning of a document have to be completed in one rotation. For example, during one rotation, only range $L_3$ is scanned. During another rotation, $L_1$ is scanned. During still another rotation, $L_2$ is scanned. During yet another rotation, $L_4$ is scanned. In this example, it takes four rotations to accomplish a complete scanning.

Figure 29:
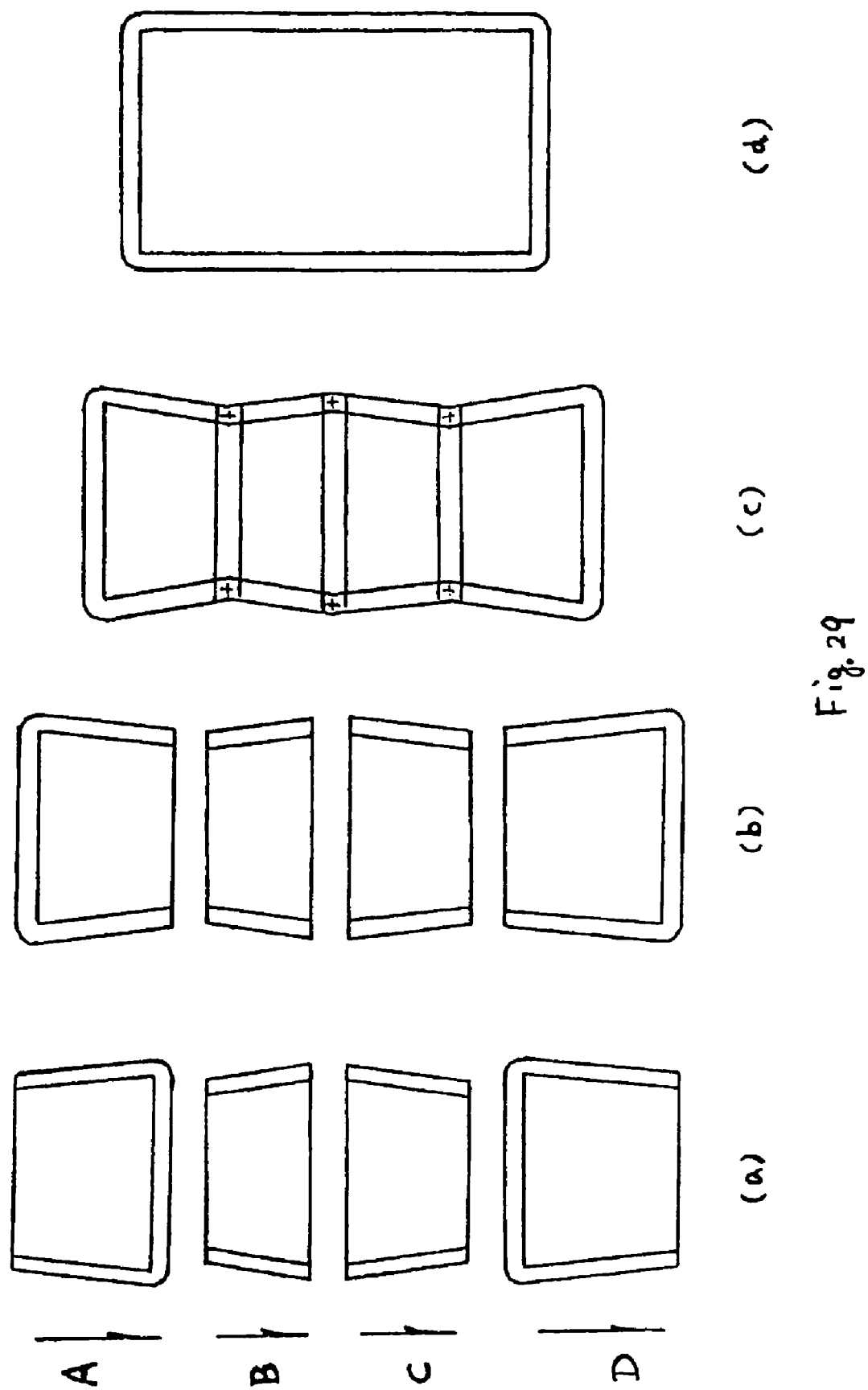
FIG. 29 shows schematically a process of combining four partial images scanned by a scanner according to one embodiment of the present invention: (a) four partial images scanned along directions A, B, C and D, respectively, (b) a pre-alignment of the partial images, (c) a combination of the partial images, and (d) a processed image of the partial images.

FIG. 29 illustrates an example of the process to combine partial images and eliminate distortion in the embodiment of the present invention. Specifically, in FIG. 29(a), four distorted partial images are obtained through scanning. A, B, C, and D represent scanning directions, i.e., the directions that scanned signal come into the image processing system. In FIG. 29(b), two partial images corresponding to the scan directions A and D are flipped over. In FIG. 29(c), all four partial images are combined using markers in the joining area. In FIG. 29(d), distortion is eliminated. As stated above, the sequence of image processing can be changed. For example, distortion can be eliminated in each partial image before the partial images are combined.

Because the scanners of the present invention have very high scanning speed, they are suitable for scanning large volume of documents into image files in electronic format. When scanning many documents at high speed, a natural mode of operation is to scan the documents without putting on the cover of the scan area. For the comfort of the human operator, it is desirable to reduce the amount of light coming out of the scan area of the scanner. This can be achieved by only turning on the scanning light while the scanning is in progress and have some type of shutter device to block the scanning light in between scans. It is well known to those skilled in the art for constructing such shutter devices or switches of scanning light that can be operated in synchronization with the scanning process, and details will not be elaborated here.

In the first and the second lighting arrangements illustrated in FIG. 4 and FIG. 17, when the light path is perpendicular to the surface of scan area 101, the light beam, which is intended to illuminate the document along scan line, may be reflected from the surface of the scan area 101, and the said reflected light may travel along the same path as the image path all the way into the sensor. This causes glare, which is a phenomenon defined here as strong reflected light of the scanning light beam from the surface of the scan area due to the 90 degree angle of the scanning light beam with the surface of the scan area. The glare deteriorates the quality of the initially scanned image.

Figure 30:
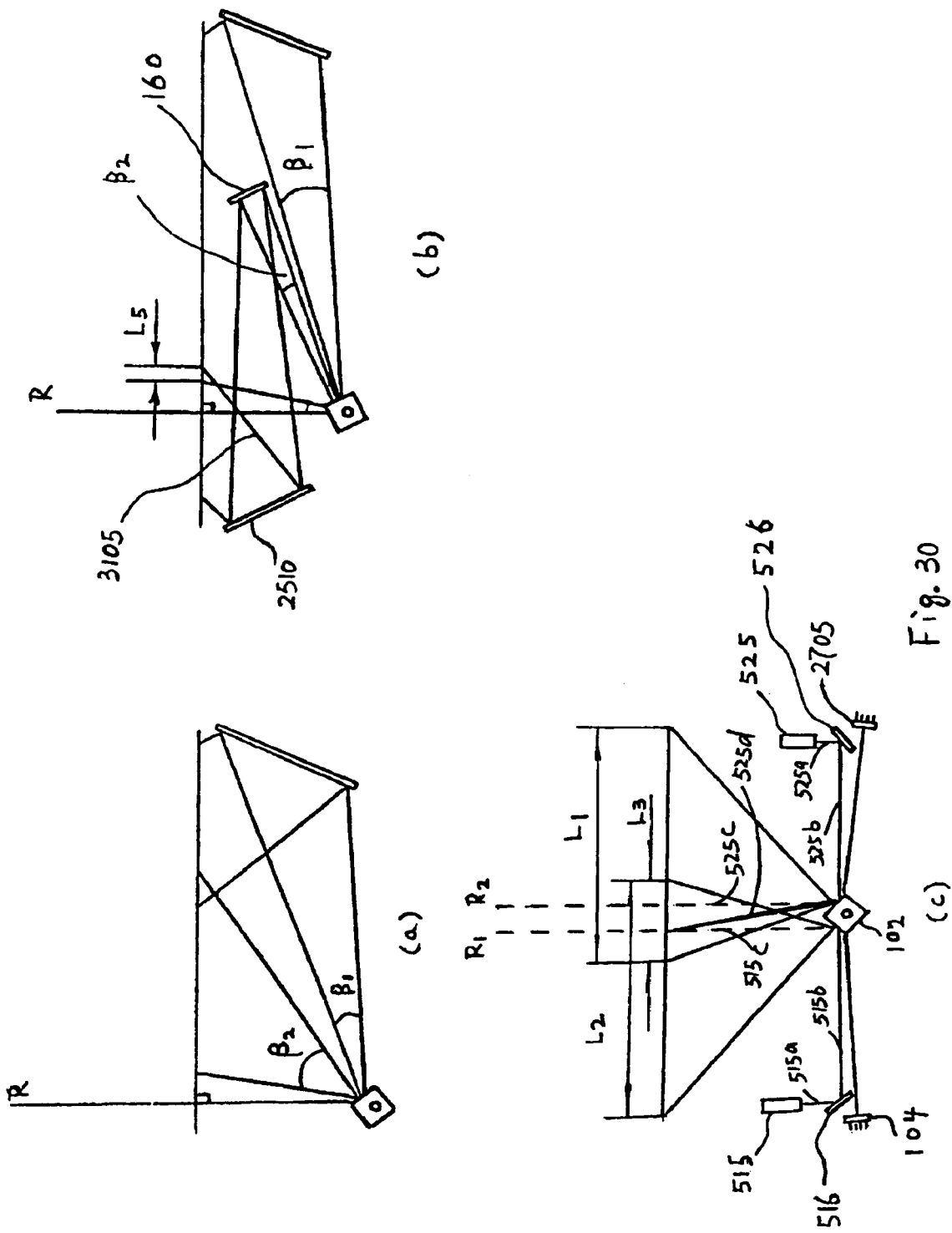
FIG. 30 shows schematically a side view of different embodiments of a scanner of the present invention: (a) one embodiment of the scanner, (b) another embodiment of the scanner, and (c) an alternative embodiment of the scanner.

In addition, there are several methods besides the method described in FIG. 18, for avoiding this phenomenon from happening. FIG. 30(a) shows a method for avoiding glare in the first embodiment of the scanner of the present invention shown in FIG. 3 and FIG. 4. The maximal viewing angle $\beta_2$ can be limited so that when the image path is in the range indicated by $\beta_2$, the light path never lays perpendicular to the surface of the scan area 101. The perpendicular position is shown by vertical line R. FIG. 30(b) shows a method for avoiding glare in the second embodiment of the scanner of the present invention in FIG. 24. The maximal viewing angle $\beta_2$ and the positions and angles of plane mirrors 2510 and 160 are so arranged that image path 3105, which reaches the maximal extend of scanning through mirror 2510, crosses vertical line R. As shown in FIG. 24, area within $L_2$ can be scanned without the image path being perpendicular to the surface of the scan area. Also, the joining area $L_5$ between $L_2$ and $L_3$ is on the right side of the vertical line R. Therefore, under this arrangement, in no position the light path will be perpendicular to the surface of the scan area.

FIG. 30(c) shows schematically a method for avoiding glare in the third and fourth embodiment of the scanner of the present invention in FIG. 26. Because the rotatable mirror has certain thickness, the travel path of the scanning light 515, when reflected by the rotatable mirror 102, will be in vertical position at $R_1$, following paths from 515a to 515b to 515c. The travel path of the scanning light 525, when reflected by the rotatable mirror 102, will be in vertical position at $R_2$, following paths from 525a to 525b to 525c. The joining area $L_3$ is made wide enough to contain both positions $R_1$ and $R_2$. Light 515, after reflected by mirror 516 and rotatable mirror 102, has glare at angular position $R_1$. However, light 525, after reflected by plane mirror 526 and rotatable mirror 102, travels along 525d, has no glare at surface of the scan area corresponding to position $R_1$.

Figure 31:
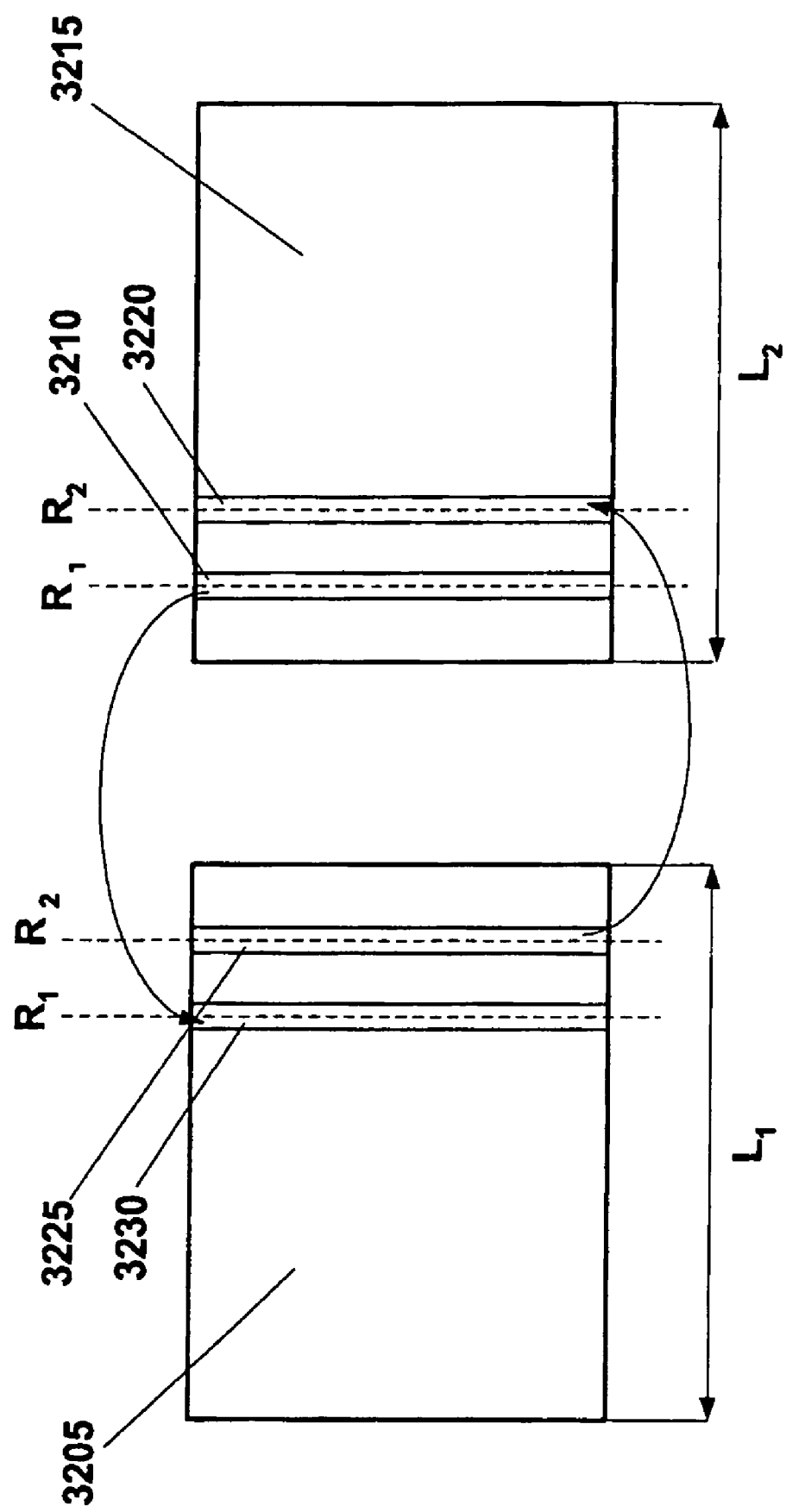
FIG. 31 shows schematically a glare eliminating process of the scanner shown in FIG. 30(c).

The detailed process to obtain image without glare from the scanner illustrated in FIGS. 26 and 30(c) is further illustrated in FIG. 31. Partial images 3205 and 3215 are image areas $L_1$ and $L_2$ in FIG. 30(c), respectively. A portion 3230 of the partial image 3205 around position $R_1$ contains glares and can be replaced by the corresponding portion 3210 on 3215. Similarly a portion 3220 of the partial image 3215 around position $R_2$ contains glares and can be replaced by the corresponding portion 3225 on 3205. After replacement, both partial images 3205 and 3215 have no glare.

Figure 32:
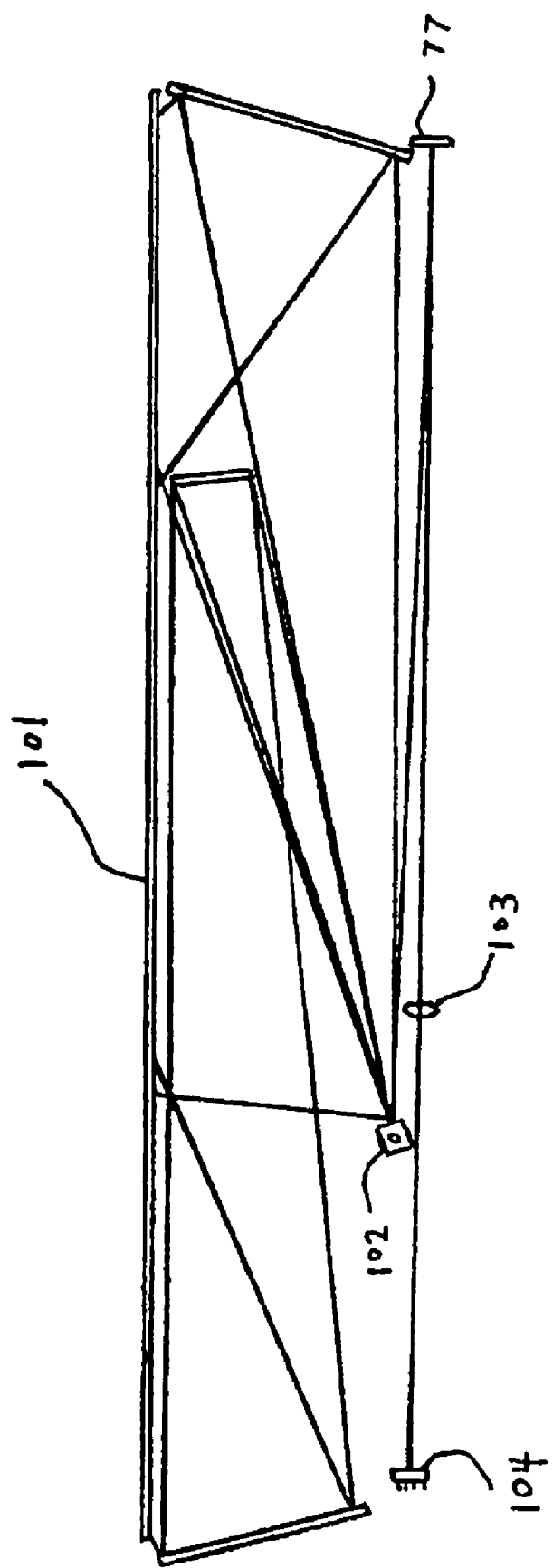
FIG. 32 shows schematically a side view of a scanner according to one embodiment of the present invention.

As shown in FIG. 4 and FIG. 17, the changing length of the image path in various positions of the rotatable mirror may result in less than ideal focus of the image by lens 103 on image sensor 104. This problem can be alleviated through extending the length of the image path by folding the image path. When the length of the image path is extended, the ratio of the lengths between the longest image path and the shortest image path is lowered. This ratio is always bigger than 1. Hypothetically, if the longest image path is 900 mm and the shortest image path is 700 mm, the ratio is 900/700=1.286. If both the longest image path and the shortest image path are extended by 300 mm, then the ratio is reduced to (900+300)/(700+300)=1200/1000=1.2. FIG. 32 illustrates a preferred embodiment to extend the image path. Using the scanner in FIG. 24 as an example, as illustrated in FIG. 32, a mirror 77 is placed at the location where line sensor 104 used to be. The line sensor 104 receives image after it being reflected by the mirror 77. Lens 103 is placed between mirror 77 and line sensor 104 to focus the reflected image. As a result, both the shortest image path and the longest image path are extended with the same distance that is between mirror 77 and sensor 104.

Figure 33:
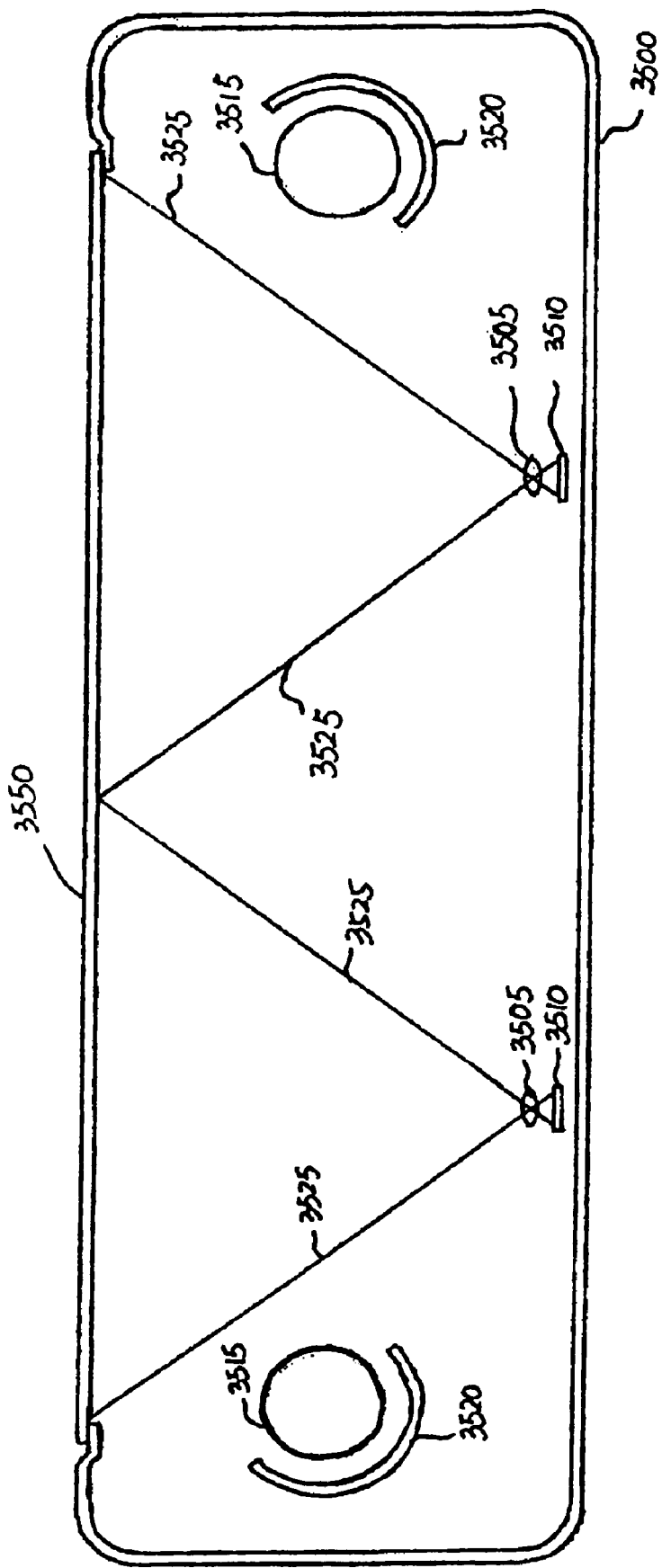
FIG. 33 shows schematically a side view of a scanner according to an alternative embodiment of the present invention.
Figure 34B:
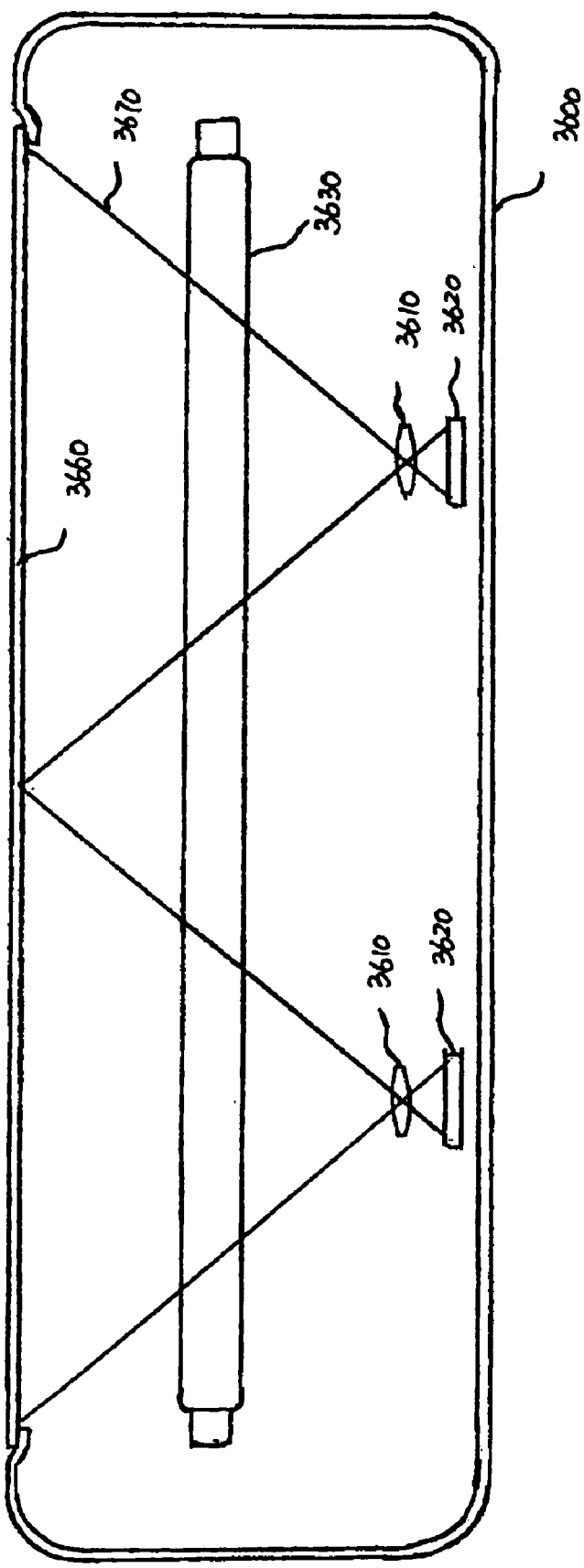
FIG. 34 shows schematically different embodiments of a scanner of the present invention: (a) a side view of one embodiment of the scanner, (b) a side view of another embodiment of the scanner, and (c) a bottom view of an alternative embodiment of the scanner.

FIG. 33 illustrates schematically a side view of a scanner according to an alternative embodiment of the present invention. The scanner has a frame 3500, lenses 3505, area sensors 3510, light sources 3515, and a reflection hood 3520. The lines 3525 are the boundaries of the viewing angles of the area sensors 3510. The scanner has white area with markers on it scan area 3550. The white area with markers is used to combine partial images taken by area sensors 3510 to a complete image. Because more than one area sensors are used, the "height" of the scanner is low. A disadvantage of this design is that the light from the light source may cause discomfort to human operator. To circumvent the disadvantage, another version of the scanner is designed and the diagrams shown in FIGS. 34(a)–(c). As illustrated in FIG. 34(a), the scanner has a frame 3600, lenses 3610, area sensors 3620, light source 3630, and reflection hood 3640. It can be seen that operator's eyes 3650 do not directly view the flashing light coming out of the light source 3630, because usually the human operator stands on the side of the scanner where the light source 3630 is embedded. Also illustrated in FIG. 34(a) is scan area 3660 and boundaries of viewing angles of the area sensors 3670. FIG. 34(b) shows the scanner structure from perspective B1 in FIG. 34(a). FIG. 34(c) shows the scanner structure from another perspective B2 in FIG. 34(a). In FIG. 34(c), the white area 3680 and marks 3690 are shown.

Figure 35:
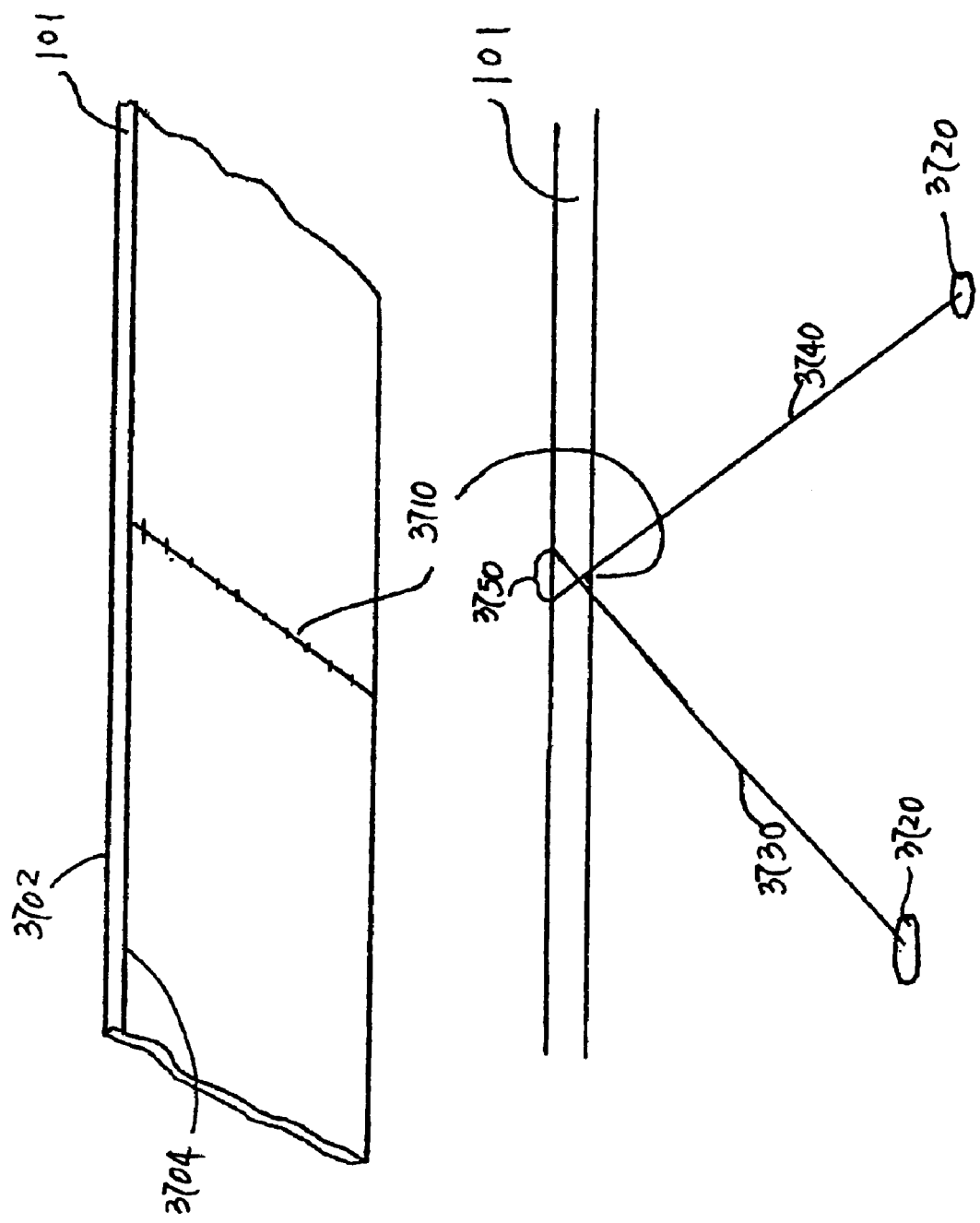
FIG. 35 shows schematically a diagram of a scanner according to another embodiment of the present invention.

FIG. 35 illustrates another preferred embodiment of the present invention relating to using fixed references and marks. Marks 3710 are marked on the internal surface 3704 (the surface facing the mirrors and cameras, opposite to the external surface 3702) of the scan area 101 of a scanner. When there are more than one image taking device 3720 such as cameras, optical sensors, or mirrors viewing a document placed facing the external surface 3702 of the scan area 101, partial images of the document taken overlap at least in area 3750. By adjusting the viewing angle of 3720, the images of the marks 3720 are on the inner surface 3704 of the scan area 101, between the "joining edges" of image paths 3730 and 3740, and are therefore not in final complete processed image of the document.

While there has been shown several and alternate embodiments of the present invention, it is to be understood that certain changes can be made as would be known to one skilled in the art without departing from the underlying scope of the invention as is discussed and set forth in the specification given above and in the claims given below. Furthermore, the embodiments described above are only intended to illustrate the principles of the present invention and are not intended to limit the scope of the invention to the disclosed elements.

What is claimed is:

1. A scanner for obtaining an image of an object placed on an at least partially transparent platform, wherein the at least partially transparent platform has a first scan area and a second scan area, and each of the first scan area and the second scan area of the at least partially transparent platform has a first edge and a second edge, respectively, comprising:
  a. a light source adapted for emitting a light;
  b. a rotatable mirror adapted for receiving the light from a first direction and reflecting the light to a second direction for scanning a partial image of the object on the at least partially transparent platform, and receiving the scanned partial image of the object from a third direction that is opposite to the second direction and reflecting the scanned partial image of the object to a fourth direction that is opposite to the first direction;
  c. a stationary mirror placed on optical paths between the rotatable mirror and the first scan area of the at least partially transparent platform for receiving the light reflected from the rotatable mirror at the second direction and reflecting the light received from the rotatable mirror to the first scan area of the at least partially transparent platform for scanning a partial image of the object, and receiving the scanned partial image of the object and reflecting the scanned partial image of the object to the third direction to the rotatable mirror;
  d. an image sensor for receiving scanned partial images of the object from the fourth direction and outputting electronic signals corresponding to the received scanned partial images of the object; and
  e. an image processing system for receiving the electronic signals from the image sensor and recording the electronic signals in a digital format,
  wherein the rotatable mirror and the stationary mirror are arranged such that when rotated, the rotatable mirror causes the second direction of the light to change such that the corresponding light reflected from the stationary mirror along a fifth direction sequentially scans consecutive partial images of the object from the first edge to the second edge of the first scan area along a first scan direction A and from the first edge to the second edge of the second scan area along a second scan direction B in no more than one full rotation of the rotatable mirror,
    wherein the image processing system combines the partial images recorded therein to form a substantially complete image of the object corresponding to a full scan along the first scan direction A and the second scan direction B, respectively.

2. The scanner of claim 1, further comprising a condenser lens placed on an optical path between the rotatable mirror and the image sensor.

3. The scanner of claim 1, further comprising rotating means for rotating the rotatable mirror.

4. The scanner of claim 3, wherein the rotatable mirror comprises a plane mirror having at least one reflecting surface.

5. The scanner of claim 3, wherein the rotatable mirror comprises a polygon mirror.

6. The scanner of claim 1, wherein the stationary mirror comprises a plane mirror.

7. The scanner of claim 1, wherein the stationary mirror comprises a curved mirror.

8. The scanner of claim 1, wherein the image sensor comprises at least one of a line sensor, an area sensor, and a combination thereof.

9. The scanner of claim 1, wherein the light source comprises one of a laser, a fluorescent light tube, a light emitting diode assembly, a tungsten lamp, a tungsten halogen lamp, a halogen lamp, an Xenon lamp, and any combination thereof.

10. The scanner of claim 1, wherein the at least partially transparent platform, the rotatable mirror, and the stationary mirror are arranged such that a first angle, $\alpha_1$, is defined between the at least partially transparent platform and an optical path connecting a lower edge of the stationary mirror and the first edge of the first scan area, and wherein $\alpha_1$ is greater than a predetermined threshold angle, $\alpha$.

11. The scanner of claim 10, wherein the at least partially transparent platform and the rotatable mirror are arranged such that a second angle, $\alpha_2$, is defined between the at least partially transparent platform and an optical path connecting the intersection point of the first direction and the second direction and the first edge of the second scan area, and wherein $\alpha_2$ is greater than the predetermined threshold angle $\alpha$.

12. The scanner of claim 1, wherein the at least partially transparent platform comprises a plate made of an at least partially transparent material.

13. The scanner of claim 12, wherein the at least partially transparent platform comprises a glass plate.

14. The scanner of claim 12, wherein the at least partially transparent platform comprises a transparent plastic plate.

15. A scanner for obtaining an image of an object placed on an at least partially transparent platform, wherein the at least partially transparent platform has at least a first scan area and a second scan area, and each of the first scan area and the second scan area has a first edge and a second edge, respectively, comprising:
  a. at least one light source adapted for emitting a light;
  b. at least one rotatable mirror adapted for receiving the light from a first direction and reflecting the light to a second direction for scanning a partial image of the object on the at least partially transparent platform, and receiving the scanned partial image of the object from a third direction and reflecting the scanned partial image of the object to a fourth direction;
  c. at least one image sensor for receiving scanned partial images of the object from the fourth direction and outputting electronic signals corresponding to the received scanned partial images of the object; and
  d. an image processing system for receiving the electronic signals from the at least one image sensor and recording the electronic signals in a digital format,
  wherein the at least one light source, the at least one rotatable mirror and the at least one image sensor are arranged such that the first direction and the fourth direction define a first angle, $(180°-\beta)$, and the second direction and the third direction define a second angle, $(180°+\beta)$, where $\beta$ has a value in the range of $-15°$ to $15°$, and when rotated, the at least one rotatable mirror causes the second direction of the light to change such that the light sequentially scans consecutive partial images of the object from the first edge to the second edge of the first scan area along a first scan direction A and from the first edge to the second edge of the second scan area along a second scan direction B in no more than one full rotation of the rotatable mirror,
    wherein the image processing system combines the partial images recorded therein to form a substantially complete image of the object corresponding to a full scan along the first scan direction A and the second scan direction B, respectively.

16. The scanner of claim 15, further comprising at least one condenser lens placed on an optical path between the at least one rotatable mirror and the at least one image sensor.

17. The scanner of claim 15, further comprising rotating means for rotating the at least one rotatable mirror.

18. The scanner of claim 17, wherein the at least one rotatable mirror comprises a plane mirror having at least one reflecting surface.

19. The scanner of claim 17, wherein the at least one rotatable mirror comprises a polygon mirror.

20. The scanner of claim 15, wherein the at least one image sensor comprises at least one of a line sensor, an area sensor, and a combination thereof.

21. The scanner of claim 15, wherein the at least partially transparent platform comprises a plate made of an at least partially transparent material.

22. The scanner of claim 21, wherein the at least partially transparent platform comprises a glass plate.

23. The scanner of claim 21, wherein the at least partially transparent platform comprises a transparent plastic plate.

* * * * *